United States Patent
Fukui et al.

(10) Patent No.: US 7,638,590 B2
(45) Date of Patent: Dec. 29, 2009

(54) POLYHYDROXYALKANOATE HAVING AMIDE, SULFONIC ACID OR SULFONATE ESTER GROUP, CHARGE CONTROL AGENT AND TONER

(75) Inventors: Tatsuki Fukui, Yokohama (JP); Tetsuya Yano, Atsugi (JP); Chieko Mihara, Isehara (JP); Shinya Kozaki, Tokyo (JP); Tsutomu Honma, Atsugi (JP); Takashi Kenmoku, Fujisawa (JP); Ako Kusakari, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 372 days.

(21) Appl. No.: 11/172,662

(22) Filed: Jun. 24, 2005

(65) Prior Publication Data

US 2006/0287473 A1 Dec. 21, 2006

(51) Int. Cl.
*G03G 9/097* (2006.01)
(52) U.S. Cl. .............. 528/272; 430/108.5; 430/126; 528/271; 528/288; 528/290; 528/294; 528/295; 528/305; 528/308; 528/301
(58) Field of Classification Search ............... 528/272
See application file for complete search history.

(56) References Cited

U.S. PATENT DOCUMENTS

| | | | |
|---|---|---|---|
| 4,837,394 A | 6/1989 | Alexandrovich et al. | 430/110 |
| 4,855,396 A | 8/1989 | Wilson et al. | 528/272 |
| 4,968,575 A | 11/1990 | Matsumura et al. | 430/110 |
| 5,500,323 A | 3/1996 | Baur et al. | 430/110 |
| 5,849,450 A | 12/1998 | Wilson et al. | 430/110 |
| 6,911,520 B2* | 6/2005 | Fukui et al. | 528/272 |
| 7,465,779 B2* | 12/2008 | Kenmoku et al. | 528/290 |
| 2003/0059907 A1 | 3/2003 | Suzuki et al. | 435/135 |
| 2003/0073804 A1 | 4/2003 | Imamura et al. | 528/274 |
| 2003/0100700 A1 | 5/2003 | Imamura et al. | 528/272 |
| 2003/0104300 A1 | 6/2003 | Kenmoku et al. | 430/108.22 |
| 2003/0203987 A1 | 10/2003 | Nomoto et al. | 523/160 |
| 2004/0005290 A1* | 1/2004 | Fukui et al. | 424/78.37 |
| 2006/0247414 A1* | 11/2006 | Kenmoku et al. | 528/272 |

FOREIGN PATENT DOCUMENTS

| | | |
|---|---|---|
| EP | 1236752 A2 | 9/2002 |
| EP | 1253161 A2 | 10/2002 |
| EP | 1253162 A2 | 10/2002 |
| EP | 1254918 A2 | 11/2002 |
| EP | 1256606 A2 | 11/2002 |
| WO | WO 2004/037889 * | 5/2004 |
| WO | WO 2004/061529 * | 7/2004 |

OTHER PUBLICATIONS

Steinbuchel, et al. "Diversity of bacterial polyhydroxyalkanoic acids", FEMS Microb. Lett., vol. 128, (1995) 219-228.
Park, et al., "Epoxidation of Bacterial Polyesters . . . 10-Undecenoic Acid", Macromolecules, vol. 31, (1998) 1480-1486.

* cited by examiner

*Primary Examiner*—James Seidleck
*Assistant Examiner*—Gregory Listvoyb
(74) *Attorney, Agent, or Firm*—Fitzpatrick, Cella, Harper & Scinto

(57) ABSTRACT

The invention provides a novel polyester adapted for use in a charge control agent for a toner for an electrophotographic process, having a charge stability, a high charge amount, an improved dispersibility and a biodegradability, and a producing method and an application technology therefore. According to the invention, there is provided polyhydroxyalkanoate comprising at least one unit represented by the following chemical formula in a molecule:

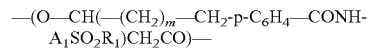

(wherein $R_1$ represents OH, a halogen atom, ONa, OK or $OR_{1a}$; $A_1$ and $R_{1a}$ each represents a substituted or unsubstituted aliphatic hydrocarbon structure, a substituted or unsubstituted aromatic cyclic structure or a substituted or unsubstituted heterocyclic structure; m represents an integer selected from a range of 0 to 7; and $R_1$, $A_1$, $R_{1a}$ and m have the aforementioned meanings independently for each unit when plural units are present), a charge control agent containing such polyhydroxyalkanoate, a toner utilizing such charge control agent, and an image forming method and an image forming apparatus utilizing such toner.

15 Claims, 17 Drawing Sheets

POLYHYDROXYALKANOATE HAVING AMIDE, SULFONIC ACID OR SULFONATE ESTER GROUP, CHARGE CONTROL AGENT AND TONER

TECHNICAL FIELD

The present invention relates to a novel polyhydroxyalkanoate (hereinafter abbreviated as PHA) and a producing method therefore, and more particularly a polyhydroxyalkanoate having a sulfonic acid group or a derivative thereof as a hydrophilic group or a polar group, and a producing method therefore.

Also the present invention relates to a charge control agent and an electrostatic image developing toner to be employed in a recording method utilizing an electrophotographic process, an electrostatic recording or a magnetic recording, an image forming method utilizing the toner and an image forming apparatus utilizing the toner.

BACKGROUND ART

Background Art of Resin (Problems Regarding the Conventionally Used Resin)

Plastics such as a polyethylene terephthalate (PET) resin, polyester resin, vinyl chloride resin or polyolefin resin have previously been used for a wide range of uses as molded articles, e.g., containers such as food containers, beverage bottles, cosmetic containers or plant pots.

The majority of these plastics are discarded after use. The plastic wastes have previously been disposed by incineration or landfilling. However, since the wastes generate a great burning energy by incineration, they have problems such as regarding the durability of incinerators caused by a high burning temperature, processing cost by high temperature durable incinerators, and air pollution caused by generation of toxic combustion gas such as carbon monoxide, sulfur compounds, chlorine gas or dioxin. In addition, when the plastic wastes are landfilled, they remain without being decomposed on a semi-permanent basis, and they are accumulated as wastes in a disposal field, thereby causing a social problem that is called a waste problem. Moreover, since the plastic wastes exist as are in the earth, they cause a problem regarding instability of the ground in a landfill site, and there is also a risk that the wastes might affect the natural environment and various types of organisms in the landfill site or the peripheral area.

Thus, to solve these problems, a biodegradable resin has become a focus of attention in these years. The term "biodegradable resin" is used herein to mean a resin, which has physical properties almost equivalent to those of general-purpose plastics during the use as a material, but after the use, is rapidly decomposed by microorganisms in the natural environment such as on the earth, in the earth, in the compost, in the active slurry, or in the water. The resin is decomposed into a fine form, and several types of biodegradable resins are finally converted into carbon dioxide and water.

Other than specific polyester biodegradable resins, blended resin compositions have conventionally been known to satisfy the above described requirements, and examples of such blended resin compositions include a starch-ethylene vinyl alcohol copolymer resin, an ethylene vinyl alcohol copolymer resin-aliphatic polyester resin, and an aliphatic polyester resin-polyolefin resin. These resins or resin compositions are in practical use by various processing means suitable for various uses. However, a resin composition, which is excellent in ability of being processed required in its production process, as well as various physical properties required and biodegradability required after being discarded, has not yet been proposed.

(Concerning Polyhydroxyalkanoate (PHA))

By the way, in recent years, as a method for solving the problem regarding environmental contamination caused by wastes such as plastic molded articles, the use of a biodegradable resin synthesized by microorganisms as a molding material has been proposed. Examples of known biodegradable resins derived from microorganisms include polyhydroxyalkanoate (hereinafter referred to as PHA at times) such as a copolymer (hereinafter referred to as PHB/V) of poly-3-hydroxy-n-butyric acid (hereinafter referred to as PHB at times) or 3-hydroxy-n-butyric acid (hereinafter referred to as 3HB at times) and 3-hydroxy-n-valeric acid (hereinafter referred to as 3HV at times), polysaccharide such as bacteria cellulose or Pullulan, and polyamino acid such as poly-γ-glutamic acid or polylysine. In particular, PHA is, as with the conventional plastics, used for various products after undergoing a melt-processing. Further, since PHA is excellent in biodegradability, it is expected that this compound will be applied to soft components for medical use, etc.

It has already been reported that various microorganisms produce PHA and accumulate such product therein. Such PHA is known to assume various compositions or structures depending on the kind of microorganism, composition of culture medium and culture condition employed for production, and researches have been made for controlling such composition and structure, principally for improving the physical properties. In particular, there has been investigated biosynthesis of PHA by polymerizing a monomer unit of a relatively simple structure including 3HB, 3HV, 3-hydroxy-n-hexanoic acid (hereinafter abbreviated as 3HHx) and 4-hydroxy-n-butyric acid (hereinafter abbreviated as 4HB), and production by various microorganisms has been reported. However, PHA formed by such short-chain-length 3-hydroxyalkanoic acid unit (hereinafter it may be abbreviated as scl-PHA) tends to be pyrolyzed because the melting point and the thermal decomposition temperature are mutually close, thus resulting in an insufficient extrusion molding property. Also PHB, having a high crystallinity, tends to result in a limited elongation and a deterioration in the mechanical properties.

Recently, researches are actively made on polyhydroxyalkanoate formed by a medium-chanin-length 3-hydroxyalkanoic acid unit with about 4 to 12 carbon atoms (such PHA may hereinafter be abbreviated as mcl-PHA), and production of mcl-PHA is confirmed utilizing a non-cyclic aliphatic hydrocarbon, octanoic acid, hexanoic acid, sodium gluconate etc., as a carbon source. However, such mcl-PHA has a low melting point and may cause stickiness or softening above 50° C.

All the PHAs mentioned above are a PHA constituted of a monomer unit synthesized by β-oxidation of hydrocarbon or the like or by fatty acid synthesis from sugar by microorganisms, and having an alkyl group only in a side chain (hereinafter it may be abbreviated as usual-PHA), or of a similar monomer unit (for example having, in a side chain, an alkenyl group containing a non-terminal double bond). These materials are still insufficient in physical properties, as a plastic material for wide applications.

For wider application of PHA, an extensive investigation for improvement in the physical properties is important, and, for this purpose, there are required development and search of PHA including monomer units of further diversified structures. On the other hand, PHA having a substituent in the side chain, namely "unusual PHA," is anticipated as a "functional polymer" having extremely useful functions and characteristics, based on the properties of the introduced substituent, by selecting the introduced substituent according to the desired characteristics. Thus, development and search of excellent PHA, capable of achieving such functionality and biodegradable property at the same time, is also an important target. Examples the substituent include an aromatic ring-containing group (such as phenyl or phenoxy), an ester group and an unsaturated hydrocarbon having a terminal double bond (such as alkenyl or alkadienyl) particularly an allyl group, a cyano group, a halogenated hydrocarbon group and an epoxide group. As PHA containing phenyl group or a partially substituted group thereof, there are reported a production of PHA containing 3-hydroxy-5-phenylvaleric acid as a unit, from 5-phenylvaleric acid as substrate; a production of PHA containing 3-hydroxy-5-(4'-tolyl)valeric acid as a unit, from 5-(4'-tolyl)valeric acid as substrate; and a production of PHA containing 3-hydroxy-5-(2',4'-dinitrophenyl)valeric acid and 3-hydroxy-5-(4'-nitrophenyl)valeric acid as units, from 5-(2',4'-dinitrophenyl)valeric acid as substrate. Also as PHA containing phenoxy group or a partially substituted group thereof, there are reported a production of a PHA copolymer containing 3-hydroxy-5-phenoxyvaleric acid and 3-hydroxy-9-phenoxynonaic acid as the units, from 11-phenoxyundecanoic acid as substrate; a production of a PHA including a 3-hydroxy-4-phenoxybutyric acid unit and a 3-hydroxy-6-phenoxyhexanoic acid unit from 6-phenoxyhexanoic acid; a production of a PHA including a 3-hydroxy-4-phenoxybutyric acid, a 3-hydroxy-6-phenoxyhexanoic acid unit and a 3-hydroxy-8-phenoxyoctanoic acid from 8-phenoxyoctanoic acid; and a production of a PHA including a 3-hydroxy-5-valeric acid unit and a 3-hydroxy-7-phenoxyheptanoic acid unit from 11-phenoxyundecanoic acid. Also there are reported a PHA homopolymer constituted of a 3-hydroxy-5-(monofluorophenoxy) pentanoate (3H5(MFP)P) unit or a 3-hydroxy-5-(difluorophenoxy) pentanoate (3H5(DFP)P) unit, and a PHA copolymer containing at least a 3H5(MFP)P unit or a 3H5(DFP)P unit, providing advantages of a high melting point thereby providing steric regularility and water repellent property while maintaining a satisfactory working property. In addition to fluorine substituted compounds, there are also investigated compounds substituted with cyano or nitro group. For example, there is reported a production of PHA including 3-hydroxy-p-cyanophenoxy hexanoic acid or 3-hydroxy-p-nitrophenoxy hexanoic acid as the monomer unit from octanoic acid and p-cyanophenoxy hexanoic acid or p-nitrophenoxy hexanoic acid as substrate. The PHA in these reports, different from usual PHA in which the side chain is an alkyl group, has an aromatic ring on the side chain, and is useful in obtaining a polymer of physical properties resulting from such aromatic ring. Also, as an example of unusual-PHA having a cyclohexyl group, there is reported a production of such PHA from cyclohexylbutyric acid or cyclohexylvaleric acid.

Also as a new category not limited to changes in the physical properties, investigation is also made for producing PHA having an appropriate functional radical on the side chain, thereby creating new functions utilizing such substituent.

It is reported in Polymer, 41, 1703-1709 (2000) that a change of solubility in solvents has been found such that 3-hydroxyalkanoic acid having diol on the side chain terminal, synthesized by an oxidation reaction using potassium permanganate after producing PHA containing as a monomer unit 3-hydroxyalkenoic acid having an unsaturated bond in the terminal of the side chain terminal using 10-undecenoic acid as a substrate, is rendered soluble in polar solvents such as methanol, acetone-water mixture (80/20, v/v) and dimethylsulfoxide, and insoluble in nonpolar solvents such as chloroform, tetrahydrofuran and acetone. It is reported in Macromolecular chemistry, 4, 289-293 (2001) that an improvement in speed of decomposition has been found for PHA containing 3-hydroxy-10-carboxynonanoic acid as a monomer unit, synthesized by an oxidization cleavage reaction using potassium permanganate after producing PHA containing as a monomer unit 3-hydroxy-10-undecenoic acid using 10-undecenoic acid as a substrate.

Background Art of Toner

A large number of electrophotographic methods have been known so far. In general, copied images are obtained by forming an electrostatic latent image on an image-bearing member (photosensitive member) by utilizing a photoconductive material and by various means, subsequently developing the latent image by the use of a toner to form a visible image (toner image), transferring the toner image to a transfer medium as the occasion demands, then fixing the toner image to the transfer medium by heating and/or pressing. As methods by which the electrostatic latent image is formed into a visible image, cascade development, magnetic brush development, pressure development and so forth are known in the art. Another method is also known in which, using a magnetic toner and a rotary developing sleeve provided with magnetic poles at the core, the magnetic toner is caused to fly from the developing sleeve to the photosensitive member by the aid of an electric field.

As development methods used when electrostatic latent images are developed, available are a two-component development method making use of a two-component type developer comprised of a toner and a carrier and a one-component development method making use of a one-component developer using no carrier and comprised of only a toner. Fine colored particles commonly called a toner are composed of a binder resin and a colorant as essential components and optionally a magnetic material, a charge control agent and so forth.

(Charge Control Agent)

For providing the toner with an electric charge, there can be utilized charging characteristics of the binder resin itself without utilizing a charge control agent, but satisfactory image quality cannot be obtained because of insufficiency in stability of charge in time and in moisture resistance. Therefore, a charge control agent is usually added to the toner in order to retain and control the charge. The charge control agents presently known in this technical field include, for example, for negative triboelectricity, metal complexes of azo dyes, those of aromatic dicarboxylic acid, and those of salycilic acid derivatives. Also for positive charge control agents, there are known nigrosin dyes, triphenylmethane dyes, various quaternary ammonium salts and organic tin compounds such as tibutyltin oxide. However, the toner containing such substance as a charge control agent may not sufficiently satisfy, depending on the composition thereof, quality characteristics required for the toner, such as chargeability or stability in time.

For example, a toner containing an azo dye metal complex known as a negative charge control agent, though showing a charge amount of a certain level, may result in an inferior dispersibility depending on the kind of the resin to be combined, since the azo dye metal complex is a crystalline substance of a low molecular weight. In such case, the charge control agent is not uniformly distributed in the binder resin, whereby the obtained toner shows an extremely unsharp distribution of the charge amount, and is deficient in the image forming ability, providing an image of a low gradation. Also the azo dye metal complex, having its specific color, has been employed in the toner of black or limited color, and it is associated with a serious drawback, in case of use in a colored toner, of hindering a sharp color of a coloring agent, required for obtaining an image capable of meeting a high requirement for color.

Also as an almost colorless negative charge control agent, a metal complex of an aromatic dicarboxylic acid is known, but it is still not completely colorless and may show an insufficient dispersibility because of being a crystalline substance of a low molecular weight.

Also a nigrosin dye or a triphenylmethane dye, known as a positive charge control agent, having its specific color, has been employed in the toner of black or limited color, and may be insufficient in the stability in time of the toner, in a continuous copying operation. Also a conventional quaternary ammonium salt may be insufficient in a moisture resistance in the formed toner, resulting in an inferior stability in time and being unable to provide a satisfactory image in a repeated use.

Also from the standpoint of environmental protection, it is recently desired worldwide to further reduce the wastes and the environmental pollution. Such requirements are same also in the field of electrophotography. In fact the discarded amount of the printed papers, waste toner after use and copy papers is increasing year after year with the vast pervasiveness of the imaging apparatuses, and, from the standpoint of securing the global environment, safety of such wastes is also an important issue. In consideration of such points, there are investigated charge control agents based on a polymer. Examples of such compounds include those disclosed in the U.S. Pat. Nos. 4,480,021, 4,442,189 and 4,925,765. In general the polymer charge control agent for providing the toner with the negative charging property is often composed of a copolymer of styrene and/or α-methylstyrene and alkyl (metha)acrylate ester or alkyl(metha)acrylate amide having a sulfonic acid group. Such materials are advantageous as they are colorless, but have to be added in a large amount in order to obtain the desired charge amount.

As explained in the foregoing, these compounds do not have a performance sufficient for the charge control agent, and are insufficient in a charge amount, start-up characteristics of charging, a stability in time and an environmental stability. Also in consideration not only of the functionality but also of influences on human body and environment, there is strongly desired a charge control agent itself, and a charge control agent capable of realizing the use of compounds and organic solvents to be employed in the synthesis, a safer and milder process of synthesis, and a reduction in the amount of organic solvents. Such charge control agent and synthesizing process thereof have not been known, and there is still a room of contribution to the functionality and the environmental safety.

(Other Prior Technical References)

In the present invention, there can be utilized microorganisms described in U.S. Pat. Nos. 6,521,429 and 6,586,562. Also there can be utilized a description on a culture medium in J. Biol. Chem., 218, 97-106 (1956). Also technologies relating to the present invention include a technology for oxidation cleaving of a carbon-carbon double bond with an oxidant to obtain a carboxylic acid (J. Chem. Soc., Perkin. Trans. 1, 806(1973), Org. Synth., 4, 698 (1963), J. Org. Chem., 46, 19 (1981) and J. Am Chem. Soc., 81, 4273 (1959)), and a technology for synthesizing 5-(4-methylphenyl)valeric acid (Macromolecules, 29, 1762-1766 (1996)).

DISCLOSURE OF THE INVENTION

A polyester having an aromatic ring in the side chain generally has characteristics of a high melting point and wide field of application. However polyester of polyhydroxyalkanoate type having a unit including an aromatic ring substituted with a substituent applicable to various uses is limited to the aforementioned examples, and there is being desired polyester of polyhydroxyalkanoate type further improved in functionality or having new functions.

The present invention is to solve the aforementioned problems and to provide novel polyhydroxyalkanoate in which a sulfonic acid group or a derivative, constituting a hydrophilic group or a polar group, is introduced in order to improve various functionalities, and a producing method therefore.

The present invention further provides a negatively chargeable charge control agent, containing such polyhydroxyalkanoate, also improved in functionality such as a higher contribution to the environmental security and a higher performance (a higher charge amount, a faster charging, a superior stability in time and a higher environmental stability) and showing an improved dispersibility, a toner for developing an electrostatic charge image, and an image forming method and an image forming apparatus employing such electrostatic charge image developing toner.

The present inventors, as a result of intensive investigations toward the development of novel polyhydroxyalkanoate in which a hydrophilic group or a polar group, considered useful for improving various functions, is introduced, have reached the present invention as will be explained in the following.

Also the present inventors have found that the aforementioned PHA has extremely excellent characteristics as a charge control agent and has a high safety to human body and environment, and have found that significant effects can be achieved in a toner for developing an electrostatic charge image containing such charge control agent and in case such toner for developing electrostatic charge image is employed in an image forming apparatus provided with a specified developing system.

In the present specification, a term "halogen" in the definition of a substituent means a halogen atom.

According to an aspect of the present invention, there is provided polyhydroxyalkanoate comprising at least one unit represented by a chemical formula (1) in a molecule:

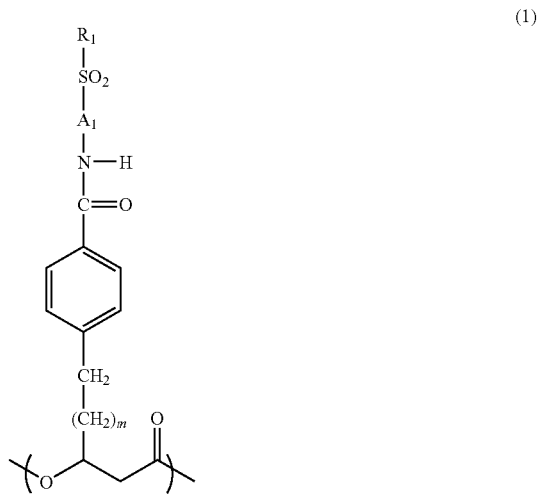

wherein $R_1$ represents OH, a halogen atom, ONa, OK or $OR_{1a}$; $A_1$ and $R_{1a}$ each represents a substituted or unsubstituted aliphatic hydrocarbon structure, a substituted or unsubstituted aromatic cyclic structure or a substituted or unsubstituted heterocyclic structure; m represents an integer selected from a range of 0 to 7; and $R_1$, $A_1$, $R_{1a}$ and m have the aforementioned meanings independently for each unit when plural units are present.

According to another aspect of the present invention, there is provided a method for producing polyhydroxyalkanoate comprising:

a step of preparing a polyhydroxyalkanoate including a unit represented by a chemical formula (24) and at least an amine compound represented by a chemical formula (25); and a step of executing a condensation reaction of the polyhydroxyalkanoate and the amine compound thereby obtaining a polyhydroxyalkanoate including a unit represented by a chemical formula (1):

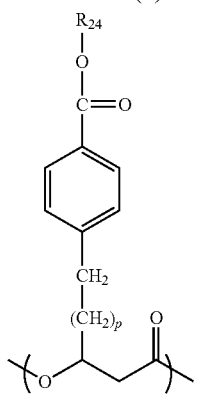

(24)

wherein p represents an integer selected from a range of 0 to 7; $R_{24}$ represents H, Na or K, p and $R_{24}$ have the aforementioned meanings independently for each unit when plural units are present, $$H_2N\text{-}A_1\text{-}SO_2R_1 \qquad (25)$$

wherein $R_1$ represents OH, a halogen atom, ONa, OK or $OR_{1a}$; and $OR_{1a}$ each represents a substituted or unsubstituted aliphatic hydrocarbon structure, a substituted or unsubstituted aromatic cyclic structure or a substituted or unsubstituted heterocyclic structure.

According to still another aspect of the present invention, there is provided a method for producing polyhydroxyalkanoate comprising:

a step of preparing a polyhydroxyalkanoate including a unit represented by a chemical formula (26):

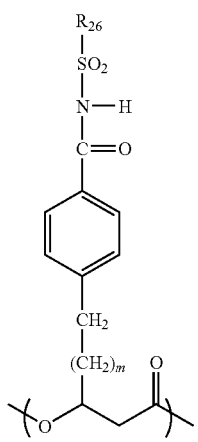

(26)

wherein $R_{26}$ represents OH, a halogen atom, ONa, or OK; $A_{26}$ represents a substituted or unsubstituted aliphatic hydrocarbon structure, a substituted or unsubstituted aromatic cyclic structure or a substituted or unsubstituted heterocyclic structure;, m represents an integer selected from a range of 0 to 7; and $R_{26}$, $A_{26}$ and m have the aforementioned meanings independently for each unit when plural units are present;

and a step of reacting the polyhydroxyalkanoate with trimethylsilyldiazomethane thereby obtaining a polyhydroxyalkanoate including a unit represented by a chemical formula (27):

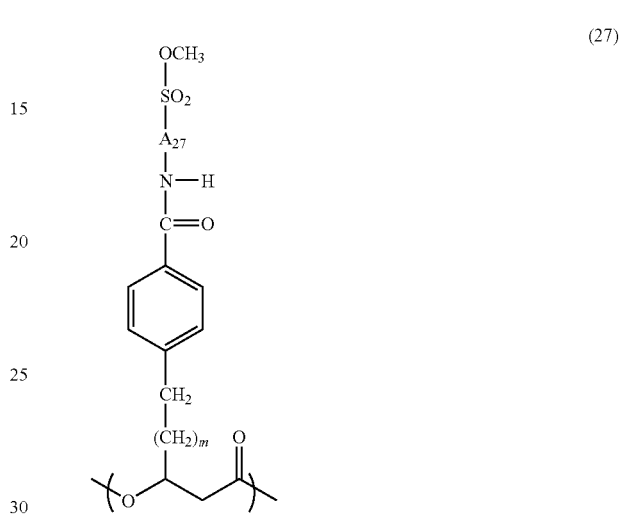

wherein $A_{27}$ represents a substituted or unsubstituted aliphatic hydrocarbon structure, a substituted or unsubstituted aromatic cyclic structure or a substituted or unsubstituted heterocyclic structure; m represents an integer selected from a range of 0 to 7; and $A_{27}$ and m have the aforementioned meanings independently for each unit when plural units are present.

According to a further aspect of the present invention, there is provided an improved charge control agent for controlling a charge state of a powder material, wherein the improvement comprises: including at least a kind of unit among units represented by a chemical formula (1).

According to a further aspect of the present invention, there is provided an electrostatic charge image developing toner comprising at least a binder resin, a coloring agent, and the above charge control agent.

According to a further aspect of the present invention, there is provided an image forming method comprises a step of externally applying a voltage to a charging member thereby charging an electrostatic latent image bearing member, a step of forming an electrostatic charge image on the charged electrostatic latent image bearing member, a development step of developing the electrostatic charge image with an electrostatic charge image developing toner thereby forming a toner image on the electrostatic latent image bearing member, a transfer step of transferring the toner image on the electrostatic latent image bearing member onto a recording material, and a fixation step of heat-fixing the toner image on the recording material, the method comprising use of the above electrostatic charge image developing toner.

According to a further aspect of the present invention, there is provided an image forming apparatus comprising a means which externally applies a voltage to a charging member thereby charging an electrostatic latent image bearing member, a means which forms an electrostatic charge image on the charged electrostatic latent image bearing member, a developing means which develops the electrostatic charge image with an electrostatic charge image developing toner thereby forming a toner image on the electrostatic latent image bearing member, a transfer means which transfers the toner image on the electrostatic latent image bearing member onto a recording material, and a fixing means which heat fixes the toner image on the recording material, the apparatus comprising use of the above electrostatic charge image developing toner.

According to a further aspect of the present invention, there is provided Methyl 2-naphthylamine -1-sulfonate represented by a chemical formula (67):

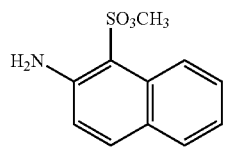

(67)

According to the present invention, there are provided a novel polyhydroxyalkanoate in which a sulfonic acid group or a derivative thereof constituting a hydrophilic group or a polar group and which is applicable to various applications, and a producing method thereof. Such novel polyhydroxyalkanoate is excellent, for example, for fused working, and also shows satisfactory matching with the living tissues thus being expected in the applications as the soft material for medical use.

Also by including at least a polyhydroxyalkanoate represented by the chemical formula (1) as a charge control agent, in an electrostatic charge image developing toner, there can be provided an electrostatic charge image developing toner which has excellent charging characteristics and is improved in dispersibility and spent property of such compound in a toner resin and which is free from image fogging at an image output in an image forming apparatus, is excellent in transferability, and is highly adapted to an electrophotographic process. Also as the charge control agent of the present invention is colorless or only weakly colored, there can be selected an arbitrary coloring agent according to the hue required for the color toner, and the original hue of dye or pigment is not at all hindered. In addition, the electrostatic charge image developing toner of the present invention does not require use of heavy metals and is biodegradable, thus not requiring a combustion process and thereby providing an industrially important advantages in environmental security such as prevention of air pollution or global warming.

BEST MODE FOR CARRYING OUT THE INVENTION

Figure 1:
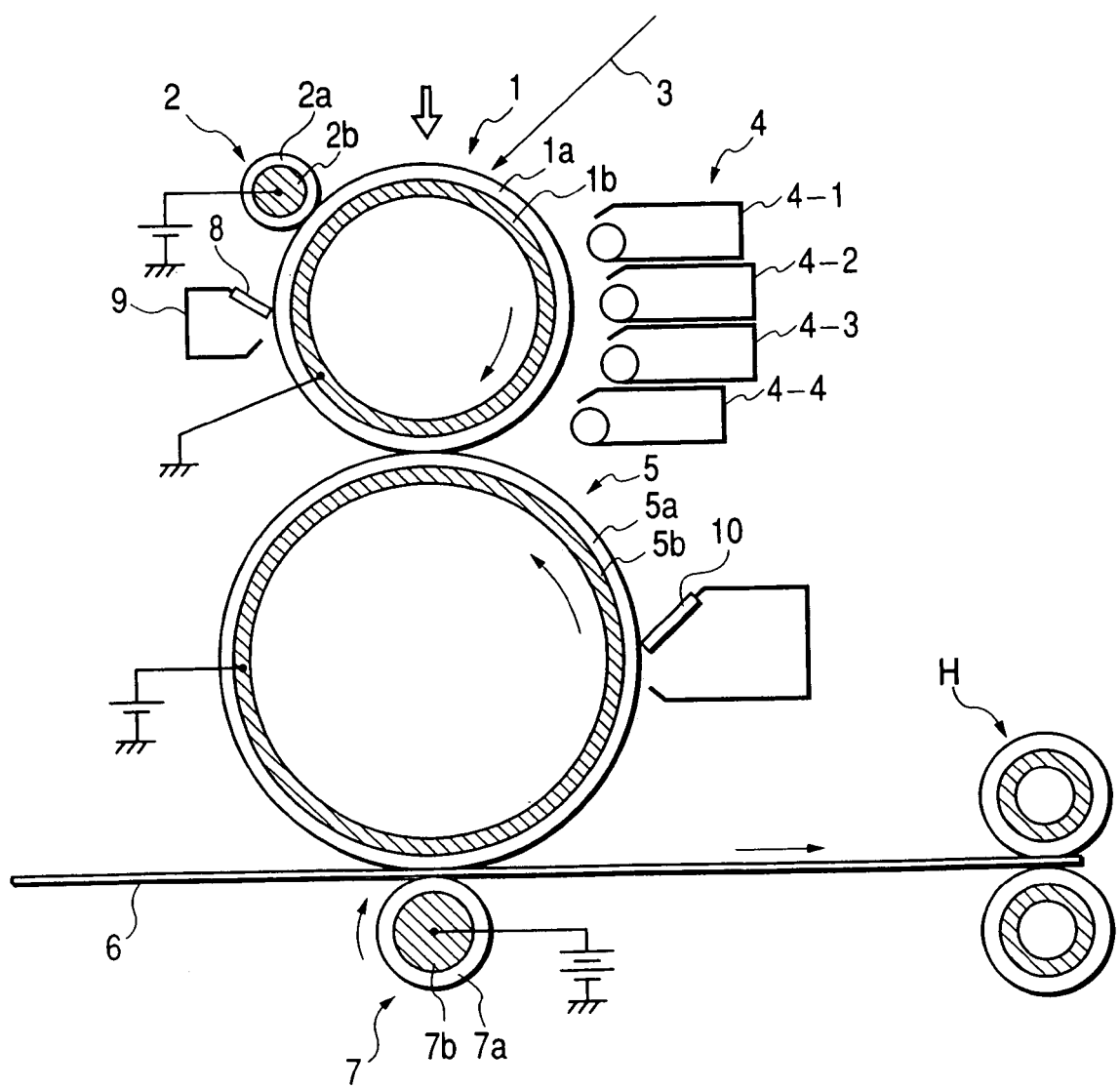
FIG. 1 is a schematic view of an image forming apparatus employed in Examples 25 to 30 and Comparative Examples 7 to 12.

In the following, the present invention will be clarified in more details by preferred embodiments thereof. The present inventors, as a result of intensive investigations for attaining the aforementioned objectives, find that the aforementioned polyhydroxyalkanoate has extremely excellent characteristics as a charge control agent and is highly safe to the human body and the environment, and also find that significant effects can be obtained by an electrostatic charge image developing toner including such charge control agent and in case such electrostatic charge image developing toner is employed in an image forming apparatus of a specified developing system, thereby having made the present invention.

The polyhydroxyalkanoate to be employed in the present invention has a basic skeleton as a biodegradable resin, and is therefore not only usable in producing various articles, for example, by fused working as in conventional plastics but also has a conspicuous property, different from petroleum-derived synthetic polymers, of being biodegraded and incorporated in a material cycle of the nature. For this reason, it does not require a combustion processing, and can be utilized as a plastic material effective for preventing air pollution and global warming and enabling environmental security.

In the following, the content of the present invention will be explained in detail.

In the Polyhydroxyalkanoate of the present invention, $R_{1a}$ may represent a normal or branched alkyl group with 1 to 8 carbon atoms, or a substituted or unsubstituted phenyl group.

In polyhydroxyalkanoate of the present invention, $A_1$ may represent a normal or branched alkylene group with 1 to 8 carbon atoms, which is unsubstituted or substituted with 1 to 16 $SO_2R_{3a}$ ($R_{3a}$ representing OH, a halogen atom, ONa, OK or $OR_{3b}$ ($R_{3b}$ representing a normal or branched alkyl group with 1 to 8 carbon atoms or a substituted or unsubstituted phenyl group); and $R_{3a}$ has the aforementioned meaning independently for each unit when plural unites are present);

and $R_{1a}$ represents a normal or branched alkyl group with 1 to 8 carbon atoms or a substituted or unsubstituted phenyl group when plural units are present.

In polyhydroxyalkanoate of the present invention, the substituent -$A_1SO_2R_1$ may be represented by the following chemical formula (4'):

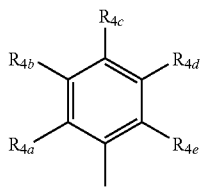

(4')

wherein at least one of $R_{4a}$, $R_{4b}$, $R_{4c}$, $R_{4d}$ and $R_{4e}$ represents $SO_2R_{4f}$ (in which $R_{4f}$ is OH, a halogen atom, ONa, OK or $OR_{4h}$; and $R_4$ represents a normal or branched alkylene group with 1 to 8 carbon atoms or a substituted or unsubstituted phenyl group and each of the others represent H, a halogen atom, an alkyl group with 1 to 20 carbon atoms, an alkoxy group with 1 to 20 carbon atoms, OH, $NH_2$, $NO_2$, $COOR_{4g}$ ($R_{4g}$ representing H, Na or K), an acetamide group, OPh, NHPh, $CF_3$, $C_2F_5$ or $C_3F_7$; and $R_{4a}$, $R_{4b}$, $R_{4c}$, $R_{4d}$, $R_{4e}$, $R_{4f}$, $R_{4g}$ and $R_{4h}$ have the aforementioned meanings independently for each unit when plural units are present.

In polyhydroxyalkanoate of the present invention, the substituent -$A_1SO_2R_1$ represents a substituent represented by the following chemical formula (5a') or (5b'):

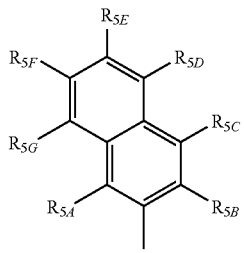

(5a')

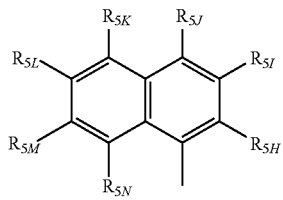

(5b')

wherein at least one of $R_{5H}$, $R_{5I}$, $R_{5J}$, $R_{5K}$, $R_{5L}$, $R_{5M}$ and $R_{5N}$ represents $SO_2R_{5Q}$ (in which $R_{5Q}$ is OH, a halogen atom, ONa, OK or $OR_{5t}$; and $R_{5t}$ represents a normal or branched alkyl group with 1 to 8 carbon atoms or a substituted or unsubstituted phenyl group), and each of the others represents a hydrogen atom, a halogen atom, an alkyl group with 1 to 20 carbon atoms, an alkoxy group with 1 to 20 carbon atoms, OH, $NH_2$, $NO_2$, $COOR_{5R}$ ($R_{5R}$ representing H, Na or K), an acetamide group, OPh, NHPh, $CF_3$, $C_2F_5$ or $C_3F_7$; m represents an integer selected from a range of 0 to 7; and $R_{5H}$, $R_{5I}$, $R_{5J}$, $R_{5K}$, $R_{5L}$, $R_{5M}$, $R_{5N}$, $R_{5Q}$, $R_{5R}$, $R_{5t}$ and m have the aforementioned meanings independently for each unit when plural units are present.

In Polyhydroxyalkanoate of the present invention, the substituent -$A_1SO_2R_1$ may be represented by the following chemical formula (6'):

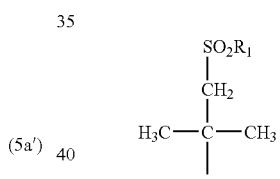

(6')

wherein $R_1$ is OH, a halogen atom, ONa, OK or $OR_{6b}$ (in which $R_{6b}$ represents a normal or branched alkyl group with 1 to 8 carbon atoms or a substituted or unsubstituted phenyl group); and $R_{6b}$ has the aforementioned meaning independently for each unit when plural units are present.

In polyhydroxyalkanoate of the present invention, $A_1$ may be p-phenylene:

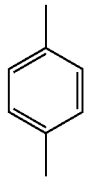

wherein at least one of $R_{5A}$, $R_{5B}$, $R_{5C}$, $R_{5D}$, $R_{5E}$, $R_{5F}$ and $R_{5G}$ represents $SO_2R_{5O}$ (in which $R_{5O}$ is OH, a halogen atom, ONa, OK or $OR_{5s}$; and $R_{5s}$ represents a normal or branched alkyl group with 1 to 8 carbon atoms or a substituted or unsubstituted phenyl group) and each of the others represents H, a halogen atom, an alkyl group with 1 to 20 carbon atoms, an alkoxy group with 1 to 20 carbon atoms, OH, $NH_2$, $NO_2$, $COOR_{5P}$ ($R_{5P}$ representing H, Na or K), an acetamide group, OPh, NHPh, $CF_3$, $C_2F_5$ or $C_3F_7$; and $R_{5A}$, $R_{5B}$, $R_{5C}$, $R_{5D}$, $R_{5E}$, $R_{5F}$, $R_{5G}$, $R_{5O}$, $R_{5P}$ and $R_{5s}$ have the aforementioned meanings independently for each unit when plural units are present;

and $R_{1a}$ is a normal or branched alkyl group with 1 to 8 carbon atoms or a substituted or unsubstituted phenyl group.

In polyhydroxyalkanoate of the present invention, $A_1$ may be o-phenylene:

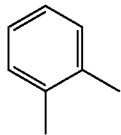

and $R_{1a}$ is a normal or branched alkyl group with 1 to 8 carbon atoms or a substituted or unsubstituted phenyl group.

In polyhydroxyalkanoate of the present invention, a substituent $-A_1SO_2R_1$ may be a group represented by a chemical formula (9'):

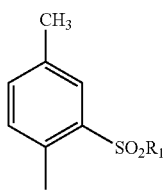

(9')

wherein $R_{1a}$ is a normal or branched alkyl group with 1 to 8 carbon atoms or a substituted or unsubstituted phenyl group.

In polyhydroxyalkanoate of the present invention, a substituent $-A_1SO_2R_1$ may be a group represented by a chemical formula (10'):

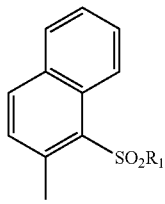

(10')

wherein $R_{1a}$ is a normal or branched alkyl group with 1 to 8 carbon atoms or a substituted or unsubstituted phenyl group.

In polyhydroxyalkanoate of the present invention, a substituent $-A_1SO_2R_1$ may be a group represented by a chemical formula (52'):

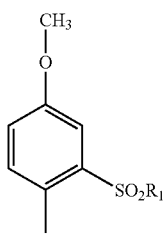

(52')

wherein $R_{1a}$ is a normal or branched alkyl group with 1 to 8 carbon atoms or a substituted or unsubstituted phenyl group.

In polyhydroxyalkanoate of the present invention, $A_1$ may be 1,8-naphthylene:

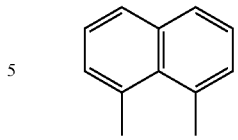

and $R_{1a}$ is a normal or branched alkyl group with 1 to 8 carbon atoms or a substituted or unsubstituted phenyl group.

Polyhydroxyalkanoate of the present invention may further comprise in addition to a unit represented by the chemical formula (1), at least one of a 3-hydroxy-ω-substituted alkanoic acid unit represented by a chemical formula (11):

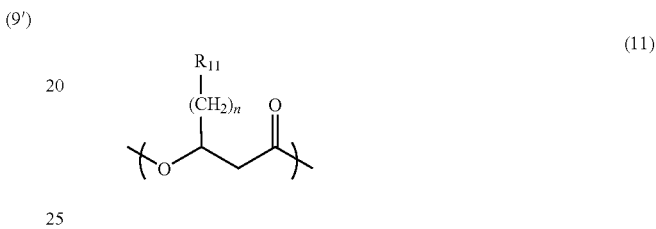

(11)

wherein n is an integer selected from a range of 1 to 8; $R_{11}$ represents a residue including a cyclic structure of either a phenyl structure or a thienyl structure; and, when plural units are present, n and $R_{11}$ have the aforementioned meaning independently for each unit; and a 3-hydroxy-ω-cyclohexyl alkanoic acid unit represented by a chemical formula (12):

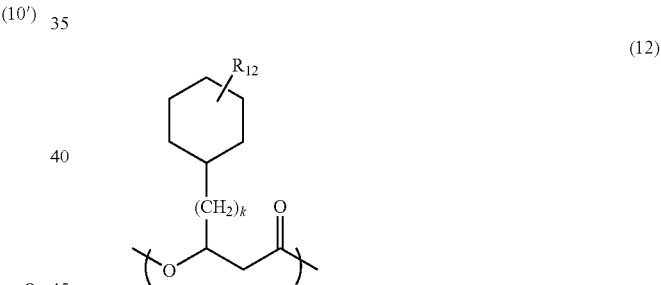

(12)

wherein $R_{12}$ represents H, CN, $NO_2$, a halogen atom, $CH_3$, $C_2H_5$, $C_3H_7$, $CF_3$, $C_2F_5$, or $C_3F_7$; and k represents an integer selected from a range of 0 to 8; and $R_{12}$ and k have the aforementioned meaning independently for each unit when plural units are present.

In polyhydroxyalkanoate of the present invention, $R_{11}$ may represent any one of chemical formulas (13), (14), (15), (16), (17), (18), (19), (20), (21), (22) and (23), which unit has the aforementioned meaning independently for each unit and, when plural units are present:

(13)

wherein $R_{13}$ represents H, a halogen atom, CN, $NO_2$, $CH_3$, $C_2H_5$, $C_3H_7$, CH=$CH_2$, $COOR_{13a}$ ($R_{13a}$ representing H, Na or K), $CF_3$, $C_2F_5$ or $C_3F_7$, which unit has the aforementioned meaning independently for each unit when plural units are present:

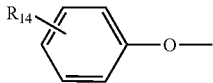
(14)

wherein $R_{14}$ represents H, a halogen atom, CN, $NO_2$, $CH_3$, $C_2H_5$, $C_3H_7$, $SCH_3$, $CF_3$, $C_2F_5$ or $C_3F_7$, which has the aforementioned meaning independently for each unit when plural units are present:

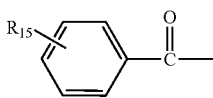
(15)

wherein $R_{15}$ represents H, a halogen atom, CN, $NO_2$, $CH_3$, $C_2H_5$, $C_3H_7$, $CF_3$, $C_2F_5$ or $C_3F_7$, which has the aforementioned meaning independently for each unit when plural units are present:

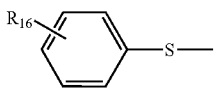
(16)

wherein $R_{16}$ represents H, a halogen atom, CN, $NO_2$, $COOR_{16a}$, $SO_2R_{16b}$ ($R_{16a}$ representing H, Na, K, $CH_3$ or $C_2H_5$, and $R_{16b}$ representing OH, ONa, OK, a halogen atom, $OCH_3$, or $OC_2H_5$), $CH_3$, $C_2H_5$, $C_3H_7$, $(CH_3)_2CH$ or $(CH_3)_3C$, which has the aforementioned meaning independently for each unit when plural units are present:

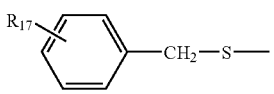
(17)

wherein $R_{17}$ represents H, a halogen atom, CN, $NO_2$, $COOR_{17a}$, $SO_2R_{17b}$ ($R_{17a}$ representing H, Na, K, $CH_3$ or $C_2H_5$, and $R_{17b}$ representing OH, ONa, OK, a halogen atom, $OCH_3$, or $OC_2H_5$), $CH_3$, $C_2H_5$, $C_3H_7$, $(CH_3)_2CH$ or $(CH_3)_3C$, which has the aforementioned meaning independently for each unit when plural units are present:

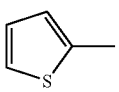
(18)

(19)

-continued

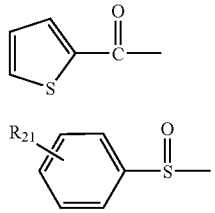
(20)

(21)

wherein $R_{21}$ represents H, a halogen atom, CN, $NO_2$, $COOR_{21a}$, $SO_2R_{21b}$ ($R_{21a}$ representing H, Na, K, $CH_3$ or $C_2H_5$, and $R_{21b}$ representing OH, ONa, OK, a halogen atom, $OCH_3$, or $OC_2H_5$), $CH_3$, $C_2H_5$, $C_3H_7$, $(CH_3)_2CH$ or $(CH_3)_3C$, which has the aforementioned meaning independently for each unit when plural units are present:

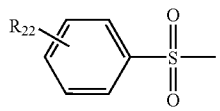
(22)

wherein $R_{22}$ represents H, a halogen atom, CN, $NO_2$, $COOR_{22a}$, $SO_2R_{22b}$ ($R_{22a}$ representing H, Na, K, $CH_3$ or $C_2H_5$, and $R_{22b}$ representing OH, ONa, OK, a halogen atom, $OCH_3$, or $OC_2H_5$), $CH_3$, $C_2H_5$, $C_3H_7$, $(CH_3)_2CH$ or $(CH_3)_3C$, which has the aforementioned meaning independently for each unit when plural units are present:

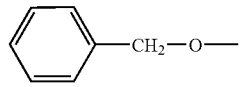
(23)

In polyhydroxyalkanoate of the present invention, a number-average molecular weight may be within a range from 1,000 to 1,000,000.

In the producing method of the present invention, the condensation reaction may be a reaction for forming an amide bond with a condensing agent. The condensing agent may be at least one selected from the group consisting of a phosphoric acid series condensing agent, a carbodiimide series condensing agent and an acid chloride series condensing agent.

In the producing method of the present invention, the condensation reaction may be a reaction of converting a carboxylic acid portion of the polyhydroxyalkanoate including a unit represented by the chemical formula (24) into an acid chloride and then causing a reaction with the compound represented by the chemical formula (25) thereby forming an amide bond. The condensation reaction may employ a thionyl chloride series condensing agent as the condensing agent.

In the charge control agent of the present invention, the powder material may be an electrostatic charge image developing toner.

In an image forming method of the present invention, the transfer step may comprise a first transfer step of transferring the toner image on the electrostatic latent image bearing member onto an intermediate transfer member, and a second transfer step of transferring the toner image on the intermediate transfer member onto the recording material.

In an image forming apparatus of the present invention, the transfer means may comprise a first transfer means which transfers the toner image on the electrostatic latent image bearing member onto an intermediate transfer member, and a second transfer means which transfers the toner image on the intermediate transfer member onto the recording material.

The polyhydroxyalkanoate, constituting an object of the present invention and represented by the chemical formula (1), is produced by a reaction of polyhydroxyalkanoate including a 3-hydroxy-ω-(4-carboxyphenyl) alkanoic acid unit represented by a chemical formula (24) and at least a compound represented by a chemical formula (25).

(Producing Method for Polyhydroxyalkanoate Including a Unit Represented by Chemical Formula (24))

The polyhydroxyalkanoate including a 3-hydroxy-ω-(4-carboxyphenyl)alkanoic acid unit represented by a chemical formula (24) is produced by an oxidation cleavage of a double bond portion of a polyhydroxyalkanoate including a 3-hydroxy-ω-(4-vinylphenyl) alkanoic acid unit represented by a chemical formula (28), or by an oxidation of a methyl group portion of a polyhydroxyalkanoate including a 3-hydroxy-ω-(4-methylphenyl)alkanoic acid unit represented by a chemical formula (54).

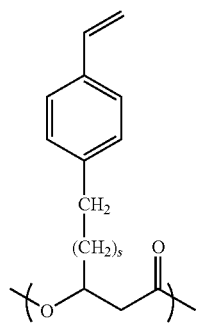

(28)

(wherein s stands for an integer selected from a range from 0 to 7, and in case of presence of plural units, s independently has the aforementioned meaning for each unit),

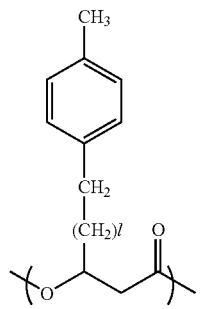

(54)

(wherein l stands for an integer selected from a range from 0 to 7, and in case of presence of plural units, l independently has the aforementioned meaning for each unit).

For obtaining a carboxylic acid by oxidizing a carbon-carbon double bond or a methyl group with an oxidant, there are known, for example, a method of utilizing a permanganate salt (J. Chem. Soc. Perkin. Trans. 1, 806 (1973), a method of utilizing a bichromate salt (Org. Synth., 4, 698 (1963)), a method of utilizing a periodate salt (J. Org. Chem., 46, 19 (1981), a method of utilizing nitric acid (Japanese Patent Application Laid-Open No. S59-190945), and a method of utilizing ozone (J. Am. Chem. Soc., 81, 4273 (1959)), and, on polyhydroxyalkanoate, the aforementioned Macromolecular chemistry, 4, 289-293 (2001) reports a method of obtaining a carboxylic acid by oxidizing the carbon-carbon double bond at the end of the side chain of polyhydroxyalkanoate with potassium permanganate as an oxidant and under an acidic condition. A similar method can be utilized also in the present invention.

A permanganate salt to be employed as the oxidant is usually potassium permanganate. Since the oxidation reaction is a stoichiometric reaction, an amount of the permanganate salt is usually 1 molar equivalent or more with respect to 1 mole of the unit represented by the chemical formula (28) or (54), preferably 2 to 10 molar equivalents.

For executing the reaction under an acidic condition, there is usually employed an inorganic acid such as sulfuric acid, hydrochloric acid, acetic acid or nitric acid, or an organic acid. However the use of sulfuric acid, nitric acid or hydrochloric acid may cause cleavage of an ester bond in the main chain of polyhydroxyalkanoate, thereby resulting in a decrease in the molecular weight. It is therefore preferable to employ acetic acid. An amount of acid is usually within a range of 0.2 to 2,000 molar equivalents per 1 mole of the unit represented by the chemical formula (28) or (54), preferably 0.4 to 1,000 molar equivalents. An amount less than 0.2 molar equivalents results in a low yield, while an amount exceeding 2,000 molar equivalents generates by-products by decomposition with acid. Also a crown ether may be employed for the purpose of accelerating the reaction. In such case, crown ether and permanganate salt form a complex, thereby providing an effect of increasing the reaction activity. As the crown ether, there is generally employed dibenzo-19-crown-6-ether, dicyclo-18-crown-6-ether, or 18-crown-6-ether. An amount of crown ether is generally within a range of 0.005 to 2.0 molar equivalents per 1 mole of permanganate salt, preferably 0.01 to 1.5 molar equivalents.

As a solvent to be employed in the oxidation reaction of the present invention, there may be employed any solvent inert to the reaction without particular limitation, for example, water, acetone; an ether such as tetrahydrofuran or dioxane; an aromatic hydrocarbon such as benzene, toluene or xylene; an aliphatic hydrocarbon such as hexane or heptane; or a halogenated hydrocarbon such as methyl chloride, dichloromethane or chloroform. Among these solvents, in consideration of dissolving property for polyydroxy alkanoate, there is preferred a halogenated hydrocarbon such as methyl chloride, dichloromethane or chloroform, or acetone.

In the aforementioned oxidation reaction of the present invention, a polyhydroxyalkanoate including a unit represented by the chemical formula (28) or (54), a permanganate salt and an acid may be reacted by being collectively charged with a solvent from the beginning, or by being respectively added in the reaction system continuously or intermittently. The reaction may be executed also by at first dissolving or suspending the permanganate salt only in the solvent, and adding the polyhydroxyalkanoate and the acid to the system either continuously or intermittently, or by at first dissolving or suspending the polyhydroxyalkanoate only in the solvent, and adding the permanganate salt and the acid to the system either continuously or intermittently. The reaction may also be executed by charging the polyhydroxyalkanoate and the acid at first and adding the permanganate salt to the system either continuously or intermittently, or by charging the permanganate salt and the acid at first and adding the polyhydroxyalkanoate to the system either continuously or intermittently, or by charging the polyhydroxyalkanoate and the permanganate salt at first and adding the acid to the system either continuously or intermittently.

A reaction temperature is selected generally within a range from −40 to 40° C., preferably −10 to 30° C. A reaction time depends on a stoichiometric ratio of the unit represented by the chemical formula (28) or (54) and permanganate salt and the reaction temperature, but is generally selected from a range of 2 to 48 hours.

Also a reaction can be executed in a similar condition, in addition to the 3-hydroxy-ω-(4-vinylpheyl)alkanoic acid unit represented by the chemical formula (28) and the 3-hydroxy-ω-(4-methylphenyl)alkanoic acid unit represented by the chemical formula (54), in case of utilizing polyhydroxyalkanoate including a 3-hydroxy-ω-substituted alkanoic acid unit represented by a chemical formula (11) or a 3-hydroxy-ω-cyclohexylalkanoic acid unit represented by a chemical formula (12).

(Producing method for polyhydroxyalkanoate including a unit represented by chemical formula (28) or (54))

Polyhydroxyalkanoate including a unit represented by the chemical formula (28) or (54), to be employed in the present invention, can be produced by a method utilizing microbial production, a method by a genetically engineered plant system or a method of chemical polymerization, though such method is not particular limited. In case such compound is produced by a method including a step of microbial production, the aforementioned polyhydroxyalkanoate is an isotactic polymer composed solely of an R-member, but such isotactic polymer is not necessary but an atactic polymer can also be employed as long as the objects of the present invention can be attained in physical properties and functions. The aforementioned polyhydroxyalkanoate can also be obtained by a method including a step of chemical synthesis utilizing, for example, a ring-opening polymerization of a lactone compound.

In the following there will be explained in detail a microbial production for producing polyhydroxyalkanoate of the present invention including the unit represented by the chemical formula (28) or (54).

The polyhydroxyalkanoate constituting a starting material is obtained by a producing method characterized in culturing the aforementioned microorganism in a culture medium including at least one of ω-(4-vinylpheyl)alkanoic acid represented by a chemical formula (29) or ω-(4-methylphenyl) alkanoic acid represented by a chemical formula (55).

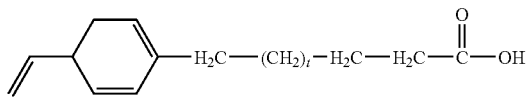

(29)

(wherein t is an integer selected from a range of 0 to 7);

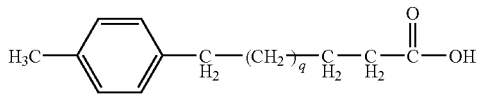

(55)

(wherein q is an integer selected from a range of 0 to 7).

A microorganism to be employed in a method for producing polyhydroxyalkanoate including a unit represented by the chemical formula (28) or (54) as a starting material of the present invention can be any microorganism having a PHA producing ability, namely any microorganism capable of producing a PHA type polyester including a 3-hydroxy-ω-(4-vinylpheyl)alkanoic acid unit represented by a chemical formula (28) or a 3-hydroxy-ω-(4-methylphenyl)alkanoic acid represented by a chemical formula (59) by a culture in a culture medium including ω-(4-vinylpheyl)alkanoic acid represented by a chemical formula (29) or ω-(4-methylphenyl) alkanoic acid represented by a chemical formula (55). A preferred example of the usable microorganism having the PHA producing ability includes a microorganism belonging to *pseudomonas* genus. Among these, there is more preferred a strain having a PHA producing ability but not showing an enzyme reactivity such as oxidation or epoxylation on a vinyl group substituted on a phenol group.

More specifically, among microorganisms belonging to *Pseudomonas*, more preferable species as the microorganism for use in the production method of the present invention may include *Pseudomonas cichorii*, *Pseudomonas putida*, *Pseudomonas fluorecense*, *Pseudomonas oleovolans*, *Pseudomonas aeruginosa*, *Pseudomonas stutzeri* and *Pseudomonas jessenii*.

Further, a more suitable strain includes, for example, *Pseudomonas cichorii* YN2 (FERM BP-7375), *Pseudomonas cichorii* H45 (FERM BP-7374), *Pseudomonas jessenii* P161 (FERM BP-7376) and *Pseudomonas putida* P91 (FERM BP-7373). These four types of strains are deposited on Nov. 20, 2000 at the International Patent Organism Depositary (IPOD) of National Institute of Advanced Industrial Science and Technology (AIST), Tsukuba Central 6, 1-1, Higashi 1-chome, Tsukuba-shi, Ibaraki-ken 305-8566, Japan, and described in Japanese Patent Application Laid-Open No. 2001-288256 and Japanese Patent Application Laid-Open No. 2002-80751.

In the producing method of the present invention, a culture medium to be employed in a culture step for the microorganisms can be any inorganic salt medium containing a phosphate salt and a nitrogen source such as an ammonium salt or a nitrate salt, and it is also possible to improve productivity of PHA by regulating a nitrogen source concentration in the culture medium in a process of causing the microorganisms to produce PHA.

In addition, nutrients such as an yeast extract, polypeptone and a meat extract can be added to the culture medium as a matrix for promoting the propagation of the microorganism. That is, peptides may be added as an energy source and a carbon source in the form of nutrients such as an yeast extract, polypeptone and a meat extract.

Alternatively, for the culture medium, saccharides, for example, aldoses such as glyceroaldehyde, erythrose, arabinose, xylose, glucose, galactose, mannose and fructose, alditols such as glycerol, erythritol and xylitol, aldonic acids such as gluconic acid, uronic acids such as glucuronic acid and galacturonic acid, and disaccharides such as maltose, sucrose and lactose may be used as an energy source and a carbon source consumed with propagation of the microorganism.

Instead of the above described saccharides, organic acids or salts thereof, more specifically organic acids involved in the TCA cycle and organic acids derived from a biochemical reaction with less steps by one or two steps than the TCA cycle, or water soluble salts thereof may be used. As the organic acid or salt thereof, hydroxycarboxylic acids and oxocarboxylic acids such as pyruvic acid, oxalacetic acid, citric acid, isocitric acid, ketoglutaric acid, succinic acid, fumaric acid, malic acid and lactic acid or water soluble salts thereof can be used. Alternatively, amino acids or salts thereof, for example amino acids such as asparaginic acid and glutamic acid or salts thereof can be used. When the organic acid or salt thereof is added, it is more preferable that one or more types are selected from a group consisting of pyruvic acid, oxalacetic acid, citric acid, isocitric acid, ketoglutaric acid, succinic acid, fumaric acid, malic acid, lactic acid and salts thereof, and are added to the culture medium and dissolved therein. Alternatively, when the amino acid or salt thereof is added, it is more preferable that one or more types are selected from a group consisting of asparaginic acid, glutamic acid and salts thereof, and are added to the culture medium and dissolved therein. At this time, as required, all or part thereof can be added in the form of a water soluble salt to be dissolved uniformly without affecting the pH of the culture medium.

It is desirable that the concentration of the above coexisting substrate added to the culture medium as a carbon source for growth of the microorganism and energy source for production of polyhydroxyalkanoate is usually selected so that it is in the range of from 0.05 to 5% (w/v), more preferably 0.2 to 2% (w/v) per culture medium. That is, for peptides, yeast extracts, organic acids or salts thereof, amino acids or salts thereof, and saccharides that are used as the above coexisting substrates, one or more types thereof may be added, and at this time, it is desirable that the total concentration of these added substrates is with in the above described range of total concentrations.

A content of a substrate for producing the desired polyhydroxyalkanoate, namely a content of ω-(4-vinylpheyl)alkanoic acid represented by the chemical formula (29) or ω-(4-methylphenyl)alkanoic acid represented by the chemical formula (55) is preferably selected from a range of 0.01 to 1% (w/v), more preferably 0.02 to 0.2% (w/v).

Also by including, in addition to the substrate for producing the desired polyhydroxyalkanoate, namely at least one of ω-(4-vinylpheyl)alkanoic acid represented by the chemical formula (29) and ω-(4-methylphenyl)alkanoic acid represented by the chemical formula (55), at least one of an ω-substituted alkanoic acid compound represented by a chemical formula (30) or at least one of an ω-cyclohexyl alkanoic acid compound represented by a chemical formula (31), it becomes possible to produce polyhydroxyalkanoate including, in addition to the 3-hydroxy-ω-(4-vinylpheyl)alkanoic acid unit represented by the chemical formula (28) or 3-hydroxy-ω-(4-methylphenyl)alkanoic acid unit represented by the chemical formula (55), a 3-hydroxy-ω-substituted alkanoic acid unit represented by the chemical formula (11) or a 3-hydroxy-ω-cyclohexyl alkanoic acid unit represented by the chemical formula (12).

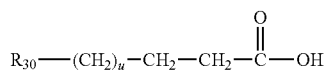

(30)

(wherein u is an integer selected from a range of 1 to 8; $R_{30}$ includes a cyclic structure of either a phenyl structure or a thienyl structure and represents either one of the foregoing chemical formulas (13), (14), (15), (16), (17), (18), (19), (20), (21), (22) and (23), and, when plural units are present, it independently has the aforementioned meaning for each unit).

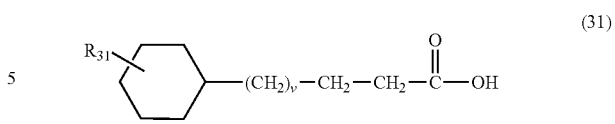

(31)

(wherein $R_{31}$ represents a substituent on a cyclohexyl group; $R_{31}$ represents H, CN, $NO_2$, halogen, $CH_3$, $C_2H_5$, $C_3H_7$, $CF_3$, $C_2F_5$, or $C_3F_7$, and v represents an integer selected from a range of 0 to 8.)

Any temperature at which microorganism strains to be used can suitably be propagated may be selected as a culture temperature, and an appropriate temperature is usually in the range of from about 15 to 37° C., more preferably from about 20 to 30° C.

Any culture method such as liquid culture and solid culture may be used for the culture as long as it allows propagation of microorganism and production of PHA. In addition, any type of culture method such as batch culture, fed-batch culture, semi-continuous culture and continuous culture may be used. Forms of liquid batch culture include a method of supplying oxygen while vibrating the microorganism in a vibration flask, and a method of supplying oxygen adopting a stirring ventilation system with a jar fermenter.

For the method of making the microorganism produce and accumulate PHA, a two-step culture method in which the microorganism is cultured by two steps may be adopted other than the one-step culture method in which the microorganism is cultured in an inorganic salt culture medium containing a phosphate and a nitrogen source such as an ammonium salt or a nitrate with a matrix added therein in a predetermined concentration as described above. In this two-step culture method, the microorganism is once propagated sufficiently in the inorganic salt culture medium containing a phosphate and a nitrogen source such as an ammonium salt or a nitrate with a matrix added therein in a predetermined concentration as a primary culture, and thereafter cells obtained by the primary culture are relocated to a culture medium with a matrix added therein in a predetermined concentration after limiting the amount of nitrogen source such as ammonium chloride contained in the culture medium, and are further cultured as a secondary culture, thereby making the microorganism produce and accumulate PHA. Use of this two-step culture method may improve the productivity of desired PHA.

Generally, a produced PHA type polyester has reduced water solubility because of the presence of hydrophobic atom groups such as 4-vinylphenyl group of a 3-hydroxy-ω-(4-vinylphenyl)alkanoic acid unit or 4-methylphenyl group of a 3-hydroxy-ω-(4-methylphenyl)alkanoic acid unit in the side chain, and is accumulated in cells of the microorganism capable of producing PHA, and therefore can easily be separated from the culture medium by collecting cells propagated by culture and involved in production and accumulation the desired PHA type polyester. After the collected cells are washed and dried, the desired PHA type polyester can be collected.

In addition, polyhydroxyalkanoate is usually accumulated in cells of such a microorganism capable of producing PHA. For the method of collecting desired PHA from these microorganism cells, a method that is usually used may be adopted. For example, extraction with organic solvents such as chloroform, dichloromethane, acetone and ethyl acetate is most convenient. Other than the above described solvents, dioxane, tetrahydrofuran and acetonitrile may be used. In addition, in a working environment in which use of any organic solvent is not preferred, a method in which in stead of solvent extraction, any one of a treatment by surfactants such as SDS, a treatment by enzymes such as lysozyme, a treatment by chemicals such as hypochlorites, ammonium and EDTA, an ultrasonic crashing method, a homogenizer method, a pressure crushing method, a bead impulse method, a grinding method, an immersion method and a freeze-thaw method is used to physically crush microorganism cells, followed by removing cell components other than PHA to collect PHA may be adopted.

In the following there will be shown, as an example of the inorganic salt culture medium employable in the producing method of the present invention, a composition of an inorganic salt M9 culture medium employed in the examples to be explained later.

| (Composition of M9 culture medium) | |
|---|---|
| $Na_2HPO_4$ | 6.3 |
| $KH_2PO_4$ | 3.0 |
| $NH_4Cl$ | 1.0 |
| NaCl | 0.5 |

(g/L; pH 7.0)

For satisfactory bacterial proliferation and improvement in resulting PHA productivity, the above-mentioned inorganic culture medium such as M9 culture medium has to be replenished with the essential minor elements such as minor metal elements, and it is extremely effective to add a following minor component solution by about 0.3%(w/v). The addition of such minor component solution is to supply minor metal elements etc. to be used in the microbial proliferation.

| [Composition of minor component solution] | |
|---|---|
| nytrilotriacetic acid | 1.5 |
| $MgSO_4$ | 3.0 |
| $MnSO_4$ | 0.5 |
| NaCl | 1.0 |
| $FeSO_4$ | 0.1 |
| $CaCl_2$ | 0.1 |
| $CoCl_2$ | 0.1 |
| $ZnSO_4$ | 0.1 |
| $CuSO_4$ | 0.1 |
| $AlK(SO_4)_2$ | 0.1 |
| $H_3BO_3$ | 0.1 |
| $Na_2MoO_4$ | 0.1 |
| $NiCl_2$ | 0.1 |

(g/L).

(Compound represented by chemical formula (25))

The compound represented by the chemical formula (25) and to be employed in the present invention can more specifically be a compound of a heterocyclic structure in which $A_{25}$ represents a substituted or unsubstituted normal or branched alkylene group with 1 to 8 carbon atoms, a substituted or unsubstituted phenyl group, a substituted or unsubstituted naphthyl group, or a substituted or unsubstituted heterocyclic structure including at least one of N, S and O. In case $A_{25}$ has a cyclic structure, a unsubstituted ring may be further condensed thereto.

Examples of a compound in which $A_{25}$ is a substituted or unsubstituted normal or branched alkylene group with 1 to 8 carbon atoms include 2-aminoethanesulfonic acid (taurin), 3-aminopropanesulfonic acid, 4-aminobutanesulfonic acid, 2-amino-2-methylpropanesulfonic acid and an alkali metal salt thereof.

In case $A_{25}$ is a substituted or unsubstituted phenyl group, it is represented by a chemical formula (32):

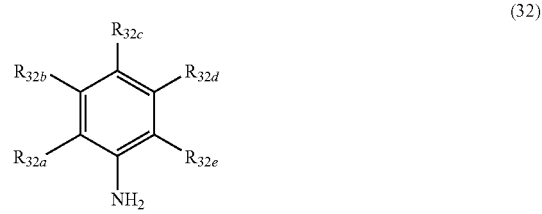

(32)

(wherein at least one of $R_{32a}$, $R_{32b}$, $R_{32c}$, $R_{32d}$ and $R_{32e}$ represents $SO_2R_{32f}$ (in which $R_{32f}$ is OH, a halogen atom, ONa, OK, $OR_{32h}$; and $R_{32h}$ represents a substituted or unsubstituted aliphatic hydrocarbon structure, a substituted or unsubstituted aromatic ring structure or a substituted or unsubstituted heterocyclic structure), and other represent a hydrogen atom, a halogen atom, an alkyl group with 1 to 20 carbon atoms, an alkoxy group with 1 to 20 carbon atoms, OH, $NH_2$, $NO_2$, $COOR_{32g}$ ($R_{32g}$ representing H, Na or K), an acetamide group, OPh, NHPh, $CF_3$, $C_2F_5$ or $C_3F_7$).

Examples of the compound represented by the chemical formula (32) include a derivative of aminobenzenesulfonic acid or a salt thereof such as p-aminobenzenesulfonic acid (sulfanylic acid), m-aminobenzenesulfonic acid, o-aminobenzenesulfonic acid, m-toluidine-4-sulfonic acid, o-toluidine-4-sulfonic acid sodium salt, p-toluidine-2-sulfonic acid, 4-methoxyaniline-2-sulfonic acid, o-anicidine-5-sulfonic acid, p-anicidine-3-sulfonic acid, 3-nitroaniline-4-sulfonic acid, 2-nitroaniline-4-sulfonic acid sodium salt, 4-nitroaniline-2-sulfonic acid sodium salt, 1,5-dinitroaniline-4-sulfonic acid, 2-aminophenol-4-hydroxy-5-nitrobenzenesulfonic acid, 2,4-dimethylaniline-5-sulfonic acid, sodium salt, 2,4-dimethylaniline-6-sulfonic acid, 3,4-dimethylaniline-5-sulfonic acid, 4-isopropylaniline-6-sulfonic acid, 4-trifluoromethylaniline-6-sulfonic acid, 3-carboxy-4-hydroxyaniline-5-sulfonic acid, or 4-carboxyaniline-6-sulfonic acid; an ester such as a methyl ester or a phenyl ester of an aminobenzenesulfonic acid or a salt thereof such as 2-aminoibenzenesulfonic acid methyl ester, 4-aminobenzenesulfonic acid methyl ester, 2-aminobenzenesulfonic acid phenyl ester, or 4-aminobenzenesulfonic acid phenyl ester.

In case $A_{25}$ is a substituted or unsubstituted napthyl group, it is represented by chemical formulas (32a) and (32b):

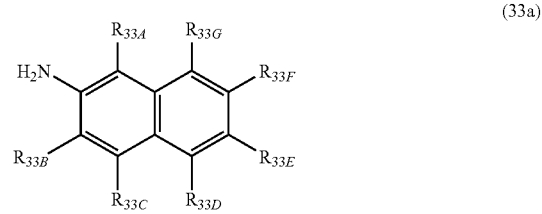

(33a)

(wherein at least one of $R_{33A}$, $R_{33B}$, $R_{33C}$, $R_{33D}$, $R_{33E}$, $R_{33F}$ and $R_{33G}$ represents $SO_2R_{33O}$ (in which $R_{33O}$ is OH, a halogen atom, ONa, OK, or $OR_{33O}$; and $R_{33O}$ represents a substituted or unsubstituted aliphatic hydrocarbon structure, a substituted or unsubstituted aromatic ring structure or a substituted or unsubstituted heterocyclic structure), and others represent a hydrogen atom, a halogen atom, an alkyl group with 1 to 20 carbon atoms, an alkoxy group with 1 to 20 carbon atoms, OH, $NH_2$, $NO_2$, $COOR_{33P}$ ($R_{33P}$ representing H, Na or K), an acetamide group, OPh, NHPh, $CF_3$, $C_2F_5$ or $C_3F_7$); and

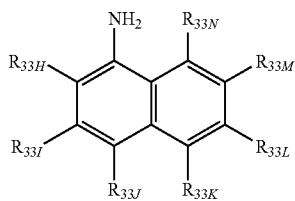

(33b)

(wherein at least one of $R_{33H}$, $R_{33I}$, $R_{33J}$, $R_{33K}$, $R_{33L}$, $R_{33M}$ and $R_{33N}$ represents $SO_2R_{33Q}$ (in which $R_{33Q}$ is OH, a halogen atom, ONa, OK, or $OR_{33r}$; and $R_{33r}$ represents a substituted or unsubstituted aliphatic hydrocarbon structure, a substituted or unsubstituted aromatic ring structure or a substituted or unsubstituted heterocyclic structure), and others represent a hydrogen atom, a halogen atom, an alkyl group with 1 to 20 carbon atoms, an alkoxy group with 1 to 20 carbon atoms, OH, $NH_2$, $NO_2$, $COOR_{33R}$ ($R_{33R}$ representing H, Na or K), an acetamide group, OPh, NHPh, $CF_3$, $C_2F_5$ or $C_3F_7$)

Examples of the compound represented by the chemical formulas (33a) and (33b) include a naphthylamine sulfonic acid derivative and a salt thereof such as 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-8-sulfonic acid, 2-naphthylamine-1-sulfonic acid, 2-naphthylamine-5-sulfonic acid, 1-naphthylamine-2-ethoxy-6-sulfonic acid, 1-amino-2-naphthol-4-sulfonic acid, 6-amino-1-naphthol-3-sulfonic acid, 1-amino-8-naphthol-2,4-sulfonic acid sodium salt, or 1-amino-8-naphthol-3,6-sulfonic acid sodium salt; and an ester such as a methyl ester or a phenyl ester of a naphthylamine sulfonic acid derivative and a salt thereof such as 1-naphthylamine-8-sulfonic acid methyl ester, 2-naphthylamine-1-sulfonic acid methyl ester, 1-naphthylamine-8-sulfonic acid phenyl ester, or 2-naphthylamine-1-sulfonic acid phenyl ester.

In case $A_{25}$ represents a substituted or unsubstituted heterocyclic structure including at least one of N, S and O, it can be, for example, a pyridine ring, a piperadine ring, a furan ring or a thiol ring.

(Producing method for polyhydroxyalkanoate represented by the chemical formula (1))

In the following there will be explained in detail a condensation reaction of polyhydroxyalkanoate including a unit represented by the chemical formula (24) of the invention and an aminosulfonic acid compound represented by the chemical formula (25). A condensation reaction of carboxyl group and amino group can be executed by a method utilizing a condensing agent, a method of forming a salt and executing condensation by a dehydration reaction, a method of utilizing a dehydrating agent, or a method of converting a carboxyl group into an acid chloride and reacting with an amino group.

As a producing method in the present invention, there will be explained in detail a method of utilizing a condensing agent.

As the condensing agent, there can be utilized a phosphoric acid series condensing agent, a carbodiimide series condensing agent, or an acid chloride series condensing agent, and, for example, as the phosphoric acid series condensing agent, there can be utilized a phosphorous acid ester condensing agent, a phosphoric acid chloride condensing agent, a phosphoric acid anhydride condensing agent, a phosphoric acid ester condensing agent, a phosphoric acid amide condensing agent, or a thienyl chloride condensing agent.

In the reaction of the present invention, it is preferable to employ a condensing agent based on a phosphorous acid ester. Examples of the phosphorous acid ester to be employed include triphenyl phosphite, trimethyl phosphite, triethyl phosphite, diphenyl phosphite, tri-o-tolyl phosphite, di-o-tolyl phosphite, tri-m-tolyl phosphite, di-m-tolyl phosphite, tri-p-tolyl phosphite, di-p-tolyl phosphite, di-o-chlorophenyl phosphite, tri-p-chlorophenyl phosphite, and di-p-chlorophenyl phosphite. Among these, triphenyl phosphite is preferably employed. Examples of the carbodiimide condensation agent may include dicyclohexylcarbodiimide (DCC), diisopropylcarbodiimide(DIPC), and N-ethyl-N'-3-dimethylaminopropylcarbodiimide (EDC=WSCI), and a hydrochloride thereof (WSCI.HCl). DCC or WSCI may be used in combination with N-hydroxysuccinimide (HONSu), 1-hydroxybenzotriazole (HOBt), 3-hydroxy-4-oxo-3,4-dihydro-1,2,3-benzotriazine (HOObt), or the like. An amount of the condensing agent is 0.1 times or larger in moles with respect to the compound represented by the chemical formula (25), preferably an equimolar amount or larger. Also the condensing agent itself may be employed as a reaction solvent.

An amount of the compound represented by the chemical formula (25) to be employed in the present invention is 0.1 to 50.0 times in moles with respect to a unit represented by the chemical formula (24) to be employed as a starting material, preferably 1.0 to 20.0 times in moles.

In the reaction of the present invention, a solvent may be employed according to the necessity. Examples of the solvent to be employed include a hydrocarbon such as hexane, cyclohexane or heptane, a ketone such as acetone or methyl ethyl ketone, an ether such as dimethyl ether, diethyl ether or tetrahydrofuran, a halogenated hydrocarbon such as dichloromethane, chloroform, carbon tetrachloride, dichloroethane, or trichloroethane, an aromatic hydrocarbon such as benzene or toluene, a non-protonic polar solvent such as N,N-dimethylformamide, or dimethylsulfoxide, and a pyridine derivative. Pyridine is particularly preferably employed. An amount of the solvent can be suitably determined according to kinds of a starting material and a base, and reaction conditions.

In the method of the present invention, a reaction temperature is not particularly restricted, but is usually within a range from 0° C. to a boiling point of the solvent. It is however desirable to execute the reaction at an optimum temperature matching a condensing agent to be employed.

In the method of the present invention, a reaction time cannot be defined in general, but is usually within a range from 1 to 48 hours.

In the present invention, a reaction liquid including the generated polyhydroxyalkanoate represented by the chemical formula (1) can be eliminated by distillation in the ordinary manner. Otherwise, the desired polyhydroxyalkanoate represented by the chemical formula (1) can be recovered through a re-precipitation, by uniformly mixing the reaction liquid with a solvent, for example, water, an alcohol such as methanol or ethanol, or an ether such as dimethylether, diethylether or tetrahydrofuran which does not dissolve polyhydroxyalkanoate represented by the chemical formula (1). Thus obtained polyhydroxyalkanoate represented by the chemical formula (1) can be isolated and purified if necessary. A method of such isolation and purification is not particularly restricted and there can be employed, for example, a method of reprecipitation with a solvent not dissolving polyhydroxyalkanoate represented by the chemical formula (1), or a method based on column chromatography.

(Producing method for polyhydroxyalkanoate represented by the chemical formula (27))

In case $R_1$ in the chemical formula (1) is OH, a halogen atom, ONa or OK as shown in the chemical formula (26), it is possible to synthesize polyhydroxyalkanoate in which R is -$A_{39}$-$SO_3CH_3$ as represented in a chemical formula (27), employing trimethylsilyl diazomethane which is a methylesterifying agent. In the following, such reaction will be explained in detail.

In the reaction of the present invention, a solvent may be employed according to the necessity. Examples of the solvent to be employed include a hydrocarbon such as hexane, cyclohexane or heptane, an alcohol such as methanol or ethanol, an ether such as dimethyl ether, diethyl ether or tetrahydrofuran, a halogenated hydrocarbon such as dichloromethane, chloroform, carbon tetrachloride, dichloroethane, or trichloroethane, an aromatic hydrocarbon such as benzene or toluene, a non-protonic polar solvent such as N,N-dimethylformamide, or dimethylsulfoxide, and a pyridine derivative. Chloroform or methanol is particularly preferably employed. An amount of the solvent can be suitably determined according to the kind of a starting material and reaction conditions.

An amount of trimethylsilyl diazomethane is within a range of 0.1 to 50 times in moles with respect to the compound represented by the chemical formula (26).

In the method of the present invention, a reaction temperature is not particularly restricted, but is usually within a range from −20 to 30° C. In the method of the present invention, a reaction time cannot be defined in general, but is usually within a range from 1 to 48 hours.

In the present invention, a reaction liquid including the generated polyhydroxyalkanoate represented by the chemical formula (27) can be eliminated by distillation in the ordinary manner. Otherwise, the desired polyhydroxyalkanoate represented by the chemical formula (27) can be recovered through a re-precipitation, by uniformly mixing the reaction liquid with a solvent, for example, water, an alcohol such as methanol or ethanol, or an ether such as dimethylether, diethylether or tetrahydrofuran which does not dissolve polyhydroxyalkanoate represented by the chemical formula (27). Thus obtained polyhydroxyalkanoate represented by the chemical formula (27) can be isolated and purified if necessary. A method of such isolation and purification is not particularly restricted and there can be employed, for example, a method of reprecipitation with a solvent not dissolving polyhydroxyalkanoate represented by the chemical formula (27), or a method based on column chromatography.

Application to Toner

The polyhydroxyalkanoate of the present invention is applied to an electrostatic latent image developing toner and an image formation process using the same. More specifically, the inventive polyhydroxyalkanoate can be used as a charge control agent internally or externally added.

That is to say, the present invention relates to a charge control agent comprising the above polyhydroxyalkanoate, and further, it relates to an electrostatic latent image developing toner comprising the charge control agent. Furthermore, the present invention relates to an image forming method, which comprises an electrification step of applying a voltage to an electrification member from the outside to uniformly electrify an electrostatic latent image carrier, a development step of forming a toner image on the electrified electrostatic latent image carrier, a transferring step of transferring the toner image on the electrified electrostatic latent image carrier to an object transfer material with or without an intermediate transferring member, and a heat-fixation step of heat-fixing the toner image on the material. Still further, the present invention relates to an image forming apparatus having each means corresponding to the above each step of the above method, that is, electrification means, development means, transferring means, and heat-fixation means.

<Use as charge control agent>

In the structure of polyhydroxyalkanoate to be employed in the present invention, it is important that, as in the monomer unit represented by the chemical formula (1), a side chain has a structure including a sulfonic acid group or a derivative thereof. A unit having such anionic or electron-attracting group is preferable for further increasing a negative chargeability, and the charge control agent of the present invention in fact has an excellent negative chargeability.

The polyhydroxyalkanoate to be employed in the present invention has a satisfactory mutual solubility with binder resin, particularly with polyester binder resin. A toner containing the polyhydroxyalkanoate of the present invention, having a high specific charge amount and a satisfactory stability in time, can stably provide a sharp image in the electrostatic image formation even after prolonged storage, and, being colorless or only very slightly colored and being satisfactorily chargeable negatively, can be formed as negatively chargeable black or color toner.

Also, the mutual solubility can be adjusted within a wide range by suitably selecting type/composition of the monomer units constituting the polyhydroxyalkanoate of the present invention.

By selecting the resin composition in such a manner that the charge control agent assumes a microscopic phase-separation structure in the toner binder, the toner can stably hold the charge because electric continuity is not generated in the toner. Also the polyhydroxyalkanoate of the present invention, not containing heavy metals and being free from polymerization inhibiting effect by a heavy metal as encountered in a metal-containing charge control agent, can produce stably the toner in toner preparation by suspension polymerization or emulsion polymerization.

(Addition of PHA to Toner)

In the present invention, the aforementioned compound may be added to the toner by internal addition or by external addition. In case of internal addition, an addition amount in the mass ratio of the charge control agent to the toner binder is usually within a range of 0.1 to 50 mass %, preferably 0.2 to 20 mass %. An amount less than 0.1 mass % is undesirable because of an insufficient improvement in the charging ability of toner. Also an amount exceeding 50 mass % is undesirable because of economical standpoint. Also in case of external addition, the mass ratio of the charge control agent to the toner binder is preferably within a range of 0.01 to 5 mass %, and the charge control agent is preferably fixed to the toner surface in a mechanochemical manner. Further, polyhydroxyalkanoate of the present invention can be used in combination with a known charge control agent.

Polyhydroxyalkanoate of the present invention, in case of use as a charge control agent, normally has a number-average molecular weight of 1,000 to 1,000,000, preferably 1,000 to 300,000. At a molecular weight less than 1,000, it is completely dissolved in the toner binder and does not easily form discontinuous domains, thereby resulting in insufficient charge amount and detrimentally affecting the flowability of toner. Also at a molecular weight exceeding 1,000,000, the dispersion in the toner becomes difficult.

The molecular weight of polyhydroxyalkanoate of the present invention was measured by GPC (gel permeation chromatography). More specifically, polyhydroxyalkanoate of the present invention was dissolved in advance in dimethylformamide (DMF) or chloroform containing LiBr in 0.1 mass %, and plural samples were measured in a similar moving phase and the molecular weight distribution was determined from a calibration line of a standard polystyrene resin.

In the present invention, in case of use as a charge control agent, it is preferable to employ polyhydroxyalkanoate in which a ratio (Mw/Mn) of the weight-average molecular weight Mw and the number-average molecular weight Mn is within a range of 1 to 10.

In the present invention, it is preferred that the polyhydroxyalkanoate to be employed as a charge control agent has a melting point within a range of 20 to 150° C., particularly 40 to 150° C., or does not have a melting point but has a glass transition point within a range of 10 to 150° C., particularly 20 to 150° C. In case the melting point is lower than 20° C. or the melting point is absent but the glass transition point is lower than 20° C., the flowability and storability of the toner tend to be affected detrimentally. Also in case the melting point is higher than 150° C. or the melting point is absent but the glass transition point is higher than 150° C., it becomes difficult to blend the charge control agent in the toner and the charge amount distribution tends to become broad.

The melting point Tm and the glass transition point Tg can be measured, for example, by a highly precise scanning differential thermal analyzer of internal input compensation type such as Perkin Elmer DSC-7.

In the electrostatic charge image developing toner of the present invention, a mass ratio of the charge control agent to the toner binder is usually within a range of 0.1 to 50 mass %, preferably 0.2 to 20 mass %, more preferably 0.5 to 20 mass %. The electrostatic charge image developing toner of the present invention has a composition, based on the toner mass, containing 0.1 to 50 mass % of the aforementioned charge control agent, 20 to 95 mass % of a toner binder and 0 to 15 mass % of a coloring agent, and, if necessary, it may contain a magnetic powder (powder of ferromagnetic metal such as iron, cobalt or nickel or a compound such as magnetite, hematite or ferrite) also serving as a coloring agent in an amount not exceeding 60 mass %. There may also be contained various additives (lubricant (such as polytetra-fluoroethylene, low molecular weight polyolefin, fatty acid or a metal salt or an amide thereof) and another charge control agent (such as a metal azo dye, or a salicylic acid metal salt). Also there may be used hydrophobic colloidal silica powder or the like for improving flowability of toner. The amount of these additives does not usually exceed 10 mass % based on the toner mass.

In the toner of the present invention, it is preferable that at least a part of the toner binder constitutes a continuous phase while at least a part of the charge control agent forms a discontinuous domain. In comparison with a case where the charge control agent is completely dissolved in the toner binder without forming discontinuous domain, the added charge control agent tends to be more exposed on the toner surface, thereby exhibiting effect with a smaller addition amount. The dispersion particle size of such domain is preferably within a range of 0.01 to 4 µm, more preferably 0.05 to 2 µm. A particle size exceeding 4 µm results in an insufficient dispersibility and a wider charge amount distribution, thus deteriorating the transparency of the toner. On the other hand, a case of the particle size less than 0.01 µm is similar to the situation where the charge control agent does not form discontinuous domain but is completely dissolved in the toner binder and requires the addition of the charge control agent in a large amount. The state that at least a part of the charge control agent forms a discontinuous domain, and the dispersion particle size thereof can be confirmed by observing slices of the toner under a transmission electron microscope or the like. In order to clearly observe the interface, it is effective to execute the electron microscopic observation after dyeing the toner slices with ruthenium tetroxide or osmium tetroxide.

Also in order to reduce the particle size of the discontinuous domain formed by polyhydroxyalkanoate of the present invention, it is possible to add a polymer having mutual solubility with the polyhydroxyalkanoate of the present invention and mutual solubility also with the toner binder, as a mutual solubilizing agent. Examples thereof include a polymer in which a polymer chain containing, by at least 50 mol %, a monomer of a structure substantially same as that of the monomer constituting polyhydroxyalkanoate of the present invention, and a monomer chain containing, by at least 50 mol %, a monomer of a structure substantially same as that of the monomer constituting the toner binder are combined in graft or block manner. The amount of the mutual solubilizing agent with respect to polyhydroxyalkanoate of the present invention does not usually exceed 30 mass %, is preferably within a range of 1 to 10 mass %.

<Other constitutional materials>

Other constitutional materials constituting the electrostatic latent image developing toner of the present invention will be explained below. The electrostatic latent image developing toner of the present invention comprises a binder resin, a coloring agent and other additives that are added as necessary, as well as the above charge control agent.

(Binder resin)

The binder resin of the present invention can be preferably used as a binder resin. However, general thermoplastic resins can also be used as the binder resin. For example, the following resins can be used: polystyrene, polyacrylic acid ester, a styrene-acrylic acid ester copolymer, polyvinyl chloride, polyvinyl acetate, polyvinylidene chloride, a phenol resin, an epoxy resin, or a polyester resin. Such a thermoplastic resin is not particularly limited, and any thermoplastic resin can be used, as long as it is commonly used for the production of a toner.

Also the charge control agent of the present invention may be mixed in advance with a binder resin prior to the formation of a toner, and used as a toner binder composition of the present invention, having a charge controlling ability. Examples of such binder resin includes a styrene polymer, a polyester polymer, an epoxy polymer, a polyolefin polymer and a polyurethane polymer, which may be used singly or in a mixture.

(Other biodegradable plastics)
(Specific Examples of other Resins)

Examples of the styrene-based polymer include copolymers of styrene and (meth)acrylic acid ester, copolymers of these monomers and other monomer copolymerizable therewith, copolymers of styrene and a diene-based monomer (butadiene, isoprene or the like) and copolymers of these monomers and other monomers copolymerizable therewith, and the like. The polyester-based polymer includes polycondensation products between an aromatic dicarboxylic acid and an alkylene oxide adduct of an aromatic diol and the like. The epoxy-based polymer includes reaction products between an aromatic diol and epichlorohydrin and modified products thereof and the like. The polyolefin-based polymer includes polyethylene, polypropylene and copolymer chains of these and other monomers copolymerizable therewith, and the like. The polyurethane-based polymer includes polyaddition products between an aromatic diisocyanate and an alkylene oxide adduct of an aromatic diol and the like.

Specific examples of the binder resin used in combination with the electrical charge controlling agent of the present invention include polymers of polymerizable monomers described below, mixtures of these or copolymerization products obtained by using two or more polymerizable monomers described below. Specifically, such polymers include, for example, styrene-based polymers such as styrene/acrylic acid copolymers, or styrene/methacrylic acid-based copolymers, polyester-based polymers, epoxy-based polymers, polyolefin-based polymers, polyurethane-based polymers and the like, which are suitably used.

Specific examples of the polymerizable monomer includes styrene and derivatives of styrene, for example, styrene; styrene derivatives, such as o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; ethylenically unsaturated monoolefins, such as ethylene, propylene, butylene, and isobutylene; unsaturated polyenes, such as butadiene; vinyl halides, such as vinyl chloride, vinylidene chloride, vinyl bromide, and vinyl fluoride; vinyl esters, such as vinyl acetate, vinyl propionate, and vinyl benzoate; α-methylene-aliphatic monocarboxylic acid esters, such as methyl methacrylate, ethyl methacrylate, propyl methacrylate, methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylic acid esters, such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; vinyl ethers, such as vinyl methyl ether, vinyl ethyl ether, and vinyl isobutyl ether; vinyl ketones, such as vinyl methyl ketone, vinyl hexyl ketone, and methyl isopropenyl ketone; N-vinyl compounds, such as N-vinylpyrrole, N-vinylcarbazole, N-vinylindole, and N-vinylpyrrolidone; vinylnaphthalenes; acrylic acid or methacrylic acid derivatives, such as acrylonitrile, methacrylonitrile, and acrylamide; dicarboxylic acids, such as maleic acid, phthalic acid, succinic acid, terephthalic acid; esters of the above-mentioned α, β-unsaturated esters and diesters of dibasic acids such as methyl maleate, butyl maleate, and dimethyl maleate; polyol compounds, such as ethylene glycol, diethylene glycol, triethylene glycol, 1,2-propylene glycol, 1,3-propylene glycol, 1,4-butanediol, 1,6-hexanediol, bisphenol A, hydrogenated bisphenol A, and polyoxyethylenated bisphenol A; isocyanates, such as p-phenylene diisocyanate, p-xylylene diisocyanate, and 1,4-tetramethylene diisocyanate; amines, such as ethylamine, butylamine, ethylenediamine, 1,4-diaminobenzene, 1,4-diaminobutane, and monoethanolamine; epoxy compounds, such as diglycidyl ether, ethylene glycol diglycidyl ether, bisphenol A glycidyl ether, and hydroquinone diglycidyl ether; and so forth.

(Crosslinking Agent)

In the case of forming a binder resin, which is used in combination with the electrical charge controlling agent of the present invention, crosslinking agents described below may be used as necessary. Examples of the bifunctional crosslinking agent include divinylbenzene, bis(4-acryloxy-polyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, polyethylene glycol #200 diacrylate, polyethylene glycol #400 diacrylate, polyethylene glycol #600 diacrylate, dipropylene glycol diacrylate, polypropylene glycol diacrylate, polyester type diacrylates (MANDA, trade name; available from Nippon Kayaku Co., Ltd.), and the above diacrylates whose acrylate moiety has been replaced with dimethacrylate.

More than bifunctional, that is, polyfunctional cross-linking agents may include pentaerythritol triacrylate, trimethylolethane triacrylate, trimethylolpropane triacrylate, tetramethylolmethane tetraacrylate, oligoester acrylate, and the above compounds whose acrylate moiety has been replaced with methacrylate, and also 2,2-bis(4-methacryloxypolyethoxyphenyl)propane, diallyl phthalate, triallyl cyanurate, triallyl azo cyanurate, triallyl isocyanurate and diaryl chlorendate.

(Polymerization initiator)

In the case of forming a binder resin, which is used in combination with the electrical charge controlling agent of the present invention, polymerization initiators described below may be used as necessary. The polymerization initiator includes, for example, t-butyl peroxy-2-ethylhexanoate, cumene perpivalate, t-butyl peroxylaurate, benzoyl peroxide, lauroyl peroxide, ocatanoyl peroxide, di-t-butyl peroxide, t-butylcumyl peroxide, dicumyl peroxide, 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1-bis(t-butylperoxy)-3,3,5-trimethylcyclohexane, 1,1-bis(t-butylperoxy)cyclohexane, 1,4-bis(t-butylperoxycarbonyl)cyclohexane, 2,2-bis(t-butylperoxy)octane, n-butyl-4,4-bis(t-butylperoxy)valerate, 2,2-bis(t-butylperoxy)butane, 1,3-bis(t-butylperoxyisopropyl)benzene, 2,5-dimethyl-2,5-di(t-butylperoxy)hexane, 2,5-dimethyl-2,5-di(t-butylperoxy)hexane, 2,5-dimethyl-2,5-di(benzoylperoxy)hexane, di-t-butyl diperoxyisophthalate, 2,2-bis(4,4-di-t-butylperoxycyclohexyl)propane, di-t-butyl peroxy-α-methylsuccinate, di-t-butyl peroxydimethylglutarate, di-t-butyl peroxyhexahydroterephthalate, di-t-butyl peroxyazelate, 2,5-dimethyl-2,5-di(t-butylperoxy)hexane, diethylene glycol bis(t-butylperoxycarbonate), di-t-butyl peoxytrimethyladipate, tris(t-butylperoxy)triazine, vinyl tris (t-butylperoxy)silane and the like. These may be used singly or in combination. As for the amount thereof, they may be used in a concentration of 0.05 mass parts or more, preferably from 0.1 to 15 mass parts per 100 mass parts of the monomer.

(Other biodegradable plastics)

In addition, in the present invention, biodegradable plastics are preferably used. Examples of the biodegradable plastics are "Ecostar," "Ecostar plus" (produced by Hagiwara Industries, Inc.), "Biopole" (produced by Monsanto Company), "Ajicoat" (Ajinomoto Co., Ltd.), "Cell Grain" (produced by Daicel Chem., Ind., Ltd.), "Bionolle" (produced by Showa Highpolymer K.K.), "Eco-plastic" (produced by Toyota Motor Corporation), "Lacea" (produced by Mitsui Chemicals, Inc.), "Biogreen" (produced by Mitsubishi Gas Chemical Company Inc.), "Natureworks" (produced by Cargill-dow), "Biomax" (Dupont) and the like.

Of these, polycaprolactone (i.e., an ε-caprolactone copolymer) or the polylactic acid is particularly preferable in that these compounds are easily and completely decomposed by lipase, esterase, etc., and in that they are easily blended with other resins and their physical properties are easily modified by copolymerization or the like.

In a combination of such binder resin and the charge control agent of the present invention, it is preferable that a polymer structure of the binder resin and a polymer structure of the polymer chain of the charge control agent are as similar as possible. A significant difference in the polymer structure of the binder resin and the polymer structure of the polymer chain in the charge control agent tends to cause an insufficient dispersion of the charge control agent in the binder resin.

A mass ratio of the charge control agent of the present invention internally added to the binder resin is usually 0.1 to 50 mass %, preferably 0.2 to 20 mass %. A mass ratio of the internally added charge control agent less than 0.1 mass % results in a low charge amount, while that exceeding 50 mass %. deteriorates a charge stability of the toner.

<Electrical charge controlling agent other than PHA>

A commonly used electrical charge controlling agent can be used with charge control agent of the present invention. Specific examples of such an electrical charge controlling agent may include nigrosine dyestuff, quaternary ammonium salts, and monoazo metallic complex salt dyestuff. The additive amount of an electrical charge controlling agent can be determined, considering various conditions such as the electrification characteristic of the binder resin, the production method including the additive amount of a coloring agent and a dispersion method, and the electrification characteristic of other additives. The electrical charge controlling agent can be added generally at a ratio of 0.1 to 20 parts by mass, and preferably at a ratio of 0.5 to 10 parts by mass with respect to 100 parts by mass of binder resin. Other than the above described substances, inorganic particles of metallic oxide, or inorganic substances whose surface is treated with the above organic substances, may also be used. These electrical charge controlling agents may be mixed into the binder resin, or may be attached on the surface of toner particles.

<Colorant>

As for the colorant that constitutes the electrostatic charge image developing toner of the present invention, any colorant that is generally used in producing toners may be used and is not particularly limited. For example, carbon black, titanium white, monoazo red pigments, disazo yellow pigments, quinacridone magenta pigments, anthraquinone pigments, any other pigments and/or dyes may be used.

More concretely speaking, when the electrostatic charge image developing toner of the present invention is used as a magnetic color toner, the colorant that can be used includes, for example, C.I. Direct Red 1, C.I. Direct Red. 4, C.I. Acid Red 1, C.I. Basic Red 1, C.I. Mordant Red 30, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Direct Green 6, C.I. Basic Green 4, C.I. Basic Green 6, etc.

As the pigment, there may be used chrome yellow, cadmium yellow, mineral fast yellow, navel yellow, naphthol yellow S, Hansa yellow G, permanent yellow NCG, tartrazine lake, chrome orange, molybdenum orange, permanent orange GTR, pyrazolone orange, benzidine orange G, cadmium red, permanent red 4R, watching red calcium salt, eosin lake, brilliant carmine 3B, manganese violet, fast violet B, methyl violet lake, Prussian blue (iron blue), cobalt blue, alkali blue lake, victoria blue lake, phthalocyanine blue, fast sky blue, indanthrene blue BC, chrome green, chromium oxide, pigment green B, malachite green lake, final yellow green G and the like.

Further, when the electrostatic charge image developing toner of the present invention is used as a toner for two-component full color toner, the following may be used as a colorant. Examples of the coloring pigment for magenta color toner include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 202, 206, 207, and 209, C.I. Pigment Violet 19, C.I. Vat Red 1, 2, 10, 13, 15, 23, 29, and 35, etc.

In the present invention, the above-cited pigments may be used singly. However, it is more preferred that a dye and a pigment are used in combination to increase sharpness of the pigment in consideration of the image quality of full color images. Examples of the dye for magenta used in this case include oil-soluble dyes, such as C.I. Solvent Red 1, 3, 8, 23, 24, 25, 27, 30, 49, 81, 82, 83, 84, 100, 109, and 121, C.I. Disperse Red 9, C.I. Solvent Violet 8, 13, 14, 21, and 27, C.I. Disperse Violet 1, etc.; basic dyes, such as C.I. Basic Red 1, 2, 9, 12, 13, 14, 15, 17, 18, 22, 23, 24, 27, 29, 32, 34, 35, 36, 37, 38, 39, 40, C.I. Basic Violet 1, 3, 7, 10, 14, 15, 21, 25, 26, 27, and 28; etc.

Other coloring pigments include cyan coloring pigments, such as C.I. Pigment Blue 2, 3, 15, 16, and 17, C.I. Vat Blue 6, C.I. Acid Blue 45 and copper phthalocyanine pigments having a phthalocyanine skeleton substituted with 1 to 5 phthalimidomethyl groups, etc.

Examples of the coloring pigment for yellow include C.I. Pigment Yellow 1, 2, 3, 4, 5, 6, 7, 10, 11, 12, 13, 14, 15, 16, 17, 23, 65, 73, and 83, C.I. Vat Yellow 1, 3, and 20, etc.

The dyes and pigments as described above may be used singly or as optional mixtures in order to obtain a desired color tone of the toner. Taking into consideration environmental protection or safety for the human body, various kinds of edible coloring matter such as edible lake may be suitably used. Examples of such a food color may include food red 40 aluminum lake, food red 2 aluminum lake, food red 3 aluminum lake, food red 106 aluminum lake, food yellow 5 aluminum lake, food yellow 4 aluminum lake, food blue 1 aluminum lake, and food blue 2 aluminum lake.

The above water-insoluble food colors can be function as electrical charge controlling agents. In this case, the above aluminum lake can be preferably used for negative charge. Thus, when a water-insoluble food color has a function as an electrical charge controlling agent, it cannot only improve the safety of a toner to the environment, but also can contribute to the cost-reduction of the toner.

The content of the above-mentioned colorants in the toner may be varied widely depending on a desired coloring effect or other factors. Usually, to obtain the best toner characteristics, that is, taking into consideration coloring power of printing, shape stability of toner, flying of toner and so forth, the colorants are used in a proportion of usually from 0.1 to 60 mass parts, preferably from 0.5 to 20 mass parts per 100 mass parts of the binder resin.

<Other Components of Toner>

The electrostatic charge image developing toner of the present invention may contain, besides the above-mentioned binder resin and colorant components, the compounds described below within the range in which they do not give adverse influence on the effects of the present invention. Examples of such compounds include aliphatic or alicyclic hydrocarbon resins and aromatic petroleum resins, such as silicone resin, polyester, polyurethane, polyamide, epoxy resin, polyvinyl butyral, rosin, modified rosin, terpene resin, phenol resin, low molecular weight polyethylene, and low molecular weight polyproplene, and chlorinated paraffin, paraffin wax, and so forth. Preferably usable waxes among these specifically include low molecular weight polypropylene and side products thereof, low molecular weight polyesters and ester-based waxes, aliphatic derivatives thereof. Also, waxes prepared by fractionation of these waxes according to molecular weight by various methods may be preferably used in the present invention. Further, after the fractionation, oxidation, block copolymerization or graft modification may be performed.

In particular, the electrostatic charge image developing toner of the present invention exhibits excellent characteristics in the case where laminagraphic observation performed with a transmission electron microscope (TEM) shows that the wax component is dispersed in the binder resin in the form of substantially spherical and/or spindle-shaped islands.

<Toner Production Process>

As a specific method for producing the electrostatic charge image developing toner of the present invention having the above constitution, any one of known methods may be used. The electrostatic charge image developing toner of the present invention can be produced by the so-called pulverization method in which a toner is obtained, for example, by the following processes.

That is, stated specifically, the electrostatic charge image developing toner of the present invention can be obtained as follows: resins such as a binder resin, and a electrical charge controlling agent and a wax that is added as needed are sufficiently mixed in a mixer such as a Henschel mixer, a ball mill or the like and melt-kneaded by using a thermal kneader such as a heat roll, a kneader or an extruder to make the resins compatible with each other. Then, a pigment, dye or magnetic material as a colorant, and an additive that is added as needed, such as a metal compound, are dispersed or dissolved in the kneaded resin and cooled and solidified. The solid is then pulverized by a pulverizer such as a jet mill or a ball mill and classified to produce the electrostatic charge image developing toner of the present invention having a desired particle size. In the classification step, it is preferred to use a multi-segment classifier to increase the production efficiency.

The electrostatic charge image developing toner of the present invention can be obtained also by the following method. That is, a binder resin and the electrical charge controlling agent are mixed in the form of solutions by using a solvent or solvents (aromatic hydrocarbons such as toluene and xylene, halides such as chloroform and ethylene dichloride, ketones such as acetone and methyl ethyl ketone, amides such as dimethylformamide, and the like) and agitated. Thereafter, the mixed solution is poured into water to cause reprecipitation, and the solids are filtered, dried and pulverized by using a pulverizer such as a jet mill or a ball mill, followed by classification to obtain the electrostatic charge image developing toner of the present invention having a desired particle size. In the classification step, it is preferred to use a multisegment classifier to increase the production efficiency.

Further, the electrostatic charge image developing toner of the present invention can be obtained also by a so-called polymerization method as described below. In this case, a polymerizable monomer of the binder resin and a electrical charge controlling agent and a materials such as a pigment, dye or magnetic material as a colorant and optionally a crosslinking agent, a polymerization initiator, a wax, the other binder resin and other additives are mixed and dispersed and subjected to suspension polymerization in an aqueous dispersion medium in the presence of a surfactant and the like to synthesize polymerizable colored resin particles. Then, the obtained particles are subjected to solid-liquid separation, dried and classified as necessary to obtain the electrostatic charge image developing toner of the present invention.

Furthermore, colored fine particles containing no charge control agent can be prepared by the methods described above and then, the polyhydroxyalkanoate, singly or together with an external additive such as colloidal silica, may be added and fixed to the surface of the particles by a mechanochemical method or the like.

(Silica External Additive)

In the present invention, it is preferred that silica fine powder is added externally to the toner prepared by the above-mentioned method in order to increase charge stability, developability, flowability and durability. On this occasion, use of silica fine powder that has a specific surface area in the range of 20 $m^2/g$ or more, in particular 30 to 400 $m^2/g$, as measured by nitrogen absorption according to the BET method can give good results. In this case, it is preferred to use the silica fine powder in an amount of from about 0.01 to about 8 mass parts, preferably from about 0.1 to about 5 mass parts, per 100 mass parts of the toner particle. As for the silica fine powder to be used, it is preferred to use one that is treated with a treating agent such as silicone varnish, various kinds of modified silicone varnish, silicone oil, various kinds of modified silicone oil, silane coupling agents, silane coupling agents having a functional groups, and other organosilicon compounds as needed for the purpose of imparting to the toner hydrophobic nature or controlling the chargeability of the toner. These treating agents may be used as mixtures.

(Inorganic Powder)

To increase the developability and durability of the toner, it is preferred to add inorganic powders, for example, powders of oxides of metals such as magnesium, zinc, aluminum, cerium, cobalt, iron, zirconium, chromium, manganese, strontium, tin, and antimony; composite metal oxides such as calcium titanate, magnesium titanate, and strontium titanate; metal salts such as calcium carbonate, magnesium carbonate and aluminum carbonate; clay minerals such as kaolin; phosphate compounds such as apatite; silicon compounds such as silicon carbide and silicon nitride; and carbon powders such as carbon black and graphite. Among those, fine powders of zinc oxide, aluminum oxide, cobalt oxide, manganese dioxide, strontium titanate, and magnesium titanate are preferably used.

(Lubricant)

Further, lubricant powder as described below may be added to the toner. Examples of the lubricant powder includes fluororesins such as Teflon, polyvinylidene fluoride; fluoro compounds such as carbon fluoride; fatty acid metal salts such as zinc stearate; fatty acid, fatty acid derivatives such as fatty acid esters; molybdenum sulfide and the like.

<Carrier>

The electrostatic charge image developing toner of the present invention having the above-described structure and properties may-be applied to various kinds of known toners; for example, it may be used as a nonmagnetic toner that is used singly as a nonmagnetic one-component developer or as a magnetic two-component developer together with a magnetic carrier, or as a magnetic toner used singly as a magnetic one-component developer. Any conventionally known carrier may be used as a carrier in the two-component developing method. Specifically, surface-oxidized or -non-oxidized particles having an average particle size of from 20 to 300 µm formed from metals such as iron, nickel, cobalt, manganese, chromium, and rare earth elements, alloys thereof or oxides may be used as carrier particles. It is preferred that the carrier used in the present invention comprise the carrier particles described above, the surface of which are coated with a substance such as a styrene-based resin, acrylic-based resin, a silicone-based resin, a fluoro-based resin, a polyester resin or the like or has such a substance adhered thereto.

<Magnetic Toner>

The electrostatic charge image developing toner of the present invention may contain a magnetic material in the toner particles to form a magnetic toner. In this case, the magnetic material may also serve as a colorant. The magnetic material that can be used on this occasion includes iron oxides such as magnetite, hematite and ferrite; and metals such as iron, cobalt and nickel or alloys and mixtures of these metals with other metals such as aluminum, cobalt, copper, lead, magnesium, tin, zinc, antimony, beryllium, bismuth, cadmium, calcium, manganese, selenium, titanium, tungsten, and vanadium. Preferably, the magnetic materials that can be used in the present invention have an average particle size of 2 µm or less, more preferably from about 0.1 to about 0.5 µm. It is preferred that they are contained in the toner in an amount of from 20 to 200 mass parts per 100 mass parts of the binder resin, particularly preferably from 40 to 150 mass parts per 100 mass parts of the binder resin.

Further, to accomplish high image quality, it is necessary to make it possible to faithfully develop finer latent image dots. For this purpose, for example, it is preferable to control the electrostatic charge image developing toner particles of the present invention so as to have a weight average particle size in the range of from 4 to 9 µm. That is, the toner particles having a weight average particle size less than 4 µm are undesirable, since with such a toner the image transfer efficiency tends to decrease and much untransferred toner is liable to remain on the photosensitive member after the transfer, which tends to cause unevenness of image due to fogging/transfer failure. If the weight average particle size of the toner particle exceeds 9 µm, scattering of characters or line images tends to occur.

In the present invention, the average particle size and particle size distribution of the toner are determined by using Coulter Counter TA-II or Coulter Multisizer (available from Beckman Coulter Electronics Inc.), connected to an interface (Nikkaki Bios Co., Ltd.) for outputting number distribution and volume distribution, and a personal computer PC 9801. As the electrolyte to be used in the measurement is a 1% NaCl aqueous solution prepared with first class grade sodium chloride. The 1% NaCl aqueous solution is also commercially available; for example, ISOTON R-II (produced by Coulter Scientific Japan Co.). Specifically, for measurement, 0.1 to 5 mL of a surfactant (preferably an alkylbenzenesulfonic acid salt) as a dispersant and further 2 to 20 mg of a measurement sample are added to 100 to 150 mL of the electrolytic solution to form a sample for measurement. In the measurement, the resultant suspension of the measurement sample in the electrolytic solution is subjected to a dispersion treatment by an ultrasonic disperser for about 1 to 3 minutes and then subjected to measurement of particle size distribution by using the above-mentioned Coulter Counter TA-II equipped with a 100 µm-aperture as an aperture to obtain the volume and number of toner particles equal to or greater than 2 µm. From these a volume-basis particle size distribution and a number-basis particle size distribution were calculated. Then, the volume-basis weight average particle size (D4) and number-basis length-average particle size (D1) related to the present invention are derived from the volume-basis and number-basis distributions, respectively.

<Charge Amount>

It is preferred that the electrostatic charge image developing toner of the present invention has a charge quantity (two component method) per unit mass of −10 to −80 µC/g, more preferably −15 to −70 µC/g in order to increase transfer efficiency in a transfer method using a voltage applied transfer member.

Figure 7:
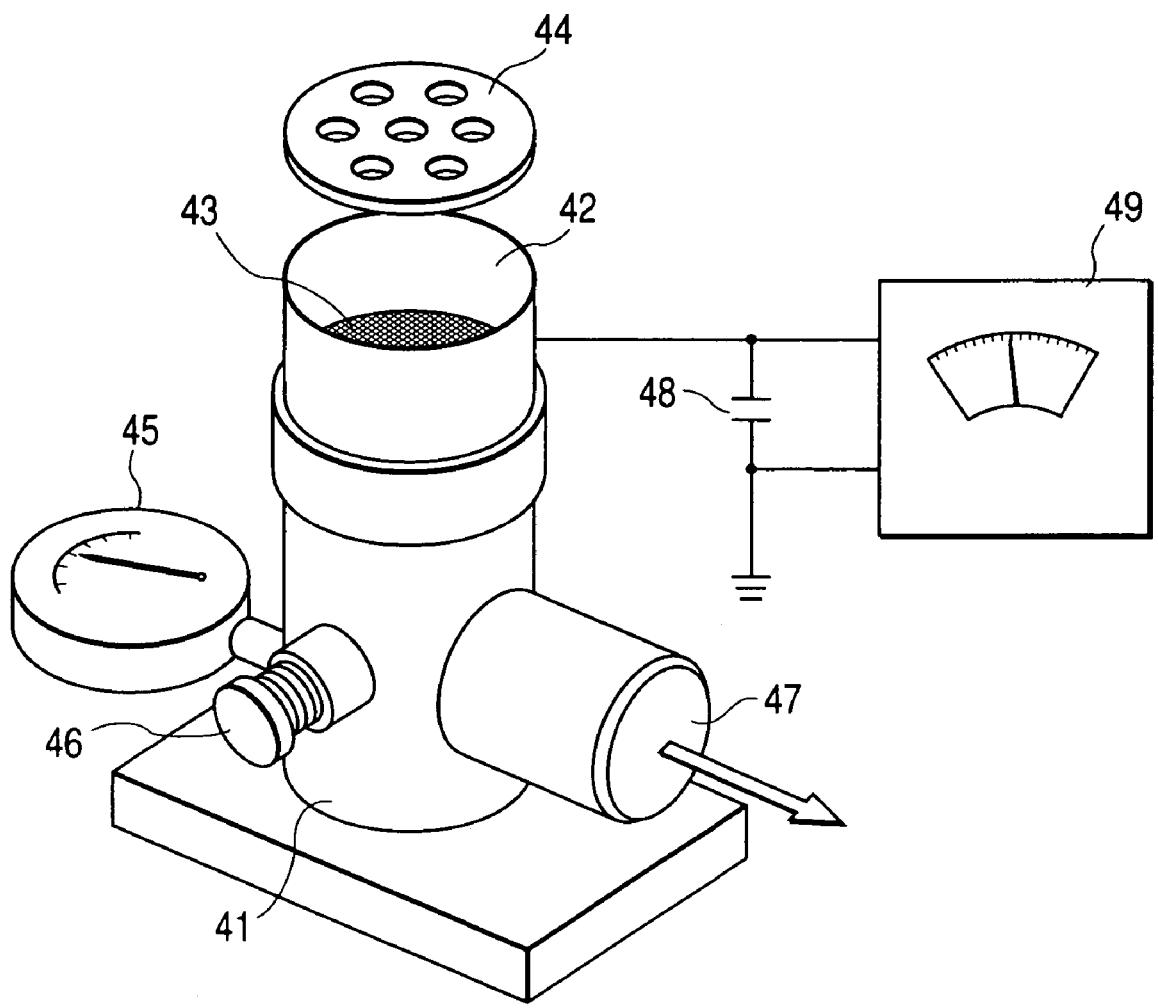
FIG. 7 is a schematic view showing a blow-off charge amount measuring apparatus for measuring a charge amount of toner.

The method for measuring a charge quantity (two component triboelectric charge amount) by a two component method used in the present invention is as indicated below. For measurement, a charge amount measuring apparatus as shown in FIG. 7 is used. First, under a certain environment, a mixture of 9.5 g of EFV 200/300 (tradename, produced by Powdertech Co., Ltd.) as a carrier and 0.5 g of toner to be measured is added into a 50 to 100 mL capacity polyethylene bottle, which is then placed in a shaker set under shaking conditions of a fixed shaking width of 100 mm and a shaking speed of 100 strokes per minute and shaken for a predetermined period of time. Then, 1.0 to 1.2 g of the shaken mixture is charged in a measurement container 42 (made of metal) provided with a 500-mesh screen 43 at the bottom of the charge amount measuring apparatus shown in FIG. 7 and covered with a metal lid 44. The total mass of the measurement container 42 is weighed and denoted by W1 (g). Then, an aspirator (not shown), in which at least the part contacting with the measurement container 42 is composed of an insulator, is operated to effect suction through a suction port 47 while pressure is so regulated as to be 2450 Pa (250 mmAq) with a vacuum gauge 45 by adjusting an airflow control valve 46. In this state, suction is continued for 1 minute to remove the toner. The reading at this time of a potential meter 49 is denoted by V (volts). Here, 48 designates a capacitor having a capacitance C (µF). The total mass of the measuring apparatus after the suction is measured and denoted by W2 (g). Then, the triboelectric charge amount (µC/g) of the toner is calculated by the following equation:

Triboelectric charge amount (µC/g)=$C \times V/(W1-W2)$.

<Molecular Weight Distribution of Binder Resin>

It is preferred that the binder resin used as a constituent material of the electrostatic charge image developing toner of the present invention shows a low molecular weight region peak in the range from 3,000 to 15,000 in the molecular weight distribution by gel permeation chromatography (GPC), in particular, when it is prepared by a pulverization method. That is, if the GPC peak in the low molecular weight region exceeds 15,000, improvement in transfer efficiency may in some cases become insufficient. On the other hand, the use of a binder resin having a GPC peak in the low molecular weight region of less than 3,000 is not desirable since fusion tends to occur at the time of surface treatment.

In the present invention, the molecular weight of the binder resin is measured by gel permeation chromatography (GPC). A specific method for the measurement by GPC may include the following method: the toner is beforehand extracted with THF (tetrahydrofuran) solvent for 20 hours by means of a Soxhlet extractor, and the sample thus obtained is used for measurement of molecular weight by using columns of Shodex A-801, 802, 803, 804, 805, 806 and 807, (trade names, made by Showa Denko K. K.) connected in series, and using a calibration curve of reference polystyrene resin. In the present invention, it is preferred to use a binder resin having a ratio (Mw/Mn), which is a ratio of the weight average molecular weight (Mw) and number average molecular weight (Mn) thus measured, in the range of from 2 to 100.

<Glass Transition Point of Toner>

It is preferred that the toner of the present invention is so prepared as to have a glass transition point Tg of 40 to 75° C., more preferably 52 to 70° C., by using appropriate materials in consideration of fixing property and shelf life. In this case, the glass transition point Tg of the toner is measured using a high-precision differential scanning calorimeter in internal heat, input compensation type, for example, DSC-7, manufactured by Perkin Elmer Co., according to ASTM D3418-82. In the present invention, when measuring the glass transition point Tg, the temperature of a sample to be measured is once elevated to record all the thermal hysteresis and then quickly cooled. Again, the temperature of the sample is elevated at a temperature rise rate of 10° C./minute within the temperature range of 0 to 200° C. A DSC curve obtained based on the results of measurements under these conditions may be suitably used.

<Image Forming Method>

The electrostatic charge image developing toner of the present invention described above is particularly preferably applied to an image forming method comprising at least a charging step of charging an electrostatic latent image bearing member by applying a voltage to a charging member from the outside, a step of forming an electrostatic charge image on the charged electrostatic latent image bearing member, a developing step of developing the electrostatic charge image by using a toner to form a toner image on the electrostatic latent image bearing member, a transfer step of transferring the toner image on the electrostatic latent image bearing member to a recording medium, and a heat-fixing step of thermally fixing the toner image on the recording medium thereto. Alternatively, the toner of the present invention may be particularly preferably applied to the above-described method in which the transfer step comprises a first transfer step of transferring the toner image on the electrostatic latent image bearing member to an intermediate transfer member and a second transfer step of transferring the toner image on the intermediate transfer member to the recording medium.

In the present invention, the culture of microorganisms, and PHA recovery from the bacterial cells, also the reaction solvent, reaction temperature, reaction time and purifying method in the chemical reaction, and the charge control agent are not limited to those described in the foregoing.

EXAMPLES

In the following, the present invention will be explained in more details by examples thereof, but the present invention is by no means limited to these examples.

Example A-1

0.5% of polypeptone (supplied by Wako Pure Chemical Co.), 6 mmol/L of 5-phenylvaleric acid and 1.5 mmol/L of 5-(4-vinylphenyl) valeric acid as ω-(4-vinylphenyl)alkanoic acid were dissolved in 1,000 mL of the aforementioned M9 culture medium, then charged in a 2,000 ml shaking flask, sterilized in an autoclave, and cooled to the room temperature. Then 2 mL of a culture liquid of Pseudomonas cichorii YN2 strain, shake-cultured in advance in an M9 culture medium containing 0.5% of polypeptone for 8 hours at 30° C. were added to the prepared culture medium, and cultivated for 64 hours at 30° C. After the cultivation, the bacteria cells were recovered by centrifuging, rinsed with methanol and dried. The dried bacteria cells were weighed, to which chloroform was then added, followed by stirring for 88 hours at 35° C. to extract a polymer. The chloroform extract was filtered, and concentrated in an evaporator. A resulting solid precipitate was collected by cold methanol and dried under a reduced pressure to obtain a desired polymer.

A structure determination of the obtained polymer was conducted by $^1$H-NMR (FT-NMR: Bruker DPX400; $^1$H resonance frequency: 400 MHz; measured nucleus species: $^1$H; solvent: $CDCl_3$; measurement temperature: room temperature).

Figure 8:
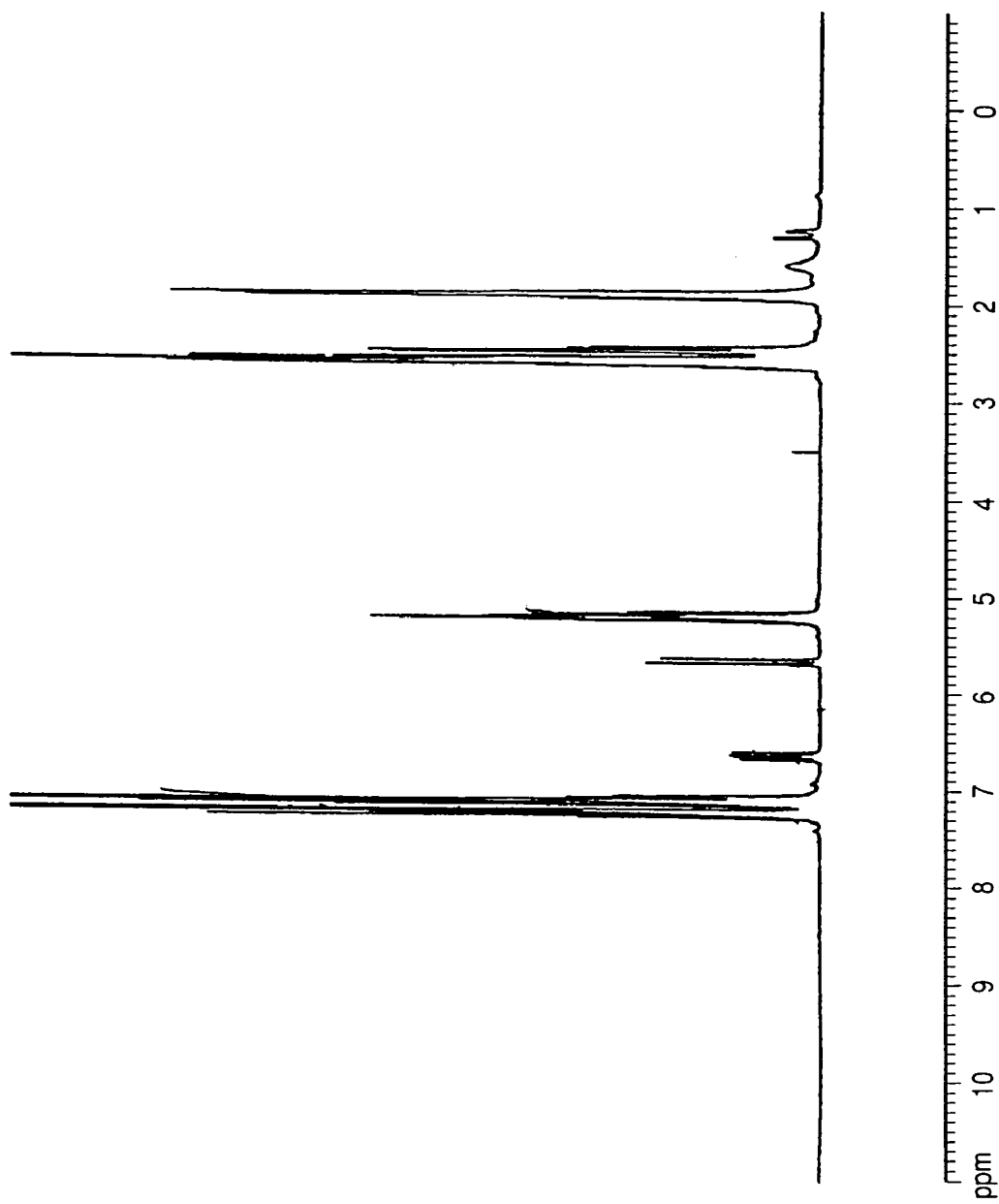
FIG. 8 is a chart showing a $^1$H-NMR spectrum of a polyester obtained in Example A-1.

FIG. 8 shows a $^1$H-NMR spectrum of the obtained polymer. As a result, there was confirmed a polyhydroxyalkanoate copolymer including units represented in the following chemical formula (34) with a content ratio (mol. %) A:B=80: 20.

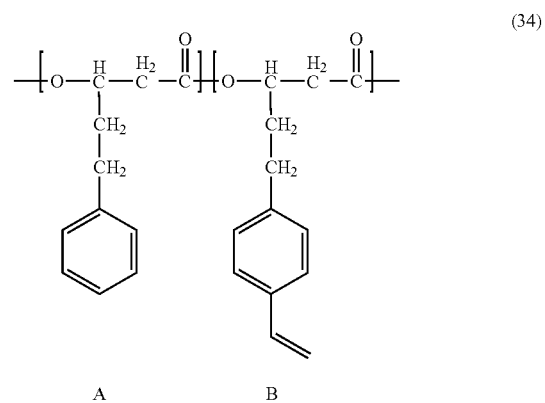

A molecular weight of the obtained polymer was measured by gel permeation chromatography (GPC) (Toso HLC-8220 GPC, column: Toso TSK-GEL Super HM-H, solvent: chloroform, molecular weight converted into polystyrene). The obtained polymer had a weight (PDW) of 0.44 g/L, a number-average molecular weight $M_n$ of 86,000, and a weight-average molecular weight $M_w$ of 242,000.

Example A-2

In a 200 mL flask, 1.0017 g of polyester containing 20 mol. % of 3-hydroxy-ω-(4-vinylphenyl)valeric acid unit which had been obtained in Example A-1, 0.8710 g of 18-crown-6-ether, 60.0 mL of dichloromethane and 10 mL of acetic acid were charged and stirred. The flask was immersed in an ice bath to cool the reaction system to 0° C. After 45 minutes, 0.6932 g of potassium permanganate were added and an stirring was executed for 15 hours. After the reaction, a 5% aqueous solution of sodium hydrogensulfite was added and stirred, and the liquid was brought to pH=1 by 1.0 N hydrochloric acid. After dichloromethane in the liquid mixture was distilled off in an evaporator, a polymer in the solution was recovered. The polymer was recovered by washing with 100 ml of purified water twice and with 100 ml of methanol. A drying under a reduced pressure provided 0.8053 g of the desired PHA.

A structure of the obtained polymer was determined by $^1$H-NMR (FT-NMR: Bruker DPX400; $^1$H resonance frequency: 400 MHz; measured nucleus species: $^1$H; solvent: $CDCl_3$; measurement temperature: room temperature) and Fourier-transformation infrared absorption (FT-IR) spectrum (Nicolet AVATAR360FT-IR). Based on the IR measurement, a new absorption at 1,693 $cm^{-1}$ induced by a carboxylic acid identified that the obtained PHA contained a 3-hydroxy-ω-(4-carboxyphenyl)valeric acid unit.

Also a proportion of the units of the obtained PHA was calculated by a methylesterification, utilizing trimethylsilyldiazomethane, of a carboxyl group at an end of a side chain of the PHA.

18.7 mg of the object PHA were charged in a 100-ml flask and were dissolved by adding 1.4 ml of chloroform and 0.35 ml of methanol. The solution was added with 0.4 ml of a 2.0 ml/L hexane solution of trimethylsilyldiazomethane and was stirred for 30 minutes at the room temperature. After the reaction, the solvent was distilled off in an evaporator to recover a polymer. The polymer was recovered by washing with 50 ml of methanol. A drying under a reduced pressure provided 8.9 mg of PHA.

Figure 9:
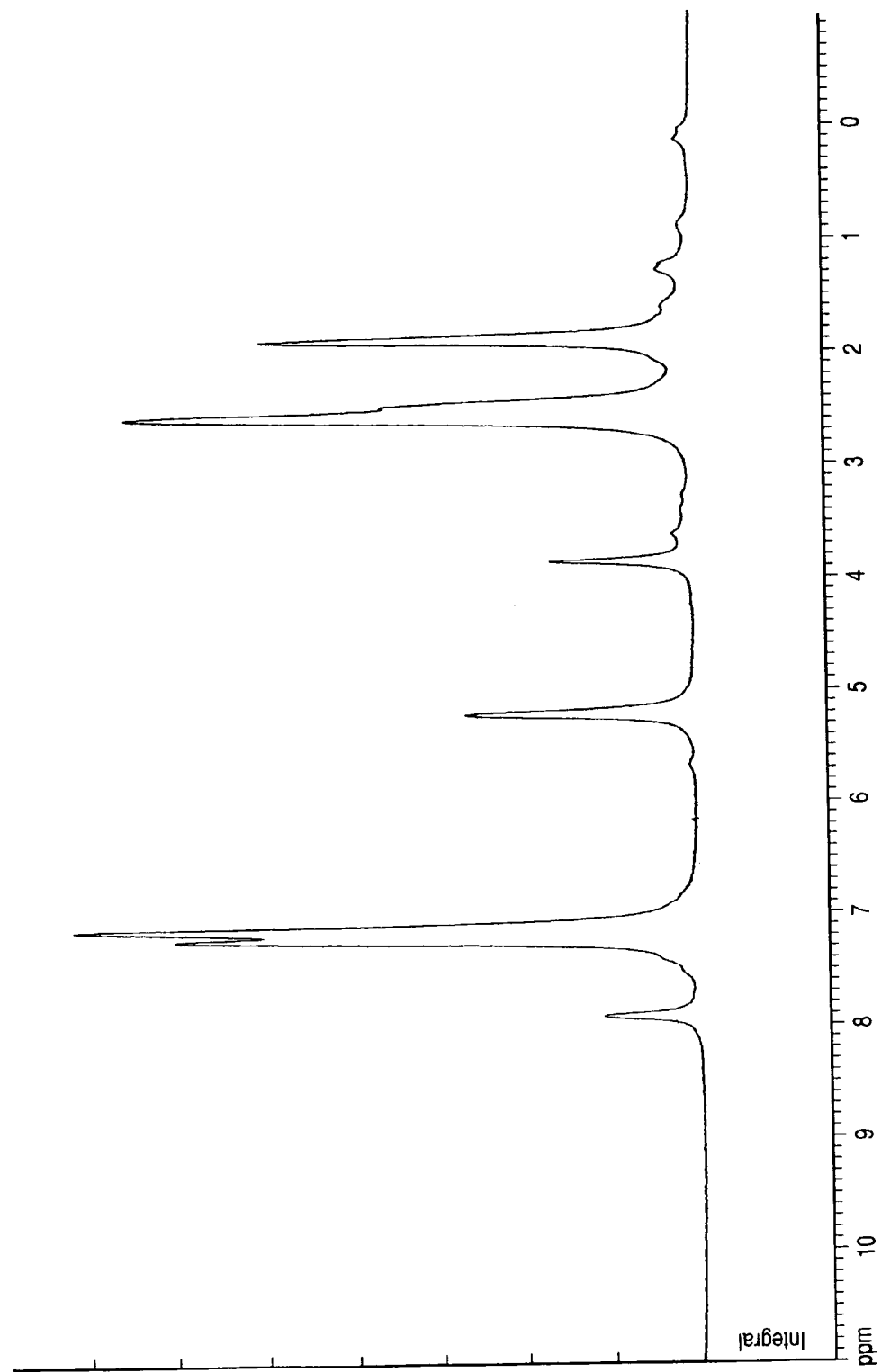
FIG. 9 is a chart showing a $^1$H-NMR spectrum of a polyester obtained in Example A-2.

An NMR analysis was conducted in the same manner as in the foregoing. A $^1$H-NMR spectrum of the obtained polymer is shown in FIG. 9. As a result, there was confirmed a polyhydroxyalkanoate copolymer including units represented in the following chemical formula (35) with a content ratio (mol. %) A:B=83:17.

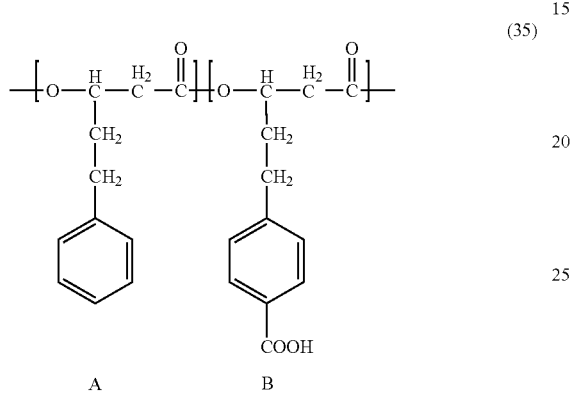

Also an average molecular weight of the PHA, obtained by a methylesterification, utilizing trimethylsilyldiazomethane, of the carboxyl group at the end of the side chain of the PHA, was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 61,000, and a weight-average molecular weight $M_w$ of 82,000.

Example A-3

In a nitrogen atmosphere, 0.2007 g of a polymer obtained in Example A-2 and containing 17 mol. % of 3-hydroxy-ω-(4-carboxyphenyl)valeric acid unit and 54.7 mg of p-toluidine-2-sulfonic acid were charged in a two-necked 50 ml flask, then stirred with 10 ml of pyridine, added with 0.08 ml of triphenyl phosphite and heated for 6 hours at 100° C. After the reaction, a reaction product was re-precipitated in 250 ml of ethanol and recovered by centrifuging. The obtained polymer was washed by stirring for 3 days in water, further washed for 1 day with 1N hydrochloric acid, and was dried under a reduced pressure for 1 day.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR). Based on the IR measurement, a peak at 1,693 cm$^{-1}$ induced by a carboxylic acid decreased and a new peak at 1,669 cm$^{-1}$ induced by an amide group was observed.

Figure 10:
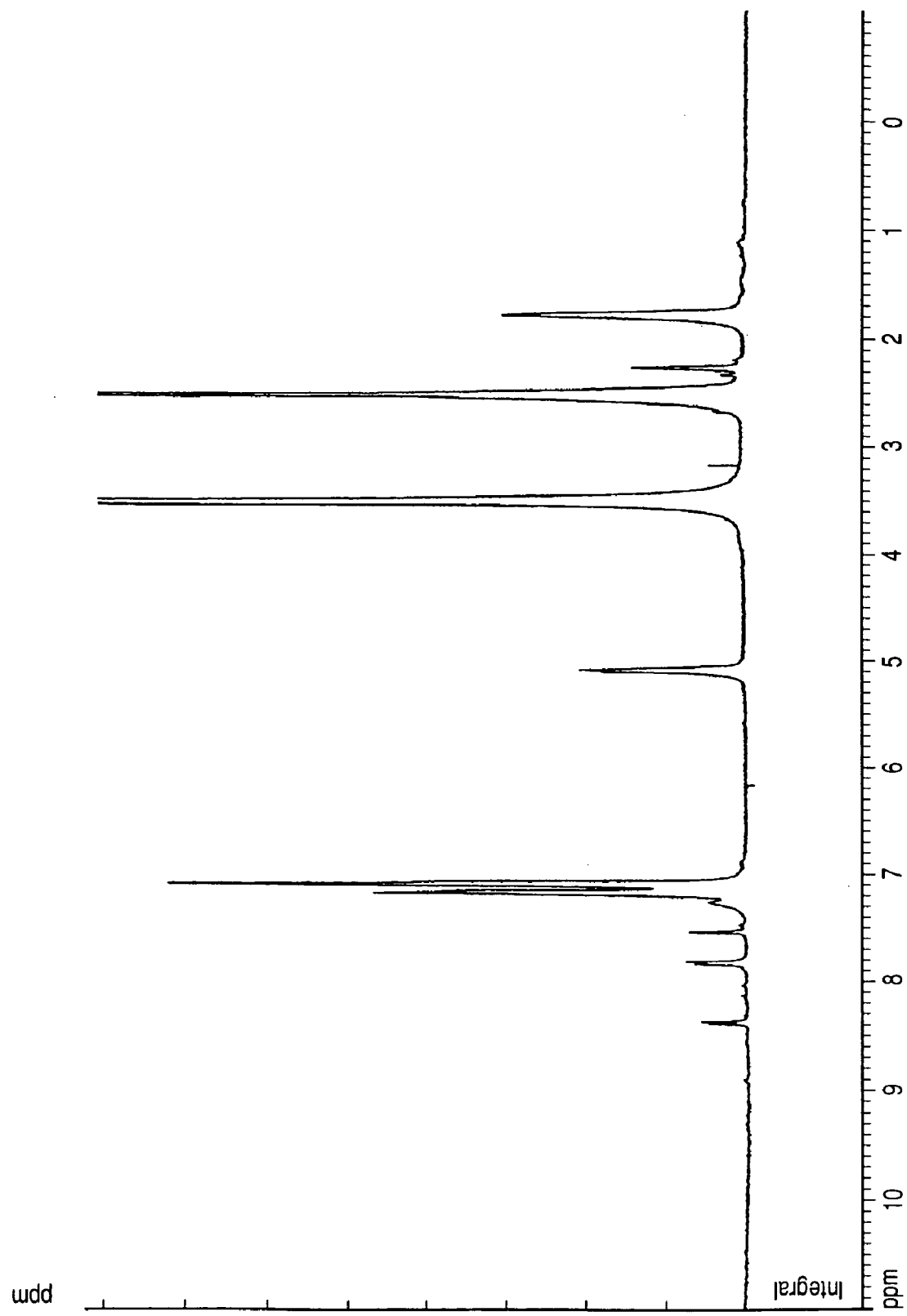
FIG. 10 is a chart showing a $^1$H-NMR spectrum of a polyester obtained in Example A-3.

A $^1$H-NMR spectrum of the obtained polymer is shown in FIG. 10. Based on the result of $^1$H-NMR that a peak induced by the methyl group in the p-toluidine-2-sulfonic acid structure is shifted from the peak induced by the methyl group in the p-toluidine-2-sulfonic acid, the obtained PHA was confirmed as a polyhydroxyalkanoate copolymer including 13 mol. % of a unit represented in the following chemical formula (36)

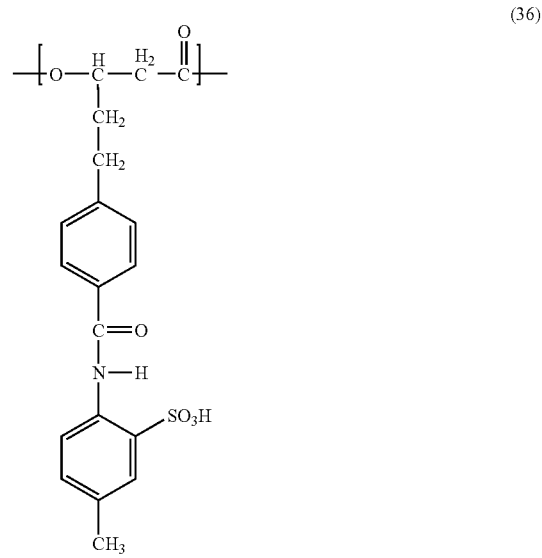

Also an average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 18,000, and a weight-average molecular weight $M_w$ of 38,000. 50 g of this compound were obtained by increasing the scale of the preparing process, and were used as an example compound A-1 for toner preparation and evaluation.

Example A-4

0.1005 g of the polymer obtained in Example A-3 and containing 13 mol. % of the unit represented by the chemical formula (37) were charged in a 50 ml eggplant-shaped flask, then dissolved by adding 7 ml of chloroform and 1.8 ml of methanol, and were cooled to 0° C. The solution was added with 2.7 ml of a 2.0 ml/L hexane solution of trimethylsilyldiazomethane (manufactured by Aldrich Inc.) and was stirred for 4 hours. After the reaction, the solvent was distilled off in an evaporator to recover a polymer. The polymer was redissolved by adding 7 ml of chloroform and 1.8 ml of methanol, and the solvent was distilled off by an evaporator. This operation was repeated three times, followed by a drying under a reduced pressure, to obtain 0.0845 g of PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature). Based on the result of $^1$H-NMR indicating a peak of 3 to 4 ppm induced by methyl sulfonate, it was identified that the obtained PHA was a polyhydroxyalkanoate copolymer containing 11 mol. % of a unit represented by the following chemical formula (37).

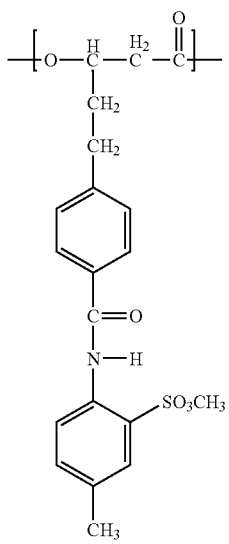

(37)

Also an acid value titration, utilizing a potentiometric titration apparatus AT510 (manufactured by Kyoto Denshi Co.), did not show a peak induced by a sulfonic acid, indicating that sulfonic acid is converted into-methyl sulfonate.

An average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 17,000, and a weight-average molecular weight $M_w$ of 36,000. 50 g of this compound were obtained by increasing the scale of the preparing process, and were used as an example compound A-2 for toner preparation and evaluation.

Example B-1

0.5% of polypeptone (Wako Pure Chemical Co.), 6 mmol/L of 5-phenylvaleric acid and 3.0 mmol/L of 5-(4-vinylphenyl) valeric acid as ω-(4-vinylphenyl)alkanoic acid were dissolved in 1,000 mL of the aforementioned M9 culture medium, then charged in a 2,000 ml shaking flask, sterilized in an autoclave, and cooled to the room temperature. Then 2 mL of a culture liquid of *Pseudomonas cichorii* YN2 strain, shake-cultured in advance in an M9 culture medium containing 0.5% of polypeptone for 8 hours at 30° C., were added to the prepared culture medium, and cultivated for 63 hours at 30° C. After the cultivation, the bacteria cells were recovered by centrifuging, rinsed with methanol and dried. The dried bacteria cells were weighed, to which chloroform was then added, followed by stirring for 72 hours at 35° C. to extract a polymer. The chloroform extract was filtered and concentrated in an evaporator. A resulting solid precipitate was collected by cold methanol and dried under a reduced pressure to obtain a desired polymer.

A structure determination of the obtained polymer was conducted by $^1$H-NMR (FT-NMR: Bruker DPX400; $^1$H resonance frequency: 400 MHz; measured nucleus species: $^1$H; solvent: CDCl$_3$; measurement temperature: room temperature).

Figure 11:
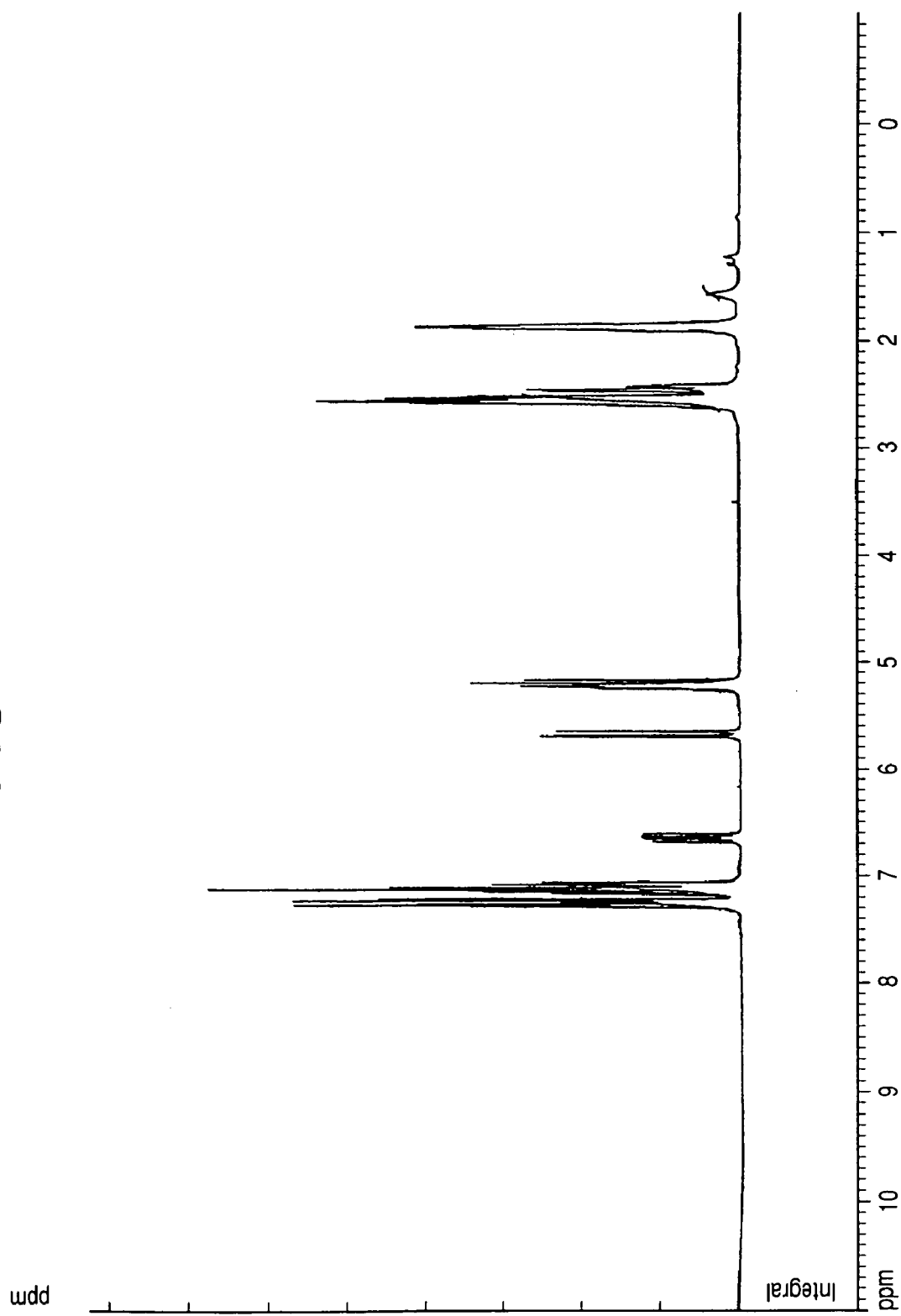
FIG. 11 is a chart showing a $^1$H-NMR spectrum of a polyester obtained in Example B-1.

FIG. 11 shows a $^1$H-NMR spectrum of the obtained polymer. As a result, there was confirmed a polyhydroxyalkanoate copolymer including units represented in the following chemical formula (38) with a content ratio (mol. %) A:B=60:40.

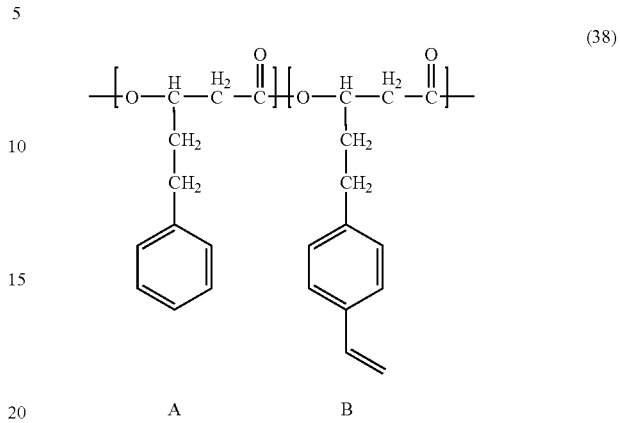

(38)

A molecular weight of the obtained polymer was measured by gel permeation chromatography (GPC) (Toso HLC-8220 GPC, column: Toso TSK-GEL Super HM-H, solvent: chloroform, conversion into polystyrene). The obtained polymer had a weight (PDW) of 0.33 g/L, a number-average molecular weight $M_n$ of 82,000, and a weight-average molecular weight $M_w$ of 262,000.

Example B-2

In a 500 mL flask, 1.6041 g of polyester containing 40 mol. % of 3-hydroxy-ω-(4-vinylphenyl)valeric acid unit which had been obtained in Example B-1, 2.7259 g of 18-crown-6-ether, 96 mL of dichloromethane and 16 mL of acetic acid were charged and stirred. The flask was immersed in an ice bath to cool the reaction system to 0° C. After 40 minutes, 2.1745 g of potassium permanganate were added and an stirring was executed for 12 hours. After the reaction, a 5% aqueous solution of sodium hydrogensulfite was added and stirred, and the liquid was brought to pH=1 by 1.0 N hydrochloric acid. After dichloromethane in the liquid mixture was distilled off in an evaporator, a polymer in the solution was recovered. The desired PHA was recovered by washing the resulting polymer in the distillation step with 200 ml of purified water twice and with 200 ml of methanol. A drying under a reduced pressure provided 1.6043 g of the desired PHA.

A structure of the obtained polymer was determined by $^1$H-NMR (FT-NMR: Bruker DPX400; $^1$H resonance frequency: 400 MHz; measured nucleus species: $^1$H; solvent: CDCl$_3$; measurement temperature: room temperature) and Fourier-transformation infrared absorption (FT-IR) spectrum (Nicolet AVATAR360FT-IR). Based on the IR measurement, a new absorption at 1,693 cm$^{-1}$ induced by a carboxylic acid identified that the obtained PHA contained a 3-hydroxy-ω-(4-carboxyphenyl)valeric acid unit.

Also a proportion of the units of the obtained PHA was calculated by a methylesterification, utilizing trimethylsilyldiazomethane, of a carboxyl group at an end of a side chain of the PHA in the same manner as in Example A-2.

As a result, there was confirmed a polyhydroxyalkanoate copolymer including units represented in the following chemical formula (39) with a content ratio (mol. %) A:B=62:38.

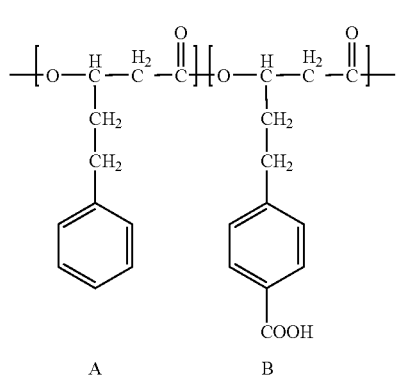

(39)

A  B

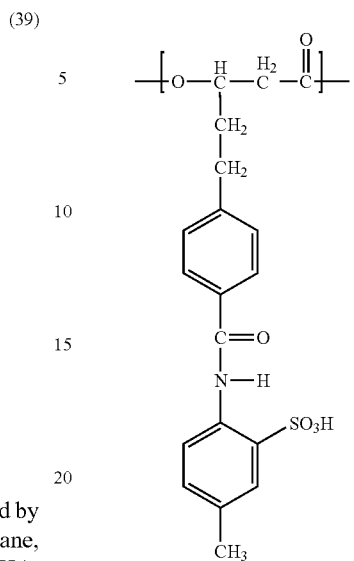

(40)

Also an average molecular weight of the PHA, obtained by a methylesterification, utilizing trimethylsilyldiazomethane, of the carboxyl group at the end of the side chain of the PHA, was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ Of 68,000, and a weight-average molecular weight $M_w$ of 89,000.

Example B-3

In a nitrogen atmosphere, 0.2000 g of a polymer obtained in Example B-2 and containing 38 mol. % of 3-hydroxy-ω-(4-carboxyphenyl)valeric acid unit and 112.0 mg of p-toluidine-2-sulfonic acid were charged in a two-necked 50 ml flask, then stirred with 10 ml of pyridine, added with 0.16 ml of triphenyl phosphite and heated for 6 hours at 100° C. After the reaction, a reaction product was re-precipitated in 200 ml of ethanol and recovered by centrifuging. The obtained polymer was washed for 1 day with 1N hydrochloric acid and further washed by stirring for 1 day in water, and was dried under a reduced pressure for 1 day.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR). Based on the IR measurement, a peak at 1,693 cm$^{-1}$ induced by a carboxylic acid decreased and a new peak at 1,668 cm$^{-1}$ induced by an amide group was observed.

Figure 12:
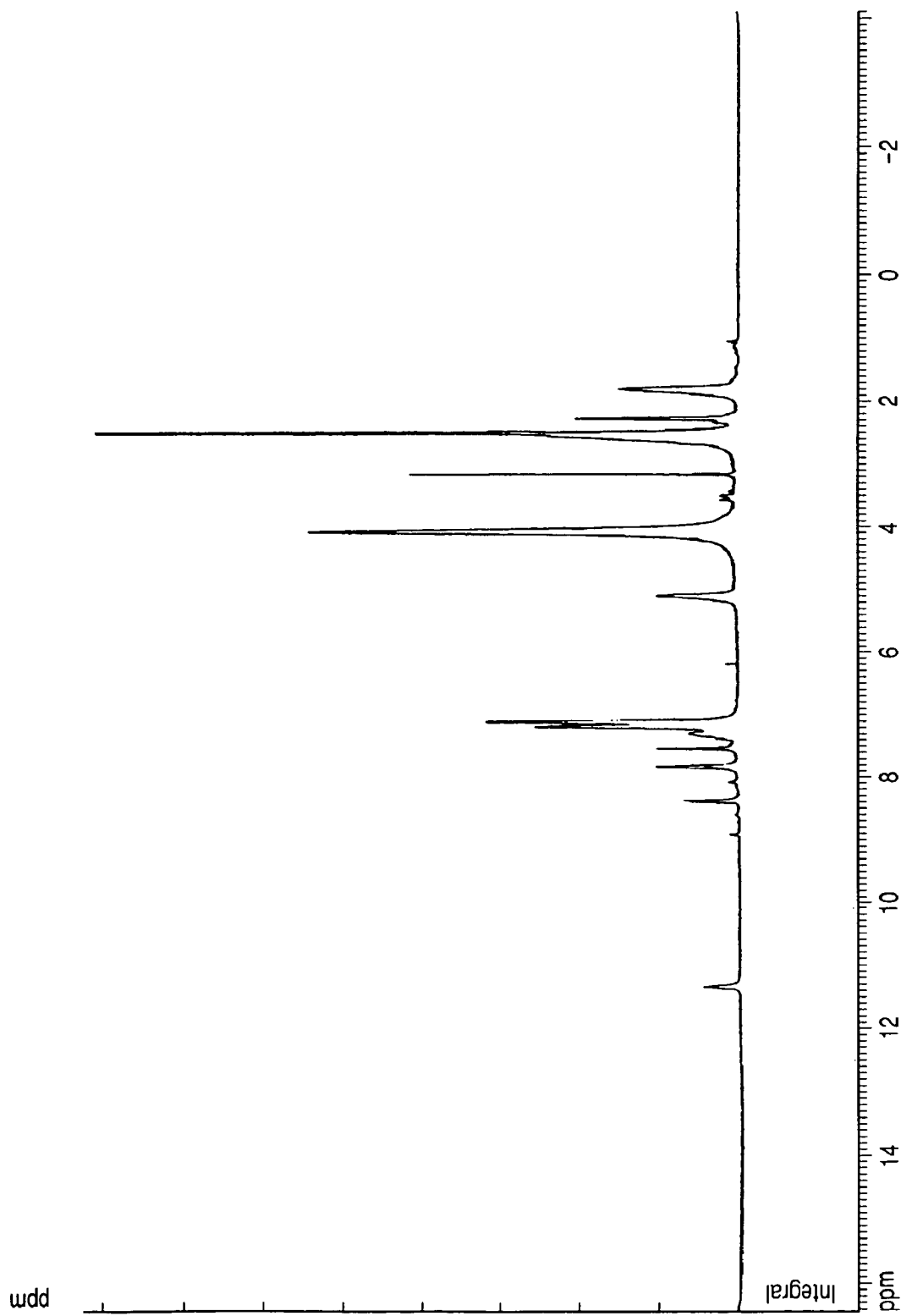
FIG. 12 is a chart showing a $^1$H-NMR spectrum of a polyester obtained in Example B-3.

A $^1$H-NMR spectrum of the obtained polymer is shown in FIG. 12. Based on the result of $^1$H-NMR that a peak induced by the methyl group in the p-toluidine-2-sulfonic acid structure is shifted from the peak induced by the methyl group in the p-toluidine-2-sulfonic acid, the obtained PHA was confirmed as a polyhydroxyalkanoate copolymer including 30 mol. % of a unit represented in the following chemical formula (40)

Also an average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 24,000, and a weight-average molecular weight $M_w$ of 40,000.

Example C-1

In a nitrogen atmosphere, 0.2008 g of a polymer obtained in Example A-2 and containing 17 mol. % of 3-hydroxy-ω-(4-carboxyphenyl)valeric acid unit and 50.8 mg of 4-aminobenzenesulfonic acid were charged in a two-necked 50 ml flask, then stirred with 10 ml of pyridine, added with 0.08 ml of triphenyl phosphite and heated for 4 hours at 100° C. After the reaction, a reaction product was re-precipitated in ethanol and recovered by centrifuging. The obtained polymer was washed by stirring for 3 days in water, further washed for 1 day with 1N hydrochloric acid, and was dried under a reduced pressure for 1 day.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Figure 13:
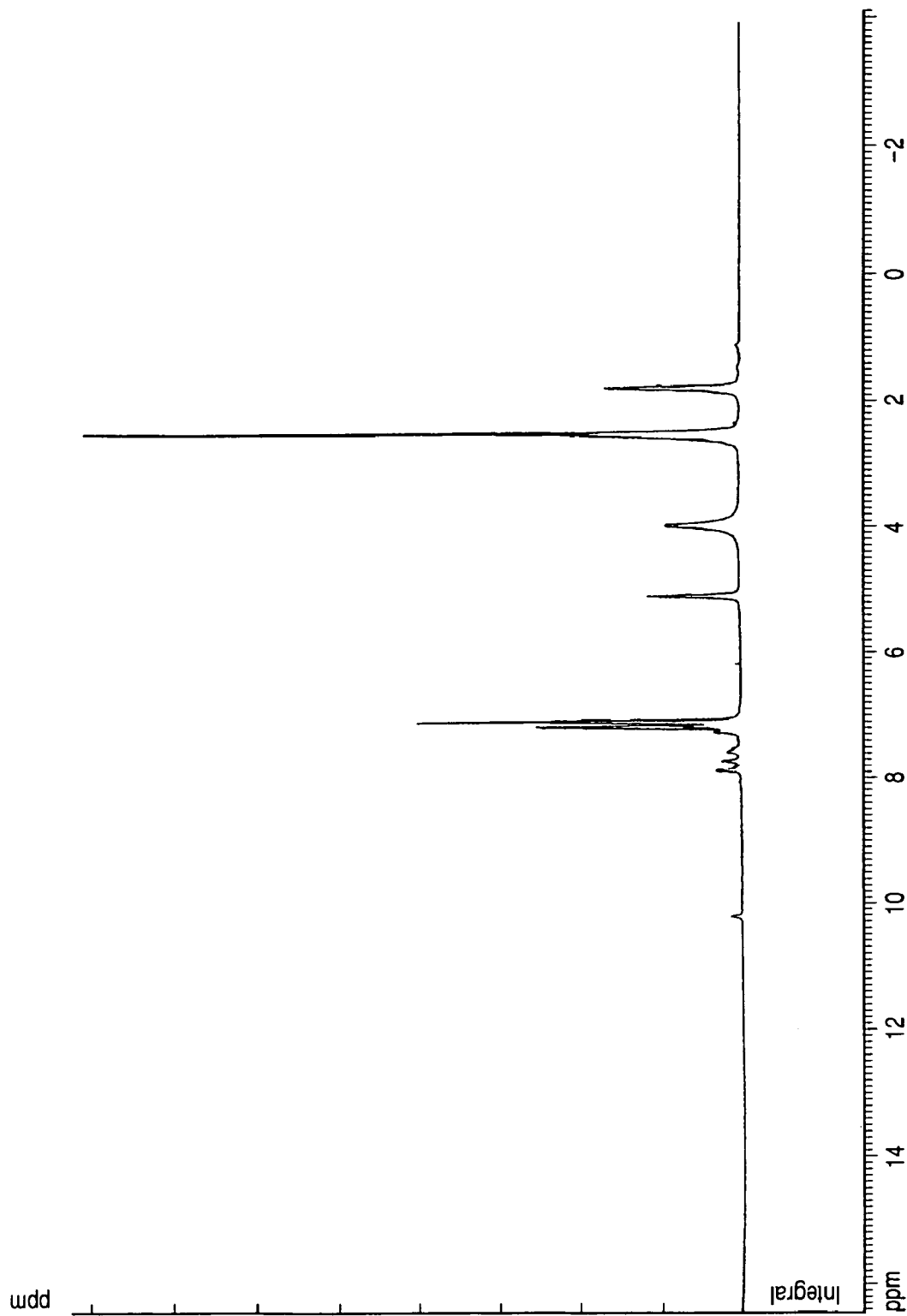
FIG. 13 is a chart showing a $^1$H-NMR spectrum of a polyester obtained in Example C-1.

In the IR measurement, a peak at 1,693 cm$^{-1}$ induced by a carboxylic acid decreased and a new peak at 1,668 cm$^{-1}$ induced by an amide group was observed. A $^1$H-NMR spectrum of the obtained polymer is shown in FIG. 13. According to the result of $^1$H-NMR that peaks induced by an aromatic ring taken by the introduction of 4-aminobenzenesulfonic acid was observed at 7.70 and 7.57, the obtained PHA was confirmed as a polyhydroxyalkanoate copolymer including 11 mol. % of a unit represented in the following chemical formula (41)

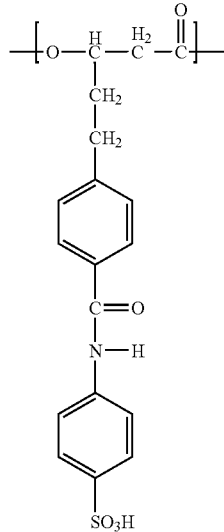

(41)

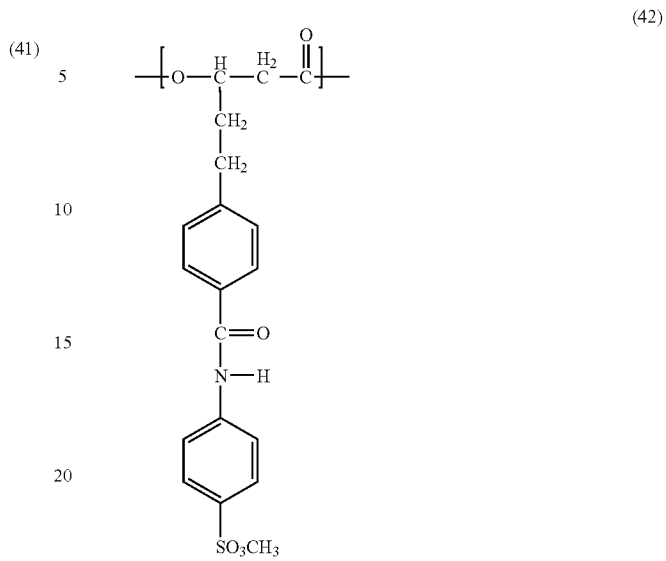

Also an average molecular weight of the obtained PHA was evaluated by gel permeation chromatography (GPC: Toso, column: Toso PLgel 5μ MIXED-C, solvent: DMF/LiBr 0.1% (w/v), conversion into-polystyrene). As a result, there were obtained a number-average molecular weight $M_n$ of 20,000, and a weight-average molecular weight $M_w$ of 39,000. 50 g of this compound were obtained by increasing the scale of the preparing process, and were used as an example compound C-1 for toner preparation and evaluation.

Example C-2

0.1010 g of the polymer obtained in Example C-1 and containing 11 mol. % of the unit represented by the chemical formula (41) were charged in a 50 ml eggplant-shaped flask, then dissolved by adding 7 ml of chloroform and 1.8 ml of methanol, and were cooled to 0° C. The solution was added with 2.7 ml of a 2.0 ml/L hexane solution of trimethylsilyl-diazomethane (manufactured by Aldrich Inc.) and was stirred for 4 hours. After the reaction, the solvent was distilled off in an evaporator to recover a polymer. The polymer was redissolved by adding 7 ml of chloroform and 2.0 ml of methanol, and the solvent was distilled off by an evaporator. This operation was repeated three times, followed by a drying under a reduced pressure, to obtain 0.0885 g of PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature). Based on the result of $^1$H-NMR indicating a peak of 3 to 4 ppm induced by methyl sulfonate, it was identified that the obtained PHA was a polyhydroxyalkanoate copolymer containing 10 mol. % of a unit represented by the following chemical formula (42).

Also an acid value titration, utilizing a potentiometric titration apparatus AT510 (manufactured by Kyoto Denshi Co.), did not show a peak induced by a sulfonic acid, indicating that sulfonic acid is converted into methyl sulfonate.

An average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 18,000, and a weight-average molecular weight $M_w$ of 36,000. 50 g of this compound were obtained by increasing the scale of the preparing process, and were used as an example compound C-2 for toner preparation and evaluation.

Example D-1

In a 500 mL flask, 3.01 g of polyester containing 14 mol. % of 3-hydroxy-ω-(4-vinylphenyl)valeric acid unit, 1.8509 g of 18-crown-6-ether, 180 mL of dichloromethane and 30 mL of acetic acid were charged and stirred. The flask was immersed in an ice bath to cool the reaction system to 0° C. After 60 minutes, 1.4762 g of potassium permanganate were added and an stirring was executed for 20 hours. After the reaction, a 5% aqueous solution of sodium hydrogensulfite was added and stirred, and the liquid was brought to pH=1 by 1.0 N hydrochloric acid. After dichloromethane in the liquid mixture was distilled off in an evaporator, a polymer in the solution was recovered. The obtained polymer was washed with 200 ml of purified water and with 200 ml of methanol. It was further washed with 100 ml of purified water and then with 100 ml of methanol to recover the polymer. A drying under a reduced pressure provided 2.9601 g of the desired PHA.

A structure of the obtained polymer was determined by $^1$H-NMR (FT-NMR: Bruker DPX400; $^1$H resonance frequency: 400 MHz; measured nucleus species: $^1$H; solvent: $CDCl_3$; measurement temperature: room temperature) and Fourier-transformation infrared absorption (FT-IR) spectrum (Nicolet AVATAR360FT-IR). As a result, a new absorption at 1,693 $cm^{-1}$ induced by a carboxylic acid identified that the obtained PHA contained a 3-hydroxy-ω-(4-carboxyphenyl) valeric acid unit.

Also a proportion of the units of the obtained PHA was calculated by a methylesterification, utilizing trimethylsilyldiazomethane, of a carboxyl group at an end of a side chain of the PHA in the same manner as in Example A-2.

As a result, there was confirmed a polyhydroxyalkanoate copolymer including units represented in the following chemical formula (43) with a content ratio (mol. %) A:B=87: 13.

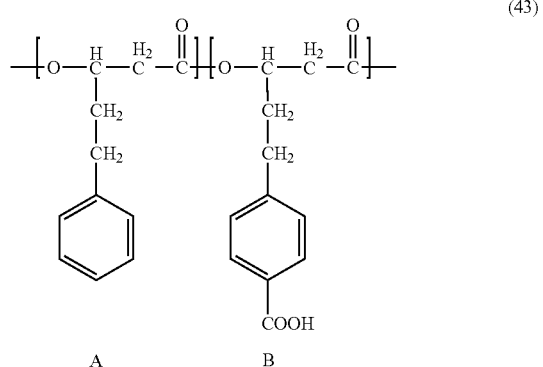

(43)

Also an average molecular weight of the PHA, obtained by a methylesterification, utilizing trimethylsilyldiazomethane, of the carboxyl group at the end of the side chain of the PHA, was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 68,000, and a weight-average molecular weight $M_w$ of 89,000.

Example D-2

In a nitrogen atmosphere, 1.4999 g of a polymer obtained in Example D-1 and containing 13 mol. % of 3-hydroxy-ω-(4-carboxyphenyl)valeric acid unit and 347.1 mg of 2-amino-1-naphthalenesulfonic acid were charged in a three-necked 100 ml flask, then stirred with 60 ml of pyridine, added with 0.42 ml of triphenyl phosphite and heated for 6 hours at 100° C. After the reaction, a reaction product was re-precipitated in 800 ml of ethanol and recovered by centrifuging. The obtained polymer was washed by stirring for 2 hours in 250 ml of purified water, then recovered by filtration, dried under a reduced pressure, then dissolved in 150 ml of THF and stirred with 150 ml of 1N hydrochloric acid. After 14 hours, the THF in the liquid mixture was distilled off by an evaporator, to recover the polymer in the solution. The obtained polymer was washed with 100 ml of purified water three times and was dried under a reduced pressure to obtain 1.0119 g of the desired PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR). Based on the IR measurement, a peak at 1,693 cm$^{-1}$ induced by a carboxylic acid decreased and a new peak at 1,669 cm$^{-1}$ induced by an amide group was observed.

Figure 14:
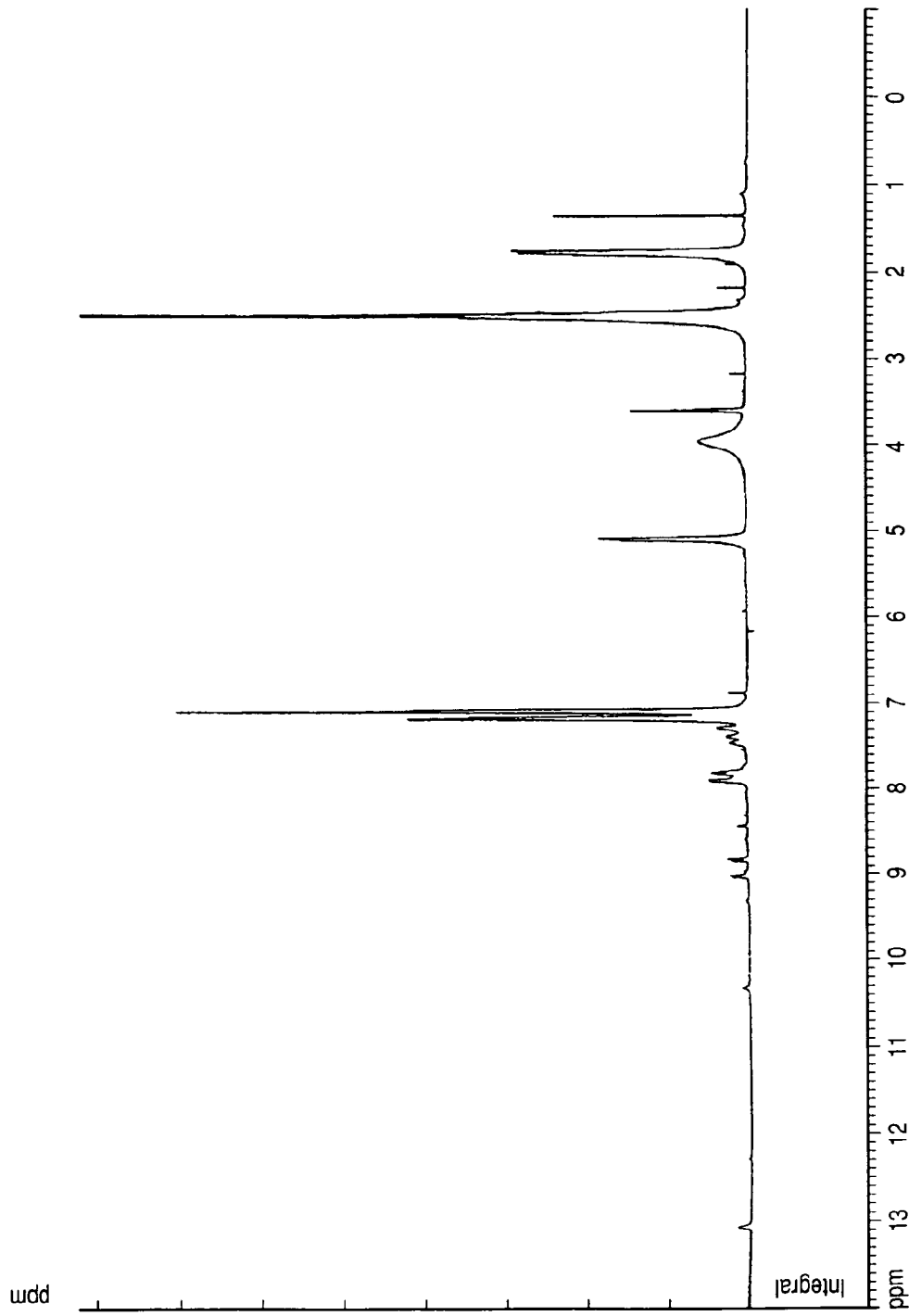
FIG. 14 is a chart showing a $^1$H-NMR spectrum of a polyester obtained in Example D-2.

A $^1$H-NMR spectrum of the obtained polymer is shown in FIG. 14. Based on the result of $^1$H-NMR, the obtained PHA was confirmed as a polyhydroxyalkanoate copolymer including 10 mol. % of a unit represented in the following chemical formula (44)

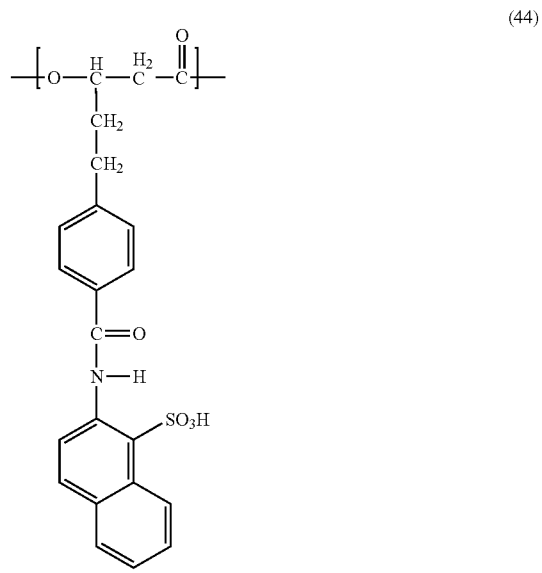

(44)

Also an average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 25,000, and a weight-average molecular weight $M_w$ of 38,000.

Example E-1

0.5% of polypeptone (supplied by Wako Pure Chemical Co.), 6 mmol/L of 5-phenylvaleric acid and 0.5 mmol/L of 5-(4-vinylphenyl) valeric acid as ω-(4-vinylphenyl)alkanoic acid were dissolved in 1,000 mL of the aforementioned M9 culture medium, then charged in a 2,000 ml shaking flask, sterilized in an autoclave, and cooled to the room temperature. Then 2 mL of a culture liquid of *Pseudomonas cichorii* YN2 strain shake-cultured in advance in an M9 culture medium containing 0.5% of polypeptone for 8 hours at 30° C. were added to the prepared culture medium, and cultivated for 40 hours at 30° C. After the cultivation, the bacteria cells were recovered by centrifuging, rinsed with methanol and dried. The dried bacteria cells were weighed, to which. chloroform was then added, followed by stirring for 15 hours at 35° C. to extract a polymer. The chloroform extract was filtered and concentrated in an evaporator. A resulting solid precipitate was collected by cold methanol and dried under a reduced pressure to obtain a desired polymer.

A structure determination of the obtained polymer was conducted by $^1$H-NMR (FT-NMR: Bruker DPX400; $^1$H resonance frequency: 400 MHz; measured nucleus species: $^1$H; solvent: CDCl$_3$; measurement temperature: room temperature).

As a result, there was confirmed a polyhydroxyalkanoate copolymer including units represented in the following chemical formula (45) with a content ratio (mol. %) A:B=94: 6.

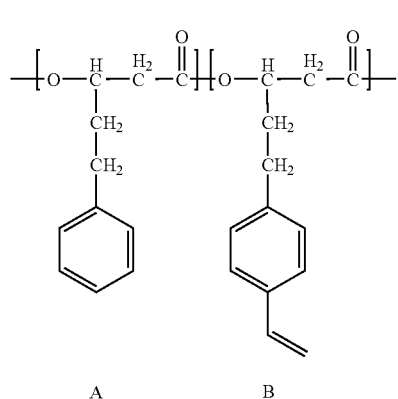

(45)

A    B

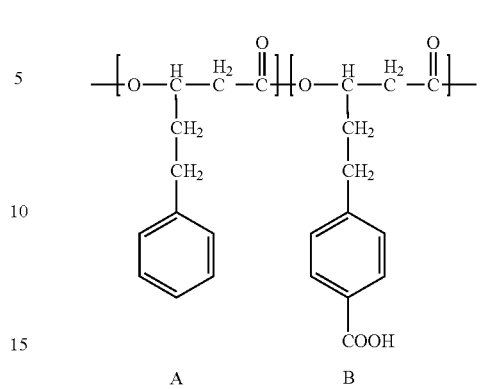

(46)

A    B

A molecular weight of the obtained polymer was measured by gel permeation chromatography (GPC) (Toso HLC-8220 GPC, column: Toso TSK-GEL Super HM-H, solvent: chloroform, conversion into polystyrene). The obtained polymer had a weight (PDW) of 0.56 g/L, a number-average molecular weight $M_n$ of 61,000, and a weight-average molecular weight $M_w$ of 197,000.

Example E-2

In a 500 mL flask, 3.3006 g of polyester containing 6 mol. % of 3-hydroxy-ω-(4-vinylphenyl)valeric acid unit which had been obtained in Example E-1, 0.8824 g of 18-crown-6-ether, 200 mL of dichloromethane and 33 mL of acetic acid were charged and stirred. The flask was immersed in an ice bath to cool the reaction system to 0° C. After 120 minutes, 0.7061 g of potassium permanganate were added and an stirring was executed for 15 hours. After the reaction, 4.044 g of sodium hydrogensulfite were added and stirred, and the liquid was brought to pH=1 by 1.0 N hydrochloric acid. After dichloromethane in the liquid mixture was distilled off in an evaporator, a polymer in the solution was recovered. The obtained polymer was washed with 450 ml of purified water and with 300 ml of methanol. It was further washed with 300 ml of purified water twice and with 100 ml of methanol, and the polymer was recovered. A drying under a reduced pressure provided 2.9168 g of the desired PHA.

A structure of the obtained polymer was determined by $^1$H-NMR (FT-NMR: Bruker DPX400; $^1$H resonance frequency: 400 MHz; measured nucleus species: $^1$H; solvent: $CDCl_3$; measurement temperature: room temperature) and Fourier-transformation infrared absorption (FT-IR) spectrum (Nicolet AVATAR360FT-IR). Based on the IR measurement, a new absorption at 1,693 $cm^{-1}$ induced by a carboxylic acid identified that the obtained PHA contained a 3-hydroxy-ω-(4-carboxyphenyl)valeric acid unit.

Also a proportion of the units of the obtained PHA was calculated by a methylesterification, utilizing trimethylsilyl-diazomethane, of a carboxyl group at an end of a side chain of the PHA in the same manner as in Example A-2.

As a result, there was confirmed a polyhydroxyalkanoate copolymer including units represented in the following chemical formula (46) with a content ratio (mol. %) A:B=95:5.

Also an average molecular weight of the PHA, obtained by a methylesterification, utilizing trimethylsilyldiazomethane, of the carboxyl group at the end of the side chain of the PHA, was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 65,000, and a weight-average molecular weight $M_w$ of 88,000.

Example E-3

In a nitrogen atmosphere, 1.3013 g of a polymer obtained in Example E-2 and containing 5 mol. % of 3-hydroxy-ω-(4-carboxyphenyl)valeric acid unit and 401.9 mg of 2-amino-1-naphthalenesulfonic acid were charged in a three-necked 100 ml flask, then stirred with 50 ml of pyridine, added with 0.94 ml of triphenyl phosphite and heated for 6 hours at 100° C. After the reaction, a reaction product was re-precipitated in 500 ml of ethanol and recovered by centrifuging. The obtained polymer was washed by stirring for 2 hours in 250 ml of purified water, then recovered by filtration, dried under a reduced pressure, dissolved in 130 ml of THF and stirred with 130 ml of 1N hydrochloric acid. After 14 hours, THF in the liquid mixture was distilled off by an evaporator, to recover the polymer in the solution. The obtained polymer was washed with 100 ml of purified water three times and dried under a reduced pressure to obtain 1.0059 g of the desired PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 $cm^{-1}$ induced by a carboxylic acid decreased and a new peak at 1,669 $cm^{-1}$ induced by an amide group was observed. Based on the result of $^1$H-NMR, the obtained PHA was confirmed as a polyhydroxyalkanoate copolymer including 4 mol. % of a unit represented in the following chemical formula (47)

(47)

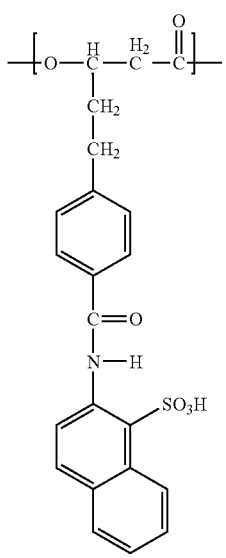

Also an average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 22,000, and a weight-average molecular weight $M_w$ of 32,000.

Example F-1

A method similar to Example E-1 was employed to obtain 132.20 g of a polyhydroxyalkanoate containing 6 mol. % of 3-hydroxy-ω-(4-vinylphenyl)valeric acid unit and 94 mol. % of 3-hydroxy-5-phenhylvaleric acid unit.

Example F-2

The polyhydroxyalkanoate synthesized in Example F-1 was processed by a method similar to that in Example E-2 to obtain 120.6 g of a polyhydroxyalkanoate containing 5 mol. % of 3-hydroxy-ω-(4-carboxyphenyl)valeric acid unit and 95.0 mol. % of 3-hydroxy-5-phenhylvaleric acid unit.

Example F-3

In a nitrogen atmosphere, 0.4010 g of a polymer obtained in Example F-2 and containing 5 mol. % of 3-hydroxy-ω-(4-carboxyphenyl)valeric acid unit and 163.1 mg of 4-aminobenzenesulfonic acid phenyl ester were charged in a two-necked 50 ml flask, then stirred with 15 ml of pyridine, added with 0.34 ml of triphenyl phosphite and heated for 6 hours at 100° C. After the reaction, a reaction product was recovered by re-precipitation in 150 ml of ethanol. The obtained polymer was washed by stirring for 2 hours in 250 ml of purified water, then recovered by filtration, dried under a reduced pressure, dissolved in 40 ml of THF and stirred with 40 ml of 1N hydrochloric acid. After 14 hours, THF in the liquid mixture was distilled off by an evaporator, to recover the polymer in the solution.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 cm$^{-1}$ induced by a carboxylic acid decreased and a new peak at 1,669 cm$^{-1}$ induced by an amide group was observed. Based on the result of $^1$H-NMR, the obtained PHA was confirmed as a polyhydroxyalkanoate copolymer including 4 mol. % of a unit represented in the following chemical formula (48)

(48)

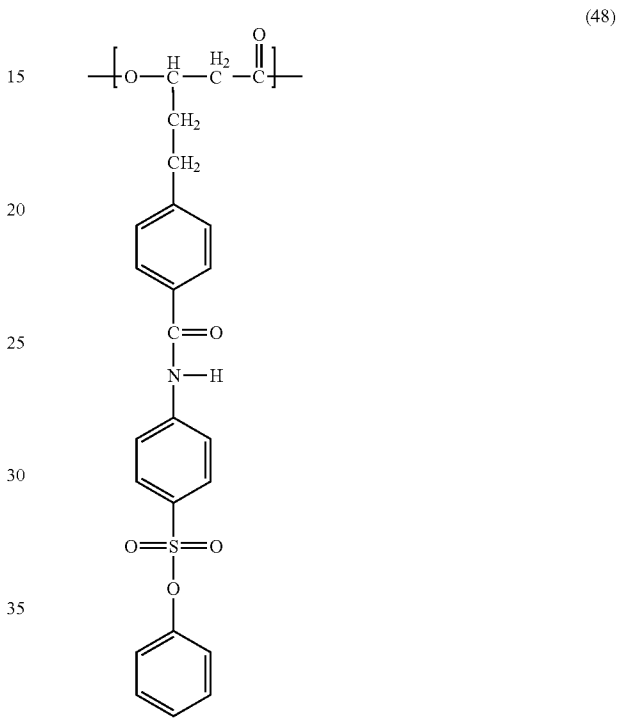

Also an average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 22,000, and a weight-average molecular weight $M_w$ of 32,000. 50 g of this compound were obtained by increasing the scale of the preparing process, and were used as an example compound F-1 for toner preparation and-evaluation.

Example G-1

A method similar to Example A-1 was employed except that 1.5 mmol/L of 5-(4-vinylphenyl)valeric acid was replaced by 0.75 mmol/L, to obtain 2,999 mg of a polyhydroxyalkanoate containing 9 mol. % of 3-hydroxy-ω-(4-vinylphenyl)valeric acid unit and 91 mol. % of 3-hydroxy-5-phenhylvaleric acid unit.

Example G-2

The polyhydroxyalkanoate synthesized in Example G-1 was processed by a method similar to that in Example A-2 to obtain 2,998 mg of a polyhydroxyalkanoate containing 7 mol.

% of 3-hydroxy-ω-(4-carboxyphenyl)valeric acid unit and 93 mol. % of 3-hydroxy-5-phenhylvaleric acid unit.

Example G-3

In a nitrogen atmosphere, 0.4025 g of a polymer obtained in Example G-2 and containing 7 mol. % of 3-hydroxy-ω-(4-carboxyphenyl)valeric acid unit and 199.6 mg of 2-aminobenzenesulfonic acid phenyl ester were charged in a two-necked 50 ml flask, then stirred with 15 ml of pyridine, added with 0.42 ml of triphenyl phosphite and heated for 6 hours at 100° C. After the reaction, a reaction product was recovered by re-precipitation in 150 ml of ethanol. The obtained polymer was washed by stirring for 2 hours in 250 ml of purified water, then recovered by filtration, dried under a reduced pressure, dissolved in 40 ml of THF and stirred with 40 ml of 1N hydrochloric acid. After 14 hours, THF in the liquid mixture was distilled off by an evaporator, to recover the polymer in the solution.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 cm$^{-1}$ induced by a carboxylic acid decreased and a new peak at 1,669 cm$^{-1}$ induced by an amide group was observed. Based on the result of $^1$H-NMR, the obtained PHA was confirmed as a polyhydroxyalkanoate copolymer including 5 mol. % of a unit represented in the following chemical formula (49)

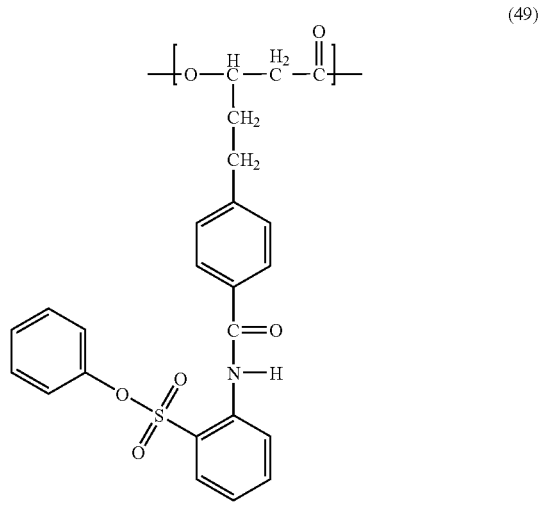

(49)

Also an average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 22,000, and a weight-average molecular weight $M_w$ of 32,000. 50 g of this compound were obtained by increasing the scale of the preparing process, and were used as an example compound G-1 for toner preparation and evaluation.

Example H-1

A method similar to Example E-1 was employed to obtain a polyhydroxyalkanoate containing 6 mol. % of 3-hydroxy-ω-(4-vinylphenyl)valeric acid unit and 94 mol. % of 3-hydroxy-5-phenhylvaleric acid unit.

Example H-2

132.20 g of polyhydroxyalkanoate synthesized in Example H-1 were placed in a four-necked 3 L flask, and were dissolved by adding 1,586 ml of acetone. The solution was immersed in an ice bath, and 264 ml of acetic acid, and 1.35 g of 18-crown-6-ether were added and stirred. Then 32.34 g of potassium permanganate were slowly added, and the mixture was stirred for 2 hours in the ice bath and 3 hours at the room temperature. After standing overnight, the mixture was again stirred for 3 hours at the room temperature. After the reaction, 3,966 ml of ethyl acetate, 1,983 ml of water and 73.40 g of sodium hydrogensulfite were added. Then the liquid was brought to pH=1 by 1.0 mol/L (1.0 N) hydrochloric acid. After stirring for 1 hour, an organic layer was extracted. The extract was distilled in an evaporator to recover a polymer. The polymer was recovered by washing with 8.4 L of purified water, then with 8.4 L of methanol, further with 8.4 L of purified water three-times and finally with 8.4 L of methanol. The obtained polymer was dissolved in 986 ml of tetrahydrofuran, and was subjected to a dialysis in a 50 L stainless steel dish containing 32 L of methanol, utilizing a dialyzing membrane (manufactured by Spectrum Inc., Spectra/Por Standard Regenerated Cellulose Dialysis Membrane 3) for a day and a night. The polymer in the dialyzing membrane was recovered and again dissolved in 986 ml of tetrahydrofuran, and was subjected to a dialysis in a 50 L stainless steel dish containing 32 L of methanol, utilizing a dialyzing membrane (manufactured by Spectrum Inc., Spectra/Por Standard Regenerated Cellulose Dialysis Membrane 3) for a day and a night. The polymer in the dialyzing membrane was recovered and dried under a reduced pressure to obtain 120.6 g of the desired PHA.

A structure of the obtained polymer was analyzed by $^1$H-NMR (FT-NMR: Bruker DPX400; $^1$H resonance frequency: 400 MHz; measured nucleus species: $^1$H; solvent: CDCl$_3$; measurement temperature: room temperature). As a result, there was confirmed a PHA containing a 3-hydroxy-ω-(4-carboxyphenyl)valeric acid unit and 3-hydroxy-5-phenylvaleric acid unit as monomer units.

Also a proportion of the units of the obtained PHA was calculated by a methylesterification, utilizing trimethylsilyldiazomethane, of a carboxyl group at an end of a side chain of the PHA. 61 mg of the object PHA were charged in a 100-ml eggplant-shaped flask and were dissolved by adding 4.2 ml of chloroform and 1.4 ml of methanol. The solution was added with 0.5 ml of a 2.0 ml/L hexane solution of trimethylsilyldiazomethane (manufactured by Aldrich Inc.) and was stirred for 30 minutes at the room temperature. After the reaction, distillation was executed in an evaporator to recover a polymer. The polymer was recovered by washing with 50 ml of methanol. A drying under a reduced pressure provided 60 mg of PHA.

An NMR analysis conducted in the same manner as in the foregoing clarified that the obtained PHA contained 5.7 mol. % of 3-hydroxy-ω-(4-carboxyphenyl)valeric acid unit, 92.0 mol. % of 3-hydroxy-5-phenylvaleric acid unit, and 2.3 mol. % of others (straight chain 3-hydroxyalkanoic acids and 3-hydroxyalkenoic acids with 4 to 12 carbon atoms).

Also on a reaction product of the obtained polymer and trimethylsilyldiazomethane, an average molecular weight was evaluated by gel permeation chromatography (GPC: Toso, column: Toso TSK-GEL Super HM-H, solvent: chloroform, conversion into polystyrene). As a result, there were obtained a number-average molecular weight $M_n$ of 30,000, and a weight-average molecular weight $M_w$ of 62,000.

Example H-3

In a nitrogen atmosphere, 103.46 g of a polymer obtained in Example H-2 and containing 5.7 mol. % of 3-hydroxy-ω-(4-carboxyphenyl)valeric acid unit and 36.19 g of 2-amino-1-naphthalenesulfonic acid were charged in a four-necked 10 L flask, then stirred with 5,405 ml of pyridine, added with 100.6 g of triphenyl phosphite and heated for 6 hours at 100° C.

After the reaction, a reaction product was re-precipitated in 54 L of ethanol and recovered by filtration. The obtained polymer was washed by stirring for 6 hours in 54 L of ion exchanged water. After the washing water was removed by decantation, the polymer was dissolved in 10.3 L of THF and mixed and stirred with 10.3 L of 1N hydrochloric acid. After stirring for 5.5 hours, the mixed solution was let to stand overnight and THF therein was distilled off in an evaporator. The obtained polymer was washed with 4 L of ion exchanged water three times to obtain 95 g of the desired PHA through drying under a reduced pressure.

A structure of the obtained polymer was determined by 1H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 cm$^{-1}$ induced by a carboxylic acid decreased and a new peak at 1,669 cm$^{-1}$ induced by an amide group was observed. Based on the result of $^1$H-NMR of the obtained polymer, it was confirmed as a polyhydroxyalkanoate copolymer including 4.6 mol. % of a unit represented in the following chemical formula (50)

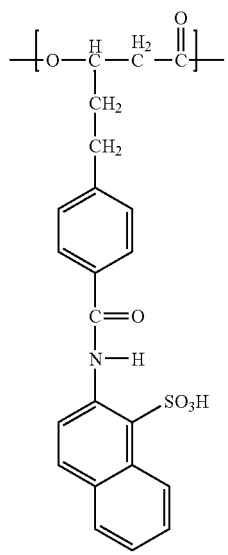

(50)

Also an average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 22,000, and a weight-average molecular weight $M_w$ of 32,000. 50 g of this compound were obtained by increasing the scale of the preparing process, and were used as an example compound H-1 for toner preparation and evaluation.

Example H-4

30 g of PHA obtained in Example H-3 were charged in a 2 L eggplant-shaped flask, then dissolved by adding 2,100 ml of chloroform and 525 ml of methanol, and were cooled to 0° C. The solution was added with 51 ml of a 2.0 ml/L hexane solution of trimethylsilyldiazomethane (manufactured by Aldrich Inc.) and was stirred for 4 hours. After the reaction, the solvent was distilled off in an evaporator to recover a polymer.

The polymer was redissolved by adding 750 ml of chloroform and 200 ml of methanol, and the solvent was distilled off in an evaporator. This operation was repeated three times.

A drying under a reduced pressure was executed to recover 28 g of PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature). Based on the result of $^1$H-NMR indicating a peak of 3 to 4 ppm induced by methyl sulfonate, it was identified that the obtained PHA was a polyhydroxyalkanoate copolymer containing 3.7 mol. % of a unit represented by the following chemical formula (51).

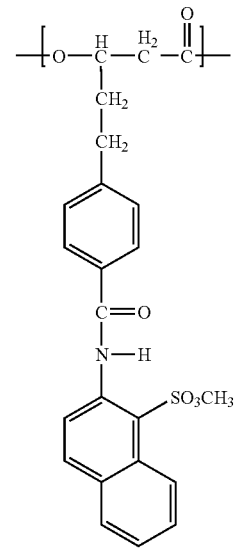

(51)

Also an acid value titration, utilizing a potentiometric titration apparatus AT510 (manufactured by Kyoto Denshi Co.), did not show a peak induced by a sulfonic acid; indicating that sulfonic acid was converted into methyl sulfonate.

An average molecular weight of the obtained PHA was evaluated by gel permeation chromatography (GPC: Toso, column: Toso PLgel 5μ MIXED-C, solvent: DMF/LiBr 0.1% (w/v), conversion into polystyrene). As a result, there were obtained a number-average molecular weight $M_n$ of 16,000, and a weight-average molecular weight $M_w$ of 35,000. 50 g of this compound were obtained by increasing the scale of the preparing process, and were used as an example compound H-2 for toner preparation and evaluation.

Example I-1

5-(4-methylphenyl)valeric acid was synthesized according to a method described in Macromolecules, 29, 1762-1766 (1996).

5.0 g of polypeptone (supplied by Wako Pure Chemical Co.), 1.0 g of 5-phenylvaleric acid and 0.2 g of 5-(4-methylphenyl)valeric acid were added in 1,000 mL of an M9 culture medium, then charged in a 2,000 ml shaking flask, and sterilized in an autoclave to prepare a culture medium.

*Pseudomonas cichorii* YN2 strain was inoculated in an M9 culture medium containing 0.5% of polypeptone and carried out a shake-culture for 8 hours at 30° C. to prepare a culture liquid of the bacteria. 10 ml of the culture liquid were added to the aforementioned culture medium containing 0.9 g of 5-phenylvaleric acid and 5-(4-methylphenyl)valeric acid as substrate, and a culture was conducted for 40 hours at 30° C. After the culture, the bacteria cells were recovered by centrifuging, rinsed with methanol and dried under a reduced pressure.

The dried bacteria cells, after weighing, were stirred with chloroform for 72 hours at 25° C. to extract a polymer accumulated in the bacteria cells. The chloroform extract was filtered, then a filtrate was concentrated in an evaporator, and a polymer was re-dissolved in acetone and an insoluble portion was eliminated by filtration. Then the filtrate was concentrated in an evaporator, then cold methanol was added and a solid precipitate was collected and dried under a reduced pressure to obtain a desired polymer. A dry weight of the polymer recovered by the foregoing recovery process was weighed.

A structure determination of the obtained polymer was conducted by $^1$H-NMR (FT-NMR: Bruker DPX400; $^1$H resonance frequency: 400 MHz; measured nucleus species: $^1$H; solvent: CDCl$_3$; measurement temperature: room temperature).

As a result, there was confirmed a polyhydroxyalkanoate copolymer including units represented in the following chemical formula (56) with a content ratio (mol. %) A:B=93: 7.

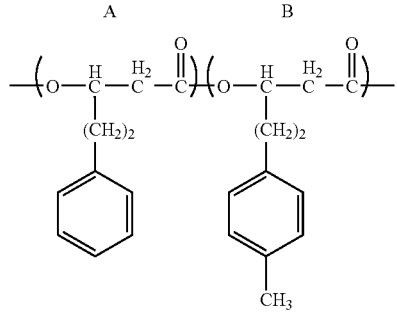

(56)

A molecular weight of the obtained polymer was measured by gel permeation chromatography (GPC) (Toso HLC-8220 GPC, column: Toso TSK-GEL Super HM-H, solvent: chloroform, conversion into polystyrene).

The obtained polymer had a weight (PDW) of 0.41 g/L, a number-average molecular weight $M_n$ of 69,000, and a weight-average molecular weight $M_w$ of 156,000.

Example I-2

The polyhydroxyalkanoate synthesized in Example I-1 was processed by a method similar to that in Example E-2 to obtain 2.9537 g of polyhydroxyalkanoate containing 6 mol. % of 3-hydroxy-ω-(4-carboxyphenyl)valeric acid unit and 94.0 mol. % of 3-hydroxy-5-phenylvaleric acid unit.

Example I-3

The polyhydroxyalkanoate synthesized in Example I-2 was processed by a method similar to that in Example E-3. As a result there was confirmed a polyhydroxyalkanoate copolymer including 5 mol. % of a unit represented by a following formula (57):

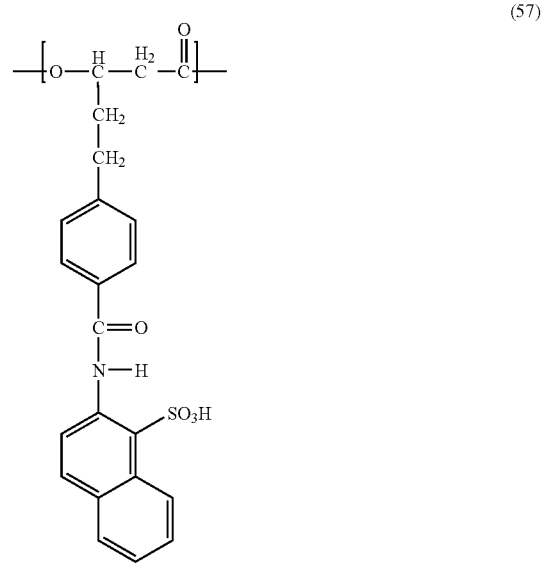

(57)

Also an average molecular weight of the obtained PHA was evaluated in the same manner as in Example E-3. As a result, there were obtained a number-average. molecular weight $M_n$ of 19,000, and a weight-average molecular weight $M_w$ of 41,000.

Example J-1

A method similar to Example G-1 was employed to obtain 3,000 mg of a polyhydroxyalkanoate containing 9 mol. % of 3-hydroxy-ω-(4-vinylphenyl)valeric acid unit and 91 mol. % of 3-hydroxy-5-phenhylvaleric acid unit.

Example J-2

The polyhydroxyalkanoate synthesized in Example J-1 was processed by a method similar to that in Example A-2 to obtain 2,990 mg of a polyhydroxyalkanoate containing 7 mol. % of 3-hydroxy-ω-(4-carboxyphenyl)valeric acid unit and 93 mol. % of 3-hydroxy-5-phenhylvaleric acid unit.

Example J-3

In a nitrogen atmosphere, 1.5002 g of a polymer obtained in Example J-2 and containing 7 mol. % of 3-hydroxy-ω-(4- carboxyphenyl)valeric acid unit and 448.6 mg of 2-amino-2-methylpropanesulfonic acid were charged in a three-necked 100 ml flask, then stirred with 56.5 ml of pyridine, added with 1.53 ml of triphenyl phosphite and heated for 6 hours at 100° C.

After the reaction, a reaction product was recovered by re-precipitation in 565 ml of ethanol and filtration. The obtained polymer was washed by stirring for 5.5 hours in 565 ml of purified water, then recovered by filtration, dried under a reduced pressure, dissolved in 150 ml of THF and stirred with 150 ml of 1N hydrochloric acid. After 14 hours, THF in the liquid mixture was distilled off by an evaporator, to recover the polymer in the solution.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 cm$^{-1}$ induced by a carboxylic acid decreased and a new peak at 1,669 cm$^{-1}$ induced by an amide group was observed. Based on the result of $^1$H-NMR that a peak induced by a methyl group at 1.446 ppm was shifted by an introduction of 2-amino-2-methylpropanesulfonic acid, there was confirmed a polyhydroxyalkanoate copolymer including 7 mol. % of a unit represented by the following chemical formula (58).

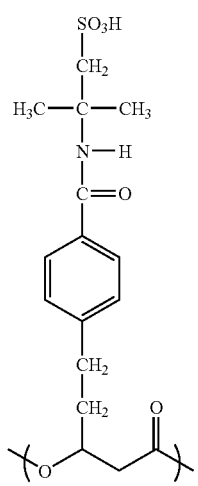

(58)

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 21,000, and a weight-average molecular weight $M_w$ of 33,000.

Example J-4

1.0020 g of PHA obtained in Example J-3 were charged in a 300 ml eggplant-shaped flask, then dissolved by adding 70 ml of chloroform and 17.5 ml of methanol, and were cooled to 0° C. The solution was added with 27.9 ml of a 2 mol/L hexane solution of trimethylsilyldiazomethane (manufactured by Aldrich Inc.) and was stirred for 4 hours. After the reaction, the solvent was distilled off in an evaporator to recover a polymer.

The polymer was redissolved by adding 70 ml of chloroform and 17.5 ml of methanol, and the solvent was distilled off in an evaporator. This operation was repeated three times.

The recovered polymer was dried under a reduced pressure to obtain 0.9560 g of PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature). Based on the result of $^1$H-NMR indicating a peak of 3 to 4 ppm induced by methyl sulfonate, it was identified that the obtained PHA was a polyhydroxyalkanoate copolymer containing 7 mol. % of a unit represented by the following chemical formula (59).

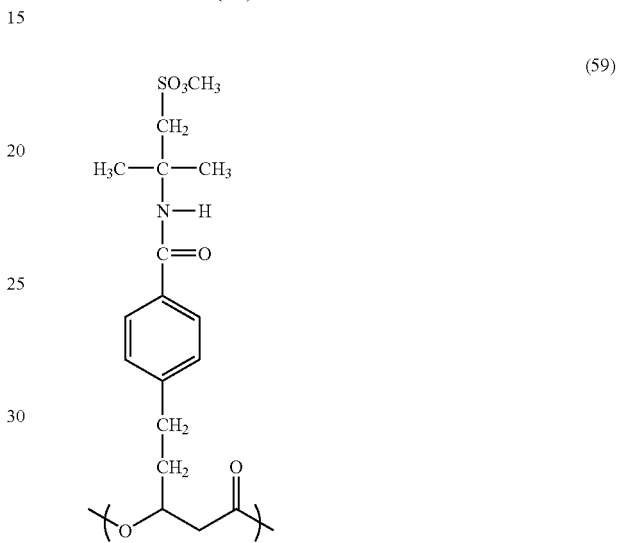

(59)

Also an acid value titration, utilizing a potentiometric titration apparatus AT510 (manufactured by Kyoto Denshi Co.), did not show a peak induced by a sulfonic acid, indicating that sulfonic acid was converted into methyl sulfonate.

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$, of 17,000, and a weight-average molecular weight $M_w$ of 32,000.

Example K-1

A method similar to Example G-1 was employed to obtain 2,990 mg of a polyhydroxyalkanoate containing 9 mol. % of 3-hydroxy-ω-(4-vinylphenyl)valeric acid unit and 91 mol. % of 3-hydroxy-5-phenhylvaleric acid unit.

Example K-2

The polyhydroxyalkanoate synthesized in Example K-1 was processed by a method similar to that in Example A-2 to obtain 2,975 mg of a polyhydroxyalkanoate containing 7 mol. % of 3-hydroxy-ω-(4-carboxyphenyl)valeric acid unit and 93 mol. % of 3-hydroxy-5-phenhylvaleric acid unit.

Example K-3

In a nitrogen atmosphere, 1.4996 g of a polymer obtained in Example K-2 and containing 7 mol. % of 3-hydroxy-ω-(4- carboxyphenyl)valeric acid unit and 507.2 mg of 2-aminobenzenesulfonic acid were charged in a three-necked 100 ml flask, then stirred with 56.5 ml of pyridine, added with 1.53 ml of triphenyl phosphite and heated for 6 hours at 100° C. After the reaction, a reaction product was recovered by re-precipitation in 565 ml of ethanol and filtration. The obtained polymer was washed by stirring for 5.5 hours in 565 ml of purified water, then recovered by filtration, dried under a reduced pressure, dissolved in 150 ml of THF and stirred with 150 ml of 1N hydrochloric acid. After 14 hours, THF in the liquid mixture was distilled off by an evaporator, to recover the polymer in the solution.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 cm$^{-1}$ induced by a carboxylic acid decreased and a new peak at 1,671 cm$^{-1}$ induced by an amide group was observed.

Figure 15:
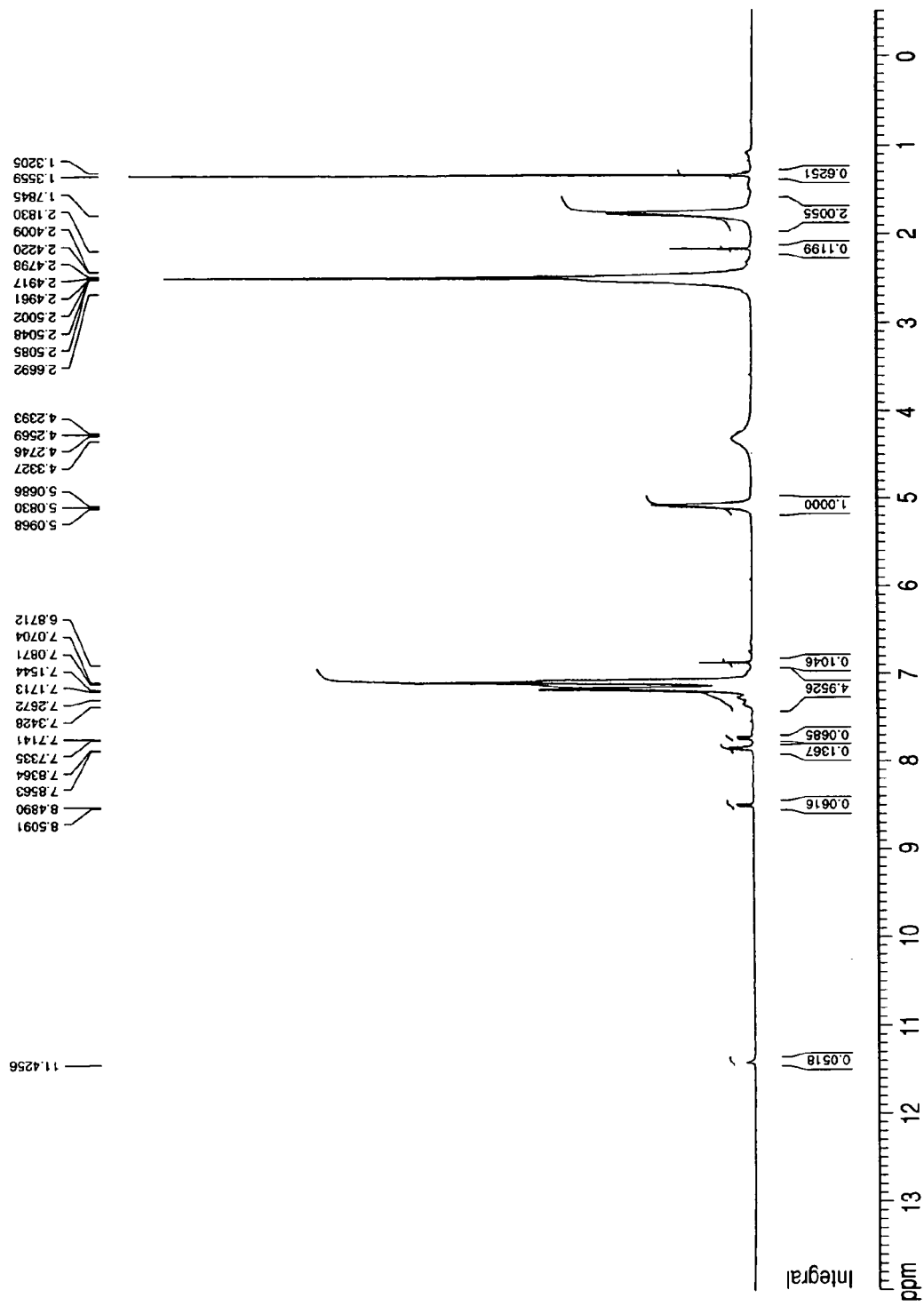
FIG. 15 is a chart showing a $^1$H-NMR spectrum of a polyester obtained in Example K-3.

FIG. 15 shows a $^1$H-NMR spectrum of the obtained polymer. Based on the result of $^1$H-NMR that peaks induced by an aromatic ring by the introduction of 2-aminobenzenesulfonic acid were observed at 7.71 and 8.50, the obtained PHA was confirmed as a polyhydroxyalkanoate copolymer including 7 mol. % of a unit represented by the following chemical formula (60).

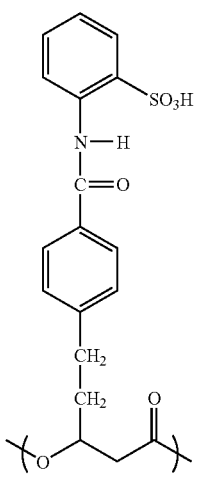

(60)

An average molecular weight of the obtained PHA was evaluated by gel permeation chromatography (GPC: Toso, column: Polymer Laboratories PLgel 5µ MIXED-C, solvent: DMF/LiBr 0.1% (w/v), conversion into polystyrene). As a result, there were obtained a number-average molecular weight $M_n$ of 25,000, and a weight-average molecular weight $M_w$ of 37,000.

Example K-4

1.0010 g of PHA obtained in Example K-3 were charged in a 300 ml eggplant-shaped flask, then dissolved by adding 70 ml of chloroform and 17.5 ml of methanol, and were cooled to 0° C. The solution was added with 27.9 ml of a 2 mol/L hexane solution of trimethylsilyldiazomethane (manufactured by Aldrich Inc.) and was stirred for 4 hours. After the reaction, the solvent was distilled off in an evaporator to recover a polymer.

The polymer was redissolved by adding 70 ml of chloroform and 17.5 ml of methanol, and the solvent was distilled off in an evaporator. This operation was repeated three times.

The recovered polymer was dried under a reduced pressure to obtain 0.9023 g of PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature). Based on the result of $^1$H-NMR indicating a peak of 3 to 4 ppm induced by methyl sulfonate, it was identified that the obtained PHA was a polyhydroxyalkanoate copolymer containing 7 mol. % of a unit represented by the following chemical formula (61).

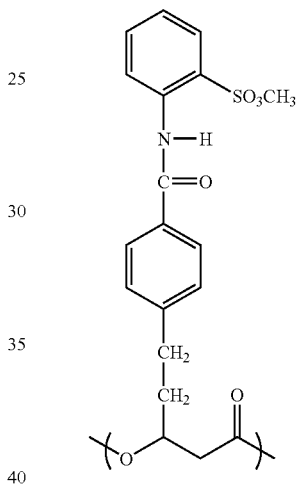

(61)

Also an acid value titration, utilizing a potentiometric titration apparatus AT510 (manufactured by Kyoto Denshi Co.), did not show a peak induced by a sulfonic acid, indicating that sulfonic acid was converted into methyl sulfonate.

An average molecular weight of the obtained PHA was evaluated by gel permeation chromatography (GPC: Toso, column: Polymer Laboratories PLgel 5µ MIXED-C, solvent: DMF/LiBr 0.1% (w/v), conversion into polystyrene). As a result, there were obtained a number-average molecular weight $M_n$ of 23,000, and a weight-average molecular weight $M_w$ of 34,000.

Example L-1

A method similar to Example G-1 was employed to obtain 3,120 mg of a polyhydroxyalkanoate containing 9 mol. % of 3-hydroxy-ω-(4-vinylphenyl)valeric acid unit and 91 mol. % of 3-hydroxy-5-phenhylvaleric acid unit.

Example L-2

The polyhydroxyalkanoate synthesized in Example L-1 was processed by a method similar to that in Example A-2 to obtain 3,050 mg of a polyhydroxyalkanoate containing 7 mol.

% of 3-hydroxy-ω-(4-carboxyphenyl)valeric acid unit and 93 mol. % of 3-hydroxy-5-phenhylvaleric acid unit.

Example L-3

In a nitrogen atmosphere, 1.5020 g of a polymer obtained in Example L-2 and containing 7 mol. % of 3-hydroxy-ω-(4-carboxyphenyl)valeric acid unit and 595.7 mg of 4-methoxyaniline-2-sulfonic acid were charged in a three-necked 100 ml flask, then stirred with 56.5 ml of pyridine, added with 1.53 ml of triphenyl phosphite and heated for 6 hours at 100° C. After the reaction, a reaction product was recovered by re-precipitation in 565 ml of ethanol and filtration. The obtained polymer was washed by stirring for 5.5 hours in 565 ml of purified water, then recovered by filtration, dried under a reduced pressure, dissolved in 150 ml of THF and stirred with 150 ml of 1N hydrochloric acid. After 13 hours, THF in the liquid mixture was distilled off by an evaporator, to recover the polymer in the solution.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 cm$^{-1}$ induced by a carboxylic acid decreased and a new peak at 1,670 cm$^{-1}$ induced by an amide group was observed.

Figure 16:
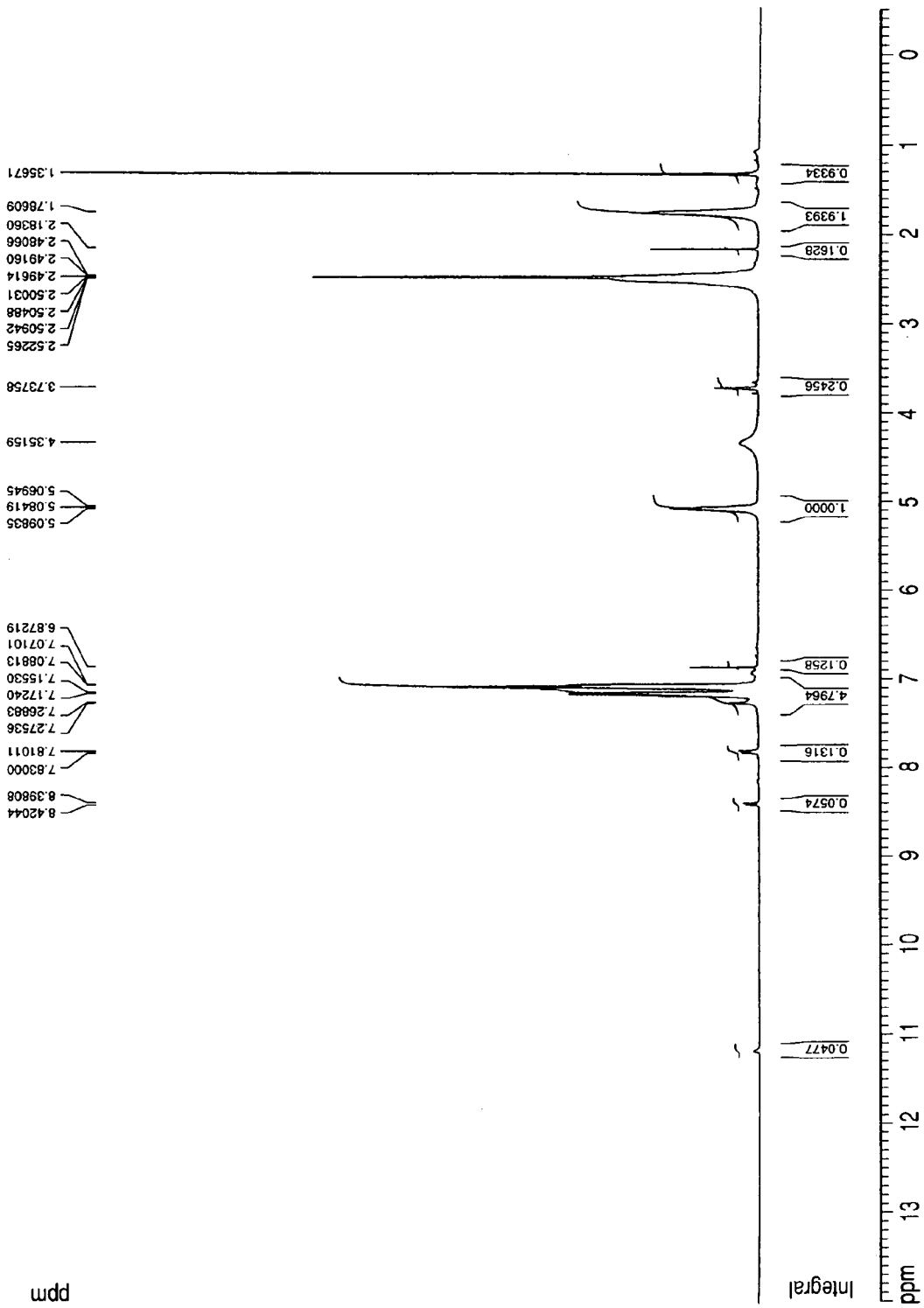
FIG. 16 is a chart showing a $^1$H-NMR spectrum of a polyester obtained in Example L-3.

FIG. 16 shows a $^1$H-NMR spectrum of the obtained polymer. Based on the result of $^1$H-NMR that a peak induced by an aromatic ring by the introduction of 4-methoxyaniline-2-sulfonic acid was observed at 8.40, the obtained PHA was confirmed as a polyhydroxyalkanoate copolymer including 6 mol. % of a unit represented by the following chemical formula (62).

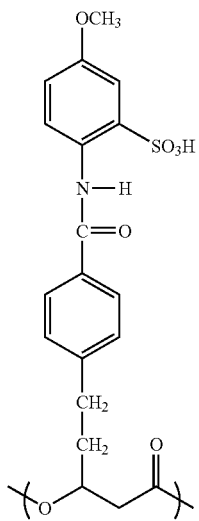

(62)

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 35,000, and a weight-average molecular weight $M_w$ of 48,000.

Example L-4

0.9887 g of PHA obtained in Example L-3 were charged in a 300 ml eggplant-shaped flask, then dissolved by adding 70 ml of chloroform and 17.5 ml of methanol, and were cooled to 0° C. The solution was added with 27.9 ml of a 2 mol/L hexane solution of trimethylsilyldiazomethane (manufactured by Aldrich Inc.) and was stirred for 4 hours. After the reaction, the solvent was distilled off in an evaporator to recover a polymer.

The polymer was redissolved by adding 70 ml of chloroform and 17.5 ml of methanol, and the solvent was distilled off in an evaporator. This operation was repeated three times.

The recovered polymer was dried under a reduced pressure to obtain 0.9331 g of PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature). Based on the result of $^1$H-NMR indicating a peak of 3 to 4 ppm induced by methyl sulfonate, it was identified that the obtained PHA was a polyhydroxyalkanoate copolymer containing 6 mol. % of a unit represented by the following chemical formula (63).

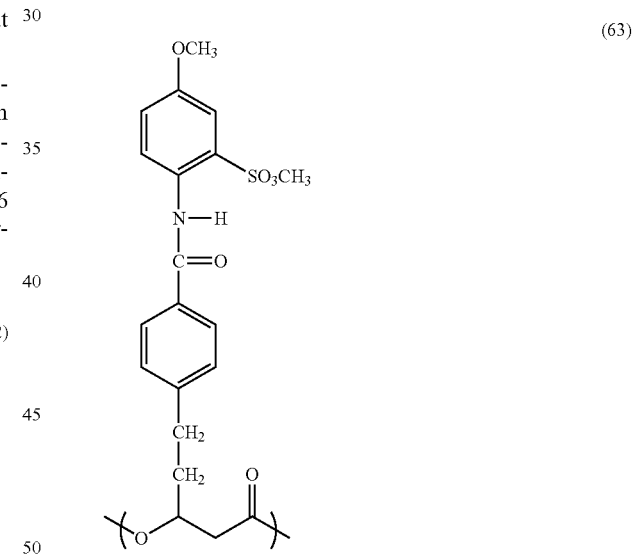

(63)

Also an acid value titration, utilizing a potentiometric titration apparatus AT510 (manufactured by Kyoto Denshi Co.), did not show a peak induced by a sulfonic acid, indicating that sulfonic acid was converted into methyl sulfonate.

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 32,000, and a weight-average molecular weight $M_w$ of 43,000.

Example M-1

A method similar to Example G-1 was employed to obtain 3,300 mg of a polyhydroxyalkanoate containing 9 mol. % of 3-hydroxy-ω-(4-vinylphenyl)valeric acid unit and 91 mol. % of 3-hydroxy-5-phenhylvaleric acid unit.

Example M-2

The polyhydroxyalkanoate synthesized in Example M-1 was processed by a method similar to that in Example A-2 to obtain 3,230 mg of a polyhydroxyalkanoate containing 7 mol. % of 3-hydroxy-ω-(4-carboxyphenyl)valeric acid unit and 93 mol. % of 3-hydroxy-5-phenhylvaleric acid unit.

Example M-3

In a nitrogen atmosphere, 1.5003 g of a polymer obtained in Example M-2 and containing 7 mol. % of 3-hydroxy-ω-(4-carboxyphenyl)valeric acid unit and 653.2 mg of 1-naphthylamine-8-sulfonic acid were charged in a three-necked 100 ml flask, then stirred with 56.5 ml of pyridine, added with 1.53 ml of triphenyl phosphite and heated for 6 hours at 100° C. After the reaction, a reaction product was recovered by re-precipitation in 565 ml of ethanol and filtration. The obtained polymer was washed by stirring for 5.5 hours in 565 ml of purified water, then recovered by filtration, dried under a reduced pressure, dissolved in 150 ml of THF and stirred with 150 ml of 1N hydrochloric acid. After 14 hours, THF in the liquid mixture was distilled off by an evaporator, to recover the polymer in the solution.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at ,1693 cm$^{-1}$ induced by a carboxylic acid decreased and a new peak at 1,669 cm$^{-1}$ induced by an amide group was observed.

Figure 17:
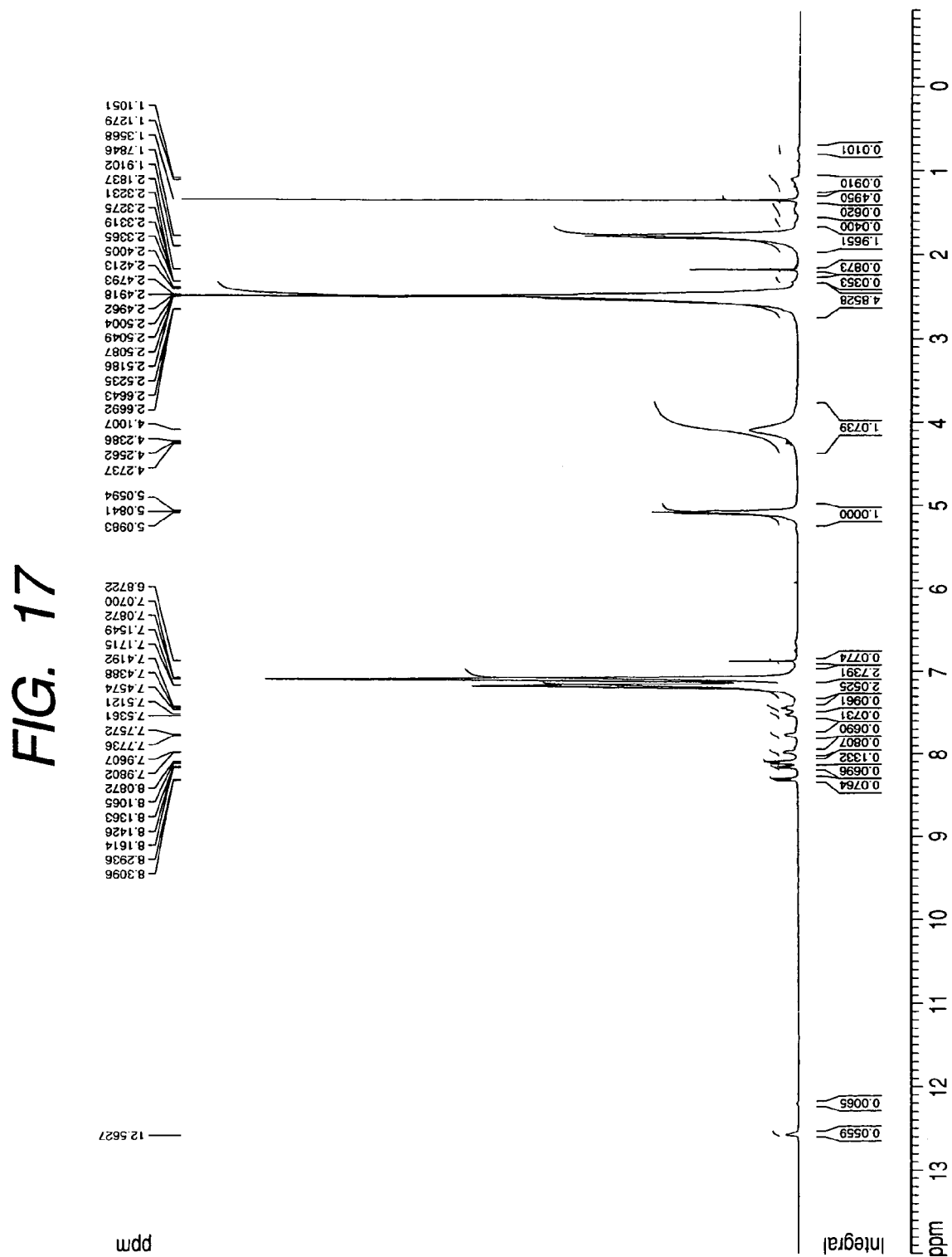
FIG. 17 is a chart showing a $^1$H-NMR spectrum of a polyester obtained in Example M-3.

FIG. 17 shows a $^1$H-NMR spectrum of the obtained polymer. Based on the result of $^1$H-NMR showing a shift in a peak induced by a naphthyl group, the obtained PHA was confirmed as a polyhydroxyalkanoate copolymer including 7 mol. % of a unit represented by the following chemical formula (64).

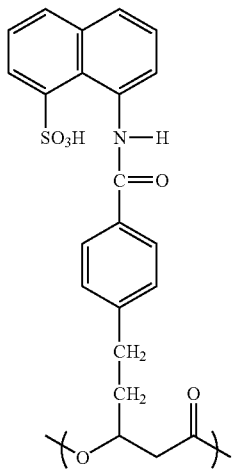

(64)

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 30,000, and a weight-average molecular weight $M_w$ of 43,000.

Example M-4

1.0030 g of PHA obtained in Example M-3 were charged in a 300 ml eggplant-shaped flask, then dissolved by adding 70 ml of chloroform and 17.5 ml of methanol, and were cooled to 0° C. The solution was added with 27.9 ml of a 2 mol/L hexane solution of trimethylsilyldiazomethane (manufactured by Aldrich Inc.) and was stirred for 4 hours. After the reaction, the solvent was distilled off in an evaporator to recover a polymer.

The polymer was redissolved by adding 70 ml of chloroform and 17.5 ml of methanol, and the solvent was distilled off in an evaporator. This operation was repeated three times.

The recovered polymer was dried under a reduced pressure to obtain 0.9023 g of PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature). Based on the result of $^1$H-NMR indicating a peak of 3 to 4 ppm induced by methyl sulfonate, it was identified that the obtained PHA was a polyhydroxyalkanoate copolymer containing 7 mol. % of a unit represented by the following chemical formula (65).

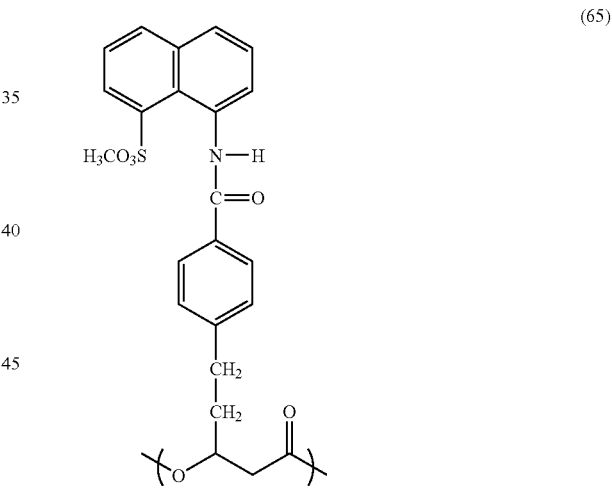

(65)

Also an acid value titration, utilizing a potentiometric titration apparatus AT510 (manufactured by Kyoto Denshi Co.), did not show a peak induced by a sulfonic acid, indicating that sulfonic acid was converted into methyl sulfonate.

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 28,000, and a weight-average molecular weight $M_w$ of 42,000.

Example N-1

A method similar to Example G-1 was employed to obtain 3,085 mg of a polyhydroxyalkanoate containing 9 mol. % of 3-hydroxy-ω-(4-vinylphenyl)valeric acid unit and 91 mol. % of 3-hydroxy-5-phenhylvaleric acid unit.

Example N-2

The polyhydroxyalkanoate synthesized in Example N-1 was processed by a method similar to that in Example A-2 to obtain 2,997 mg of a polyhydroxyalkanoate containing 7 mol. % of 3-hydroxy-ω-(4-carboxyphenyl)valeric acid unit and 93 mol. % of 3-hydroxy-5-phenhylvaleric acid unit.

Example N-3

In a nitrogen atmosphere, 1.5023 g of a polymer obtained in Example N-2 and containing 7 mol. % of 3-hydroxy-ω-(4-carboxyphenyl)valeric acid unit and 548.2 mg of methyl 2-aminobenzenesulfonate were charged in a three-necked 100 ml flask, then stirred with 56.5 ml of pyridine, added with 1.53 ml of triphenyl phosphite and heated for 6 hours at 100° C. After the reaction, a reaction product was recovered by re-precipitation in 565 ml of ethanol and filtration. The obtained polymer was washed by stirring for 5.5 hours in 565 ml of purified water, then recovered by filtration, dried under a reduced pressure, dissolved in 150 ml of THF and stirred with 150 ml of 1N hydrochloric acid. After 14 hours, THF in the liquid mixture was distilled off by an evaporator, to recover the polymer in the solution.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 $cm^{-1}$ induced by a carboxylic acid decreased and a new peak at 1,670 $cm^{-1}$ induced by an amide group was observed.

Based on the result of $^1$H-NMR showing a shift in a peak induced by an aromatic ring, the obtained PHA was confirmed as a polyhydroxyalkanoate copolymer including 7 mol. % of a unit represented by the following chemical formula (66).

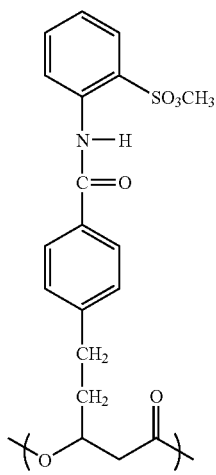

(66)

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$, of 30,000, and a weight-average molecular weight $M_w$, of 45,000.

Example O 10.00 g of 2-amino-1-naphthalenesulfonic acid (manufactured by Tokyo Kasei Kogyo Co.) were charged in a 2 L eggplant-shaped flask, then dissolved by adding 1,400 ml of chloroform and 460 ml of methanol, and were cooled to 0° C. The solution was added with 113 ml of a 2 mol/L hexane solution of trimethylsilyldiazomethane (manufactured by Aldrich Inc.) and was stirred for 2 hours. After the reaction, crystals precipitating in the reaction were eliminated by filtration, and a filtrate containing desired methyl 2-amino-1-naphthalenesulfonate was recovered. The solution containing methyl 2-amino-1-naphthalenesulfonate was subjected to distilling off of the solvent in an evaporator whereby a crude product was recovered.

The obtained crude product was purified by a silica gel column chromatography to obtain 2.45 g of methyl 2-amino-1-naphthalenesulfonate.

A structure of the obtained compound was determined by $^1$H-NMR (FT-NMR: Bruker DPX400; $^1$H resonance frequency: 400 MHz; measured nucleus species: $^1$H; solvent: deuterized DMSO; measurement temperature: room temperature). As a result, there was confirmed methyl 2-amino-1-naphthalenesulfonate represented by the following chemical formula (67).

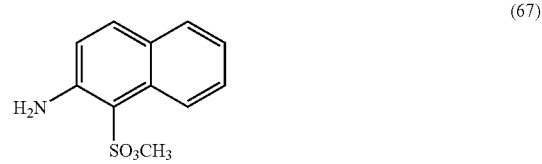

(67)

Example P-1

A method similar to Example G-1 was employed to obtain 3,150 mg of a polyhydroxyalkanoate containing 9 mol. % of 3-hydroxy-ω-(4-vinylphenyl)valeric acid unit and 91 mol. % of 3-hydroxy-5-phenhylvaleric acid unit.

Example P-2

The polyhydroxyalkanoate synthesized in Example P-1 was processed by a method similar to that in Example A-2 to obtain 3,018 mg of a polyhydroxyalkanoate containing 7 mol. % of 3-hydroxy-ω-(4-carboxyphenyl)valeric acid unit and 93 mol. % of 3-hydroxy-5-phenhylvaleric acid unit.

Example P-3

In a nitrogen atmosphere, 1.5005 g of a polymer obtained in Example P-2 and containing 7 mol. % of 3-hydroxy-ω-(4-carboxyphenyl)valeric acid unit and 694.8 mg of methyl 2-amino-1-naphthalenesulfonate obtained in Example O were charged in a three-necked 100 ml flask, then stirred with 56.5 ml of pyridine, added with 1.53 ml of triphenyl phosphite and heated for 6 hours at 100° C. After the reaction, a reaction product was recovered by re-precipitation in 565 ml of ethanol and filtration. The obtained polymer was washed by stirring for 5.5 hours in 565 ml of purified water, then recovered by filtration, dried under a reduced pressure, dissolved in 150 ml of THF and stirred with 150 ml of 1N hydrochloric acid. After 14 hours, THF in the liquid mixture was distilled off by an evaporator, to recover the polymer in the solution. A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 cm$^{-1}$ induced by a carboxylic acid decreased and a new peak at 1,670 cm$^{-1}$ induced by an amide group was observed.

Based on the result of $^1$H-NMR showing a shift in a peak induced by a naphthyl group, the obtained PHA was confirmed as a polyhydroxyalkanoate copolymer including 6 mol. % of a unit represented by the following chemical formula (68).

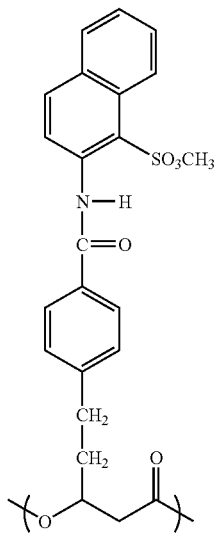

(68)

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 31,000, and a weight-average molecular weight $M_w$ of 41,000.

Example Q-1

Three 2,000 ml shaking flasks were prepared. 0.5 wt. % of polypeptone (supplied by Wako Pure Chemical Co.), 6.0 mmol/L of 5-(phenylsulfanyl)valeric acid and 1 mmol/L of 5-(4-vinylphenyl)valeric acid were dissolved in 1,000 mL of the aforementioned M9 culture medium, then charged in each of the 2,000 ml shaking flasks, sterilized in an autoclave, and cooled to the room temperature. Then 10 mL of a culture liquid of *Pseudomonas cichorii* YN2 strain, shake-cultured in advance in an M9 culture medium containing 0.5% of polypeptone for 8 hours, were added to the prepared culture medium, and culture was conducted for 38 hours at 30° C. After the culture, the culture liquids were collected and the bacteria cells were recovered by centrifuging, rinsed with methanol and dried. The dried bacteria cells, after weighing, were stirred with chloroform for 25 hours at 35° C. to extract a polymer. The chloroform extract was filtered through a 0.45 μm membrane filter, then concentrated in an evaporator, and re-precitated in cold methanol to recover the polymer. Then a desired polymer was obtained by drying under a reduced pressure. Dry weight of the obtained polymer measured 1111 mg of PHA in this Example.

An average molecular weight of the obtained PHA was measured by gel permeation chromatography (GPC) (Toso HLC-8220 GPC, column: Toso TSK-GEL Super HM-H, solvent: chloroform, molecular weight converted into polystyrene). As a result, the obtained polymer had a number-average molecular weight $M_n$ of 105,000, and a weight-average molecular weight $M_w$ of 130,000.

A structure determination of the obtained polymer was conducted by $^1$H-NMR (FT-NMR: Bruker DPX400; $^1$H resonance frequency: 400 MHz; measured nucleus species: $^1$H; solvent: CDCl$_3$; measurement temperature: room temperature).

As a result, there was confirmed a polyhydroxyalkanoate copolymer including as a monomer unit a 3-hydroxy-5-(phenylsulfanyl)valeric acid unit and a 3-hydroxy-ω-(4-vinylphenyl)valeric acid unit represented by the following chemical formula (69).

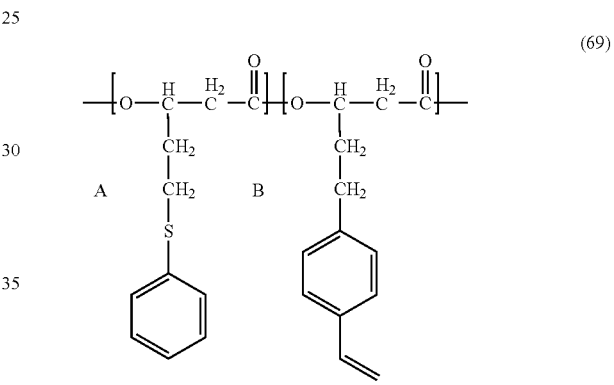

(69)

Also based on $^1$H-NMR spectrum, a proportion of the units was confirmed as 70 mol. % of 3-hydroxy-5-(phenylsulfanyl) valeric acid unit, 20 mol. % of 3-hydroxy-ω-(4-vinylphenyl) valeric acid unit, and 10 mol. % of others (straight chain 3-hydroxyalkanoic acids with 4 to 12 carbon atoms).

Example Q-2

In a 200 mL eggplant-shaped flask, 302 mg of polyhydroxyalkanoate obtained in Example Q-1 were charged and dissolved by adding 20 ml of dichloromethane. The solution was placed in an ice bath, and 3 ml of acetic acid and 1,103 mg of 18-crown-6-ether were added and stirred. Then in the ice bath, 877 mg of potassium permanganate were added slowly and an stirring was executed for 21 hours at the room temperature. After the reaction, 50 ml of water and 3,050 mg of sodium hydrogensulfite were added. Then the liquid was brought to pH=1 by 1.0 mol/L (1.0 N) hydrochloric acid. After dichloromethane in the liquid mixture was distilled off in an evaporator, a polymer in the solution was recovered. The polymer was washed with 150 ml of purified water, with 150 ml of methanol, then with 150 ml of purified water twice and finally with 50 ml of methanol thereby obtaining a polymer. A drying under a reduced pressure provided 342 mg of the desired PHA.

A structure of the obtained PHA was determined by $^1$H-NMR (FT-NMR: Bruker DPX400; $^1$H resonance frequency: 400 MHz; measured nucleus species: $^1$H; solvent: deuterized DMSO; measurement temperature: room temperature). As a result, there was confirmed a polyhydroxyalkanoate copolymer including a 3-hydroxy-5-(phenylsulfonyl)valeric acid unit and a 3-hydroxy-ω-(4-carboxyphenyl) valeric acid unit represented in the following chemical formula (70).

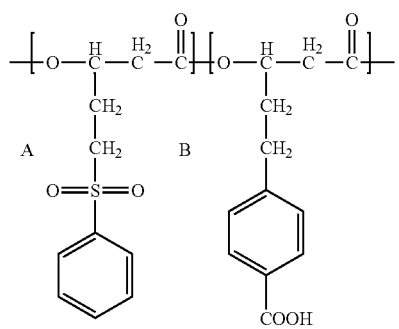

(70)

Also a proportion of the units of the obtained PHA was calculated by a methylesterification, utilizing trimethylsilyldiazomethane, of a carboxyl group at an end of a side chain of the PHA.

30 mg of the objective PHA were charged in a 100-ml eggplant-shaped flask and were dissolved by adding 2.1 ml of chloroform and 0.7 ml of methanol. The solution was added with 0.5 ml of a 2 mol/L hexane solution of trimethylsilyldiazomethane (manufactured by Aldrich Inc.) and was stirred for 30 minutes at the room temperature. After the reaction, the solvent was distilled off in an evaporator to recover a polymer. The polymer was recovered by washing with 50 ml of methanol. A drying under a reduced pressure provided 31 mg of PHA.

An NMR analysis was conducted in the same manner as in the foregoing. Based on a $^1$H-NMR spectrum, the units were confirmed to have a proportion of 74 mol. % of 3-hydroxy-5-(phenylsulfonyl)valeric acid unit, 17 mol. % of 3-hydroxy-ω-(4-carboxyphenyl)valeric acid unit and 9 mol. % of others (straight chain 3-hydroxyalkanoic acids with 4 to 12 carbon atoms).

Also an average molecular weight of the PHA, obtained by a methylesterification of the carboxyl group at the end of the side chain of the PHA using trimethylsilyldiazomethane was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 85,000, and a weight-average molecular weight $M_w$ of 110,000.

2 g of PHA were obtained by increasing the scale of the above-explained method and were utilized in Example Q-3.

Example Q-3

In a nitrogen atmosphere, 1.5003 g of a polymer obtained in Example Q-2 and containing 17 mol. % of 3-hydroxy-ω-(4-carboxyphenyl)valeric acid unit and 1,201 mg of 2-amino-1-naphthalenesulfonic acid were charged in a three-necked 100 ml flask, then stirred with 56.5 ml of pyridine, added with 2.82 ml of triphenyl phosphite and heated for 6 hours at 100° C. After the reaction, a reaction product was recovered by re-precipitation in 565 ml of ethanol. The obtained polymer was washed by stirring for 5.5 hours in 565 ml of purified water, then recovered by filtration, dried under a reduced pressure, dissolved in 150 ml of THF and stirred with 150 ml of 1N hydrochloric acid. After 14 hours, THF in the liquid mixture was distilled off by an evaporator, to recover the polymer in the solution.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature) and Fourier-transformation infrared absorption (FT-IR) spectrum (Nicolet AVATAR360FT-IR).

Based on the IR measurement, a peak at 1,693 cm$^{-1}$ induced by a carboxylic acid decreased and a new peak at 1,671 cm$^{-1}$ induced by an amide group was observed.

Based on the result of $^1$H-NMR showing a shift in a peak induced by a naphthyl group, the obtained PHA was confirmed as a polyhydroxyalkanoate copolymer including 15 mol. % of a unit represented by the following chemical formula (71).

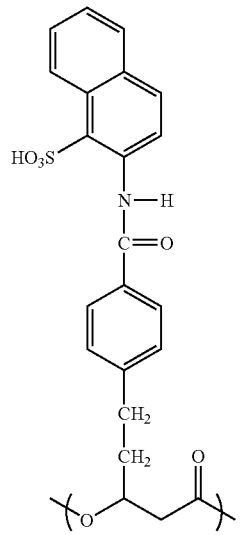

(71)

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 76,000, and a weight-average molecular weight $M_w$ of 97,000.

Example Q-4

1.0020 g of PHA obtained in Example Q-3 were charged in a 300 ml eggplant-shaped flask, then dissolved by adding 70 ml of chloroform and 17.5 ml of methanol, and were cooled to 0° C. The solution was added with 21.1 ml of a 2 mol/L hexane solution of trimethylsilyldiazomethane (manufactured by Aldrich Inc.) and was stirred for 4 hours. After the reaction, the solvent was distilled off in an evaporator to recover a polymer.

The polymer was redissolved by adding 70 ml of chloroform and 17.5 ml of methanol, and the solvent was distilled off in an evaporator. This operation was repeated three times.

The recovered polymer was dried under a reduced pressure to obtain 0.9057 g of PHA.

A structure of the obtained polymer was determined by $^1$H-NMR (FT-NMR: Bruker DPX400; $^1$H resonance frequency: 400 MHz; measured nucleus species: $^1$H; solvent: deuterized DMSO; measurement temperature: room temperature). Based on the result of $^1$H-NMR indicating a peak of 3 to 4 ppm induced by methyl sulfonate, it was identified that the obtained PHA was a polyhydroxyalkanoate copolymer containing 15 mol. % of a unit represented by the following chemical formula (72).

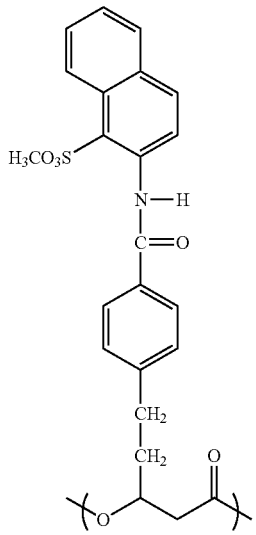

(72)

Also an acid value titration, utilizing a potentiometric titration apparatus AT510 (manufactured by Kyoto Denshi Co.), did not show a peak induced by a sulfonic acid, indicating that sulfonic acid was converted into methyl sulfonate.

An average molecular weight of the obtained PHA was evaluated by gel permeation chromatography (GPC: Toso, column: Polymer Laboratories PLgel 5μ MIXED-C, solvent: DMF/LiBr 0.1% (w/v), conversion into polystyrene). As a result, there were obtained a number-average molecular weight $M_n$ of 79,000, and a weight-average molecular weight $M_w$ of 103,000.

Then, various toners were prepared with charge control agents prepared by methods selected from the method of the invention and evaluated (Examples 1 to 34).

Example 1

In a four-necked 2 L flask equipped with a high-speed agitator TK-homomixer, an aqueous solution of $Na_3PO_4$ was charged, and heated to 60° C. with a revolution adjusted at 10,000 rpm. Then an aqueous solution of $CaCl_2$ was gradually added to prepare an aqueous dispersion liquid containing fine dispersant $Ca_3(PO_4)_2$ of low solubility in water.

On the other hand, a following composition was dispersed for 3 hours in a ball mill, and 10 parts by mass of a releasing agent (ester wax) and 10 parts by mass of a polymerization initiator constituted of 2,2'-azobis(2,4-dimethylvaleronitrile), thereby obtaining a polymerizable monomer composition:

| | |
|---|---|
| styrene monomer | 82 parts by mass |
| ethylhexyl acrylate monomer | 18 parts by mass |
| divinylbenzene monomer | 0.1 parts by mass |
| cyan coloring agent (C.I. Pigment Blue 15) | 6 parts by mass |
| oxidized polyethylene resin (molecular weight 3200, acid value 8) | 5 parts by mass |
| example compound A-1 | 2 parts by mass |

Then the polymerizable monomer composition prepared above was charged into the aqueous dispersion liquid prepared in advance, and was subjected to a particle formation under a revolution of 10,000 rpm. Thereafter, under the stirring with fins of a puddle agitator, reaction was executed for 3 hours at 65° C. and then 6 hours at 80° C. to complete the polymerization reaction. After the reaction, the suspension was cooled, then an acid was added to dissolve the dispersant $Ca_3(PO_4)_2$ of low solubility in water, and blue-colored polymer particles (1) were obtained by filtration, washing with water and drying. In a particle size measurement with Coulter Counter-Multisizer (manufactured by Coulter Corp.), the obtained blue-colored polymer particles (1) had a weight-averaged particle size of 6.9 μm and a fine powder amount (proportion of particles of 3.17 μm or smaller in number distribution) of 5.3 number %.

To 100 parts by mass of thus prepared blue polymer particles (1), 1.3 parts by mass of hydrophobic silica powder (BET: 270 m$^2$/g) processed with hexamethyldisilazane were externally added as a flowability improving agent, by drying mixing with a Henshel mixer, thereby obtaining a blue toner (1) of the present example. Also 7 parts by mass of the blue toner (1) were mixed with 93 parts by mass of a resin-coated magnetic ferrite carrier (average particle size: 45 μm) to obtain a 2-component blue developer for a magnetic brush development.

Examples 2 to 4

Blue toners (2) to (4) of Examples 2 to 4 were obtained by a method similar to that in Example 1, except that the example compound A-1 was respectively replaced by example compounds A-2, C-1 and C-2. The characteristics of these toners were measured as in Example 1, and are shown in table 1. Also these toners were processed as in Example 1 to obtain two-component blue developers (2) to (4) of Examples 2 to 4.

Comparative Example 1

A blue toner (5) of Comparative Example 1 was obtained by a method similar to that in Example 1, except that the example compound was not employed. The characteristics of this toner were measured as in Example 1, and are shown in table 1. Also this toner was processed as in Example 1 to obtain a two-component blue developer (5) of Comparative Example 1.

<Evaluation>

Each of the two-component blue developers (1) to (4) of the foregoing examples and the two-component blue developer (5) of Comparative Example 1 was subjected to a measurement of a toner charge amount after an stirring for 10 seconds and 300 seconds, by the charge amount measuring method explained in the foregoing, in each of a normal-temperature normal-humidity condition (25° C., 60% RH) and a high-temperature high-humidity condition (30° C., 80% RH). A measured value of a two-component blow-off charge amount was rounded to one decimal, and was evaluated by following criteria. Obtained results are summarized in table 1:

[Charging Property]
E: excellent (−20 μC/g or lower)
A: good (−19.9 to −10.0 μC/g)
B: practically acceptable (−9.9 to −5.0 μC/g)
C: practically unacceptable (−4.9 μC/g or higher).

Examples 5 to 8

Yellow toners (1) to (4) of Examples 5 to 8 were obtained by a method similar to that in Example 1, except that 2.0 parts by mass of the example compounds A-1, A-2, C-1 and C-2 were respectively employed, and the cyan coloring agent was replaced by a yellow coloring agent (Hanza Yellow G). The characteristics of these toners were measured as in Example 1, and are shown in table 1. Also these toners were processed as in Example 1 to obtain two-component yellow developers (1) to (4).

Comparative Example 2

A yellow toner (5) of Comparative Example 2 was obtained by a method similar to that in Example 1, except that the example compound was not employed and that the cyan coloring agent was replaced by a yellow coloring agent (Hanza Yellow G). The characteristics of this toner were measured as in Example 1, and are shown in table 1. Also this toner was processed as in Example 1 to obtain a two-component yellow developer (5) of Comparative Example 2.

<Evaluation>

Each of the two-component yellow developers (1) to (4) of Examples 5 to 8 and the two-component yellow developer (5) of Comparative Example 2 was subjected to a measurement of a toner charge amount after an stirring for 10 seconds and 300 seconds, by the charge amount measuring method explained in the foregoing, in each of a normal-temperature normal-humidity condition (25° C., 60% RH) and a high-temperature high-humidity condition (30° C., 80% RH) A measured value of a two-component blow-off charge amount was rounded to one decimal, and was evaluated by following criteria. Obtained results are summarized in table 1:

[Charging Property]
E: excellent (−20 μC/g or lower)
A: good (−19.9 to −10.0 μC/g)
B: practically acceptable (−9.9 to −5.0 μC/g)
C: practically unacceptable (−4.9 μC/g or higher).

Examples 9 to 12

Black toners (1) to (4) of Examples 9 to 12 were obtained by a method similar to that in Example 1, except that 2.0 parts by mass of the example compounds F-1, G-1, H-1 and H-2 were respectively employed, and the cyan coloring agent was replaced by carbon black (DBP oil-absorption amount: 110 mL/100 g). The characteristics of these toners were measured as in Example 1, and are shown in table 1. Also these toners were processed as in Example 1 to obtain two-component black developers (1) to (4).

Comparative Example 3

A black toner (5) of Comparative Example 3 was obtained by a method similar to that in Example 1, except that the example compound was not employed and that the cyan coloring agent was replaced by carbon black (DBP oil-absorption amount: 110 mL/100 g). The characteristics of this toner were measured as in Example 1, and are shown in table 1. Also this toner was processed as in Example 1 to obtain a two-component black developer (5) of Comparative Example 3.

<Evaluation>

Each of the two-component black developers (1) to (4) of Examples 9 to 12 and the two-component black developer (5) of Comparative Example 3 was subjected to a measurement of a toner charge amount after an stirring for 10 seconds and 300 seconds, by the charge amount measuring method explained in the foregoing, in each of a normal-temperature normal-humidity condition (25° C., 60% RH) and a high-temperature high-humidity condition (30° C., 80% RH). A measured value of a two-component blow-off charge amount was rounded to one decimal, and was evaluated by following criteria. Obtained results are summarized in table 1:

[Charging Property]
E: excellent (−20 μC/g or lower)
A: good (−19.9 to −10.0 μC/g)
B: practically acceptable (−9.9 to −5.0 μC/g)
C: practically unacceptable (−4.9 μC/g or higher).

Example 13

| | |
|---|---|
| styrene-butyl acrylate copolymer resin (glass transition temperature: 70° C.) | 100 parts by mass |
| magenta pigment (C.I. Pigment Red 114) | 5 parts by mass |
| example compound F-1 | 2 parts by mass |

A foregoing composition was mixed and melt kneaded by a two-shaft extruder (L/D=30). After cooling, the blend was crude crushed by a hammer mill, then fine crushed by a jet mill and classified to obtain magenta colored particles (1). The magenta colored-particles (1) had a weight-averaged particle size of 7.5 μm and a fine powder amount of 5.3 number %.

To 100 parts by mass of thus prepared magenta colored particles (1), 1.5 parts by mass of hydrophobic silica powder (BET: 250 m$^2$/g) processed with hexamethyldisilazane were mixed as a flowability improving agent, by drying mixing with a Henshel mixer, thereby obtaining a magenta (red) toner (1) of the present example. Also 7 parts by mass of the obtained magenta (red) toner (1) were mixed with 93 parts by mass of a resin-coated magnetic ferrite carrier (average particle size: 45 pm) to obtain a 2-component magenta (red) developer for a magnetic brush development.

Examples 14 to 16

Magenta (red) toners (2) to (4) of Examples 14 to 16 were obtained by a method similar to that in Example 13, except that the example compound F-1 was respectively replaced by example compounds G-1, H-1 and H-2. The characteristics of these toners were measured as in Example 1, and are shown in table 1. Also these toners were processed as in Example 13 to obtain two-component magenta (red) developers (2) to (4) of Examples 14 to 16.

Comparative Example 4

A magenta (red) toner (5) of Comparative Example 4 was obtained by a method similar to that in Example 13, except that the example compound was not employed. The characteristics of this toner were measured as in Example 1, and are shown in table 1. Also this toner was processed as in Example 13 to obtain a two-component magenta (red) developer (5) of Comparative Example 4.

<Evaluation>

Each of the two-component magenta (red) developers (1) to (4) of Examples 13 to 16 and the two-component magenta (red) developer (5) of Comparative Example 4 was subjected to a measurement of a toner charge amount after an stirring for 10 seconds and 300 seconds, by the charge amount measuring method explained in the foregoing, in each of a normal-temperature normal-humidity condition (25° C., 60% RH) and a high-temperature high-humidity condition (30° C., 80% RH). A measured value of a two-component blow-off charge amount was rounded to one decimal, and was evaluated by following criteria. Obtained results are summarized in table 1:

[Charging Property]

E: excellent (−20 µC/g or lower)

A: good (−19.9 to −10.0 µC/g)

B: practically acceptable (−9.9 to −5.0 µC/g)

C: practically unacceptable (−4.9 µC/g or higher).

Examples 17 to 20

Black toners (1) to (4) of Examples 17 to 20 were obtained by a method similar to that in Example 13, except that 2.0 parts by mass of the example compounds A-1, A-2, C-1 and C-2 were respectively employed, and the magenta pigment was replaced by carbon black (DBP oil-absorption amount: 110 mL/100 g). The characteristics of these toners were measured as in Example 1, and are shown in table 1. Also these toners were processed as in Example 13 to obtain two-component black developers (6) to (9).

Comparative Example 5

A black toner (10) of Comparative Example 5 was obtained by a method similar to that in Example 13, except that the example compound was not employed and that the magenta pigment was replaced by carbon black (DBP oil-absorption amount: 110 mL/100 g). The characteristics of this toner were measured as in Example 1, and are shown in table 1. Also this toner was processed as in Example 13 to obtain a two-component black developer (10) of Comparative Example 5.

<Evaluation>

Each of the two-component black developers (6) to (9) of Examples 17 to 20 and the two-component black developer (10) of Comparative Example 5 was subjected to a measurement of a toner charge amount after an stirring for 10 seconds and 300 seconds, by the charge amount measuring method explained in the foregoing, in each of a normal-temperature normal-humidity condition (25° C., 60% RH) and a high-temperature high-humidity condition (30° C., 80% RH). A measured value of a two-component blow-off charge amount was rounded to one decimal, and was evaluated by following criteria. Obtained results are summarized in table 1:

[Charging Property]

E: excellent (−20 µC/g or lower)

A: good (−19.9 to −10.0 µC/g)

B: practically acceptable (−9.9 to −5.0 µC/g).

C: practically unacceptable (−4.9 µC/g or higher)

Example 21

| | |
|---|---|
| polyester resin | 100 parts by mass |
| carbon black (DBP oil absorption amount 110 mL/100 g) | 5 parts by mass |
| example compound A-1 | 2 parts by mass |

A polyester resin was synthesized in a following manner. 751 parts of an addition product of bisphenol-A and 2 moles of propylene oxide, 104 parts of terephthalic acid and 167 parts of trimeritic anhydride were condensation polymerized utilizing 2 parts of dibutyl tin oxide as a catalyst to obtain a polyester resin of a softening point of 125° C.

To 100 parts by mass of thus prepared black colored particles (11), 1.5 parts by mass of hydrophobic silica powder (BET: 250 $m_2/g$) processed with hexamethyldisilazane were mixed as a flowability improving agent, by drying mixing with a Henshel mixer, thereby obtaining a black toner (11) of the present example. Also 7 parts by mass of the obtained black toner (11) were mixed with 9.3 parts by mass of a resin-coated magnetic ferrite carrier (average particle size: 45 µm) to obtain a 2-component black developer for a magnetic brush development.

Examples 22 to 24

Black toners (11) to (14) of Examples 22 to 24 were obtained by a method similar to that in Example 21, except that the example compound A-1 was respectively replaced by example compounds A-2, C-1 and C-2. The characteristics of these toners were measured as in Example 1, and are shown in table 1. Also these toners were processed as in Example 21 to obtain two-component black developers (11) to (14) of Examples 22 to 24.

Comparative Example 6

A black toner (15) of Comparative Example 6 was obtained by a method similar to that in Example 21, except that the example compound was not employed. The characteristics of this toner were measured as in Example 1, and are shown in table 1. Also this toner was processed as in Example 21 to obtain a two-component black developer (15) of Comparative Example 6.

<Evaluation>Each of the two-component black developers (11) to (14) of Examples 21 to 24 and the two-component black developer (15) of Comparative Example 6 was subjected to a measurement of a toner charge amount after an stirring for 10 seconds and 300 seconds, by the charge amount measuring method explained in the foregoing, in each of a normal-temperature normal-humidity condition (25° C., 60% RH) and a high-temperature high-humidity condition (30° C., 80% RH). A measured value of a two-component blow-off charge amount was rounded to one decimal, and was evaluated by following criteria. Obtained results are summarized in table 1:

[Charging Property]

E: excellent (−20 µC/g or lower)

A: good (−19.9 to −10.0 µC/g)

B: practically acceptable (−9.9 to −5.0 µC/g)

C: practically unacceptable (−4.9 µC/g or higher).

TABLE 1

| Example | Example compound No. | Toner No. | Ave. part. size (μm) | Fine powder amount (%) | normal temp. normal humidity (Q/M) 10 sec | 300 sec | high temp. high humidity (Q/M) 10 sec | 300 sec |
|---|---|---|---|---|---|---|---|---|
| 1 | A-1 | blue 1 | 6.9 | 5.3 | E | E | E | E |
| 2 | A-2 | blue 2 | 7.1 | 4.9 | E | E | E | E |
| 3 | C-1 | blue 3 | 7.3 | 4.9 | E | E | E | E |
| 4 | C-2 | blue 4 | 7.2 | 5.1 | E | E | E | E |
| 5 | A-1 | yellow 1 | 7.1 | 5.4 | E | E | E | E |
| 6 | A-2 | yellow 2 | 7.2 | 5.3 | E | E | E | E |
| 7 | C-1 | yellow 3 | 7.5 | 5.3 | E | E | E | E |
| 8 | C-2 | yellow 4 | 7.3 | 5.1 | E | E | E | E |
| 9 | F-1 | black 1 | 6.9 | 5.3 | E | E | E | E |
| 10 | G-1 | black 2 | 7.2 | 5.2 | E | E | E | E |
| 11 | H-1 | black 3 | 7.3 | 5.1 | E | E | E | E |
| 12 | H-2 | black 4 | 7.1 | 5.3 | E | E | E | E |
| 13 | F-1 | red 1 | 7.5 | 5.3 | E | E | E | E |
| 14 | G-1 | red 2 | 7.4 | 5.2 | E | E | E | E |
| 15 | H-1 | red 3 | 7.6 | 5.5 | E | E | E | E |
| 16 | H-2 | red 4 | 7.7 | 5.4 | E | E | E | E |
| 17 | A-1 | black 6 | 7.5 | 5.8 | E | E | E | E |
| 18 | A-2 | black 7 | 7.4 | 5.5 | E | E | E | E |
| 19 | C-1 | black 8 | 7.5 | 5.3 | E | E | E | E |
| 20 | C-2 | black 9 | 7.4 | 5.5 | E | E | E | E |
| 21 | A-1 | black 11 | 7.3 | 4.9 | E | E | E | E |
| 22 | A-2 | black 12 | 7.6 | 5.1 | E | E | E | E |
| 23 | C-1 | black 13 | 7.7 | 4.8 | E | E | E | E |
| 24 | C-2 | black 14 | 7.5 | 4.9 | E | E | E | E |
| Comp. Ex. 1 | — | blue 5 | 7.1 | 5.2 | C | C | C | C |
| 2 | — | yellow 5 | 7.3 | 5.4 | C | C | C | C |
| 3 | — | black 5 | 7.1 | 5.1 | C | B | C | B |
| 4 | — | red 5 | 7.5 | 5.6 | C | B | C | B |
| 5 | — | black 10 | 7.6 | 5.7 | C | B | C | C |
| 6 | — | black 15 | 7.6 | 4.9 | C | B | C | B |

(For the purpose of convenience, yellow color and magenta color are represented as yellow and red.)

Examples 25 to 30 and Comparative Examples 7 to 12

At first there will be explained an image forming apparatus employed in an image forming method of Examples 25 to 30 and Comparative Examples 7 to 12. FIG. 1 is a schematic cross-sectional view of an image forming apparatus for executing an image forming method of the examples and comparative examples of the present invention. A photosensitive drum 1, shown in FIG. 1, has a photosensitive layer 1a including an organic photosensitive semiconductor on a substrate 1b, and is so constructed as to rotate in a direction indicated by an arrow, and a surface thereof is charged to a surface potential of about −600 V by a charging roller 2 constituting a charging member, rotated in contact with the photosensitive drum. As shown in FIG. 1, the charging roller 2 is constituted of a conductive elastic layer 2a covering a metal core 2b.

Figure 2:
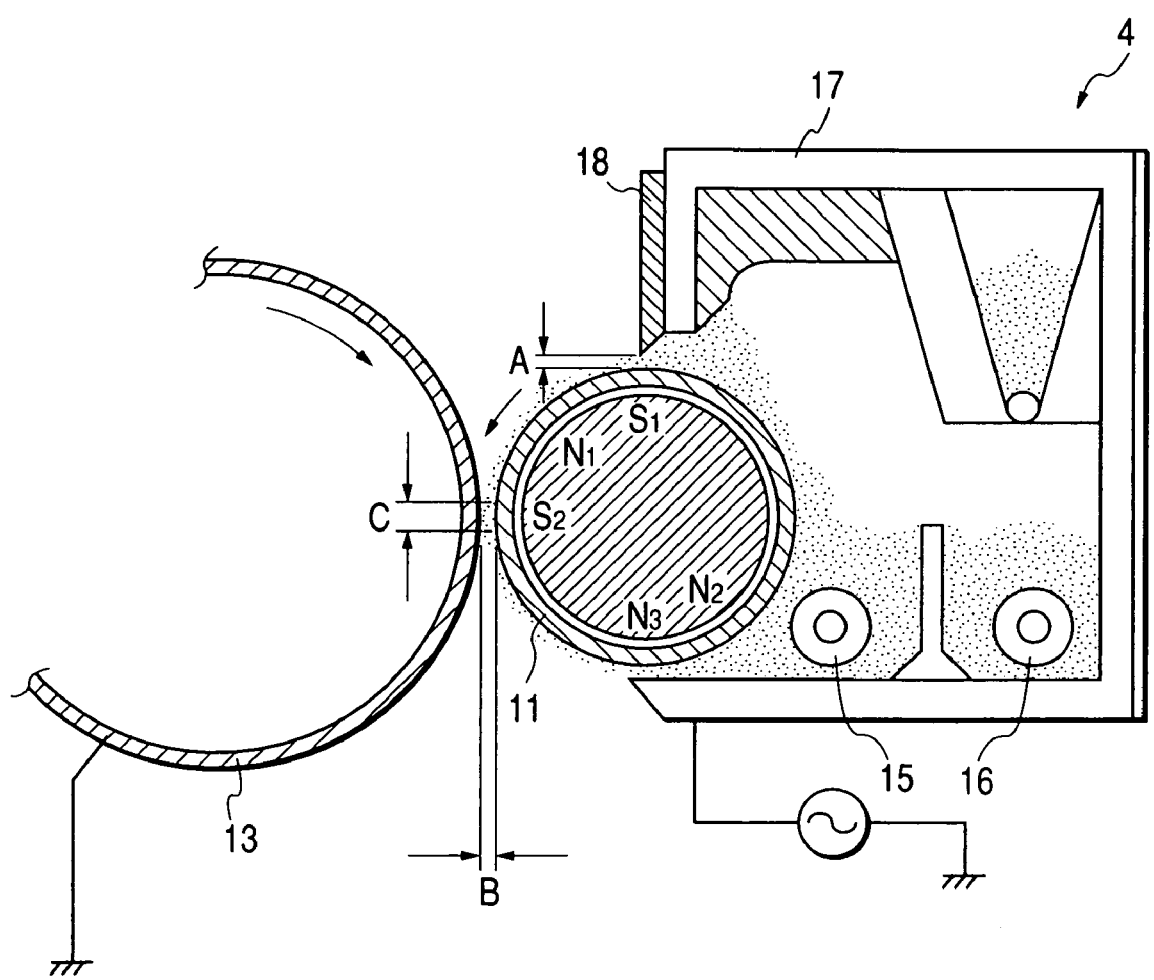
FIG. 2 is a partial cross-sectional view of a developing apparatus for a two-component developer employed in Examples 25 to 30 and Comparative Examples 7 to 12.

An exposure 3, executed on the surfacially charged photosensitive drum 1, is turned on and off according to digital image information through a polygon mirror to form an electrostatic charge image with an exposed potential of −100 V and a dark potential of −600 V. The electrostatic charge image on the photosensitive drum 1 is rendered visible by a reversal development with plural developing apparatuses 4-1, 4-2, 4-3 and 4-4 whereby a toner image is formed on the photosensitive drum 1. In this operation, 2-component developers obtained in Examples 3 to 8 and Comparative Examples 1 to 6 were employed to form the toner image with yellow toner, magenta toner, cyan toner or black toner. FIG. 2 shows a partial magnified cross-sectional view of each developing apparatus 4 for the two-component developer employed in such operation.

Then the toner image on the photosensitive drum 1 is transferred onto an intermediate transfer member 5, rotated in contact with the photosensitive drum 1. As a result, superposed visible images of four colors are formed on the intermediate transfer member 5. A transfer residual toner, not transferred and remaining on the photosensitive drum 1, is recovered by a cleaner member 8 into a used toner container 9.

As shown in FIG. 1, the intermediate transfer member 5 is constituted of a metal core 5b constituting a substrate, and an elastic layer 5a laminated thereon. In the present example, there was employed an intermediate transfer member 5 formed by coating, on a pipe-shaped metal core 5b, an elastic layer 5b of nitrile-butadiene rubber (NBR) in which carbon black was sufficiently dispersed as a conductivity providing material. The elastic layer 5b had a hardness of 30° measured according to JIS K6301, and a volumic resistivity of $1.0 \times 10_9$ Ω·cm. A transfer current of about 5 μA, required for transfer from the photosensitive drum 1 to the intermediate transfer member 5, was obtained by a supply of +500 V from a power source to the metal core 5b.

The superposed toner images of four colors, formed on the intermediate transfer member 5, are transferred onto a transfer material such as paper by a transfer roller 7, and are thereafter fixed by a heat fixing apparatus H. The transfer roller 7 is formed by a metal core 7b of an external diameter of 10 mm, and an elastic layer 7a of a foamed member of an ethylene-propylene-diene ternary copolymer (EPDM) in which carbon as a conductivity providing material is sufficiently dispersed. There was employed a material showing a volumic resistivity of $1.0 \times 10_6$ Ω·cm and a hardness of 35° measured according to JIS K6301. Also a voltage was applied to the transfer roller 7 to provide a transfer current of 15 µA.

Figure 5:
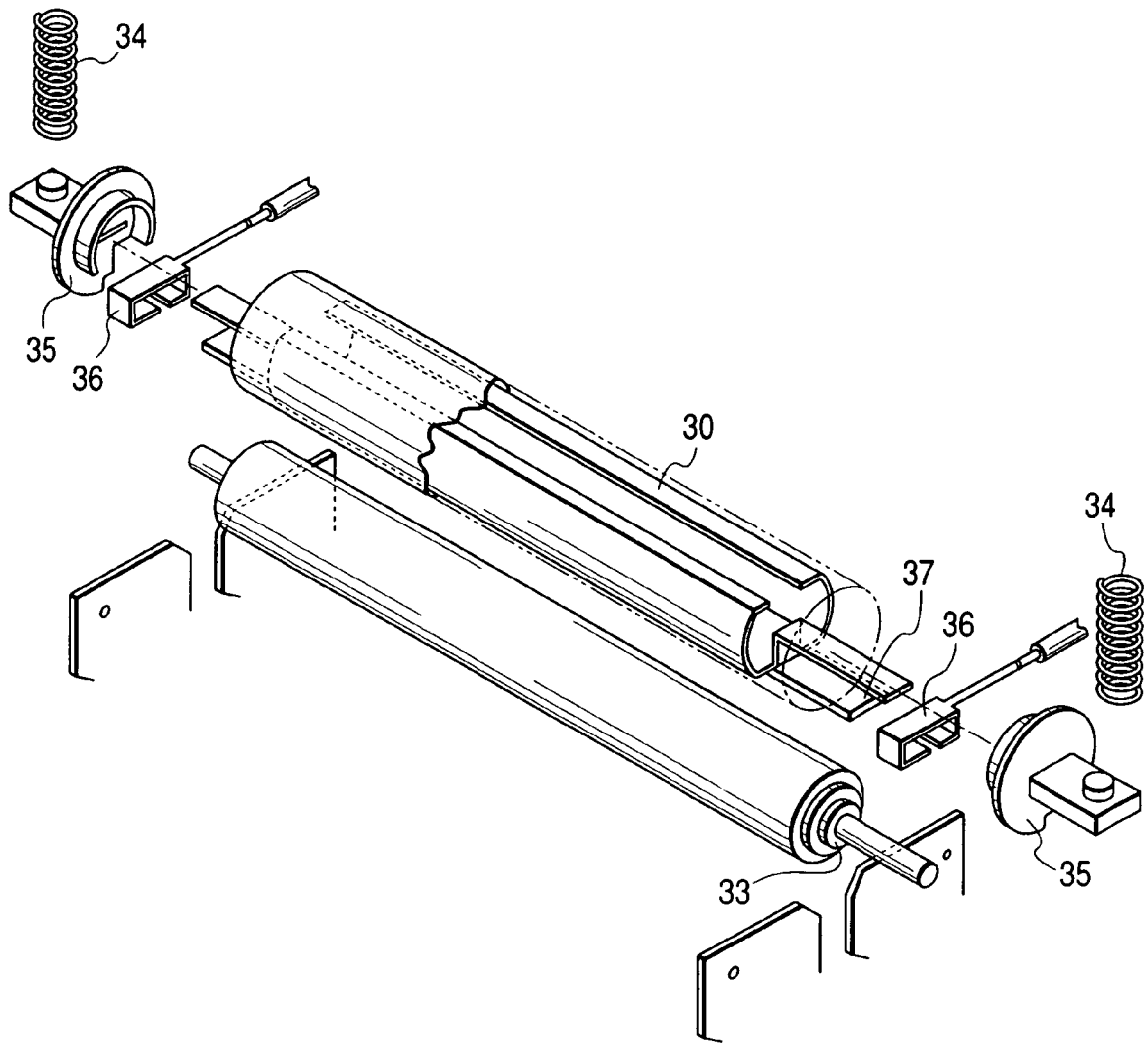
FIG. 5 is a partial exploded perspective view of a fixing apparatus employed in Examples of the present invention.
Figure 6:
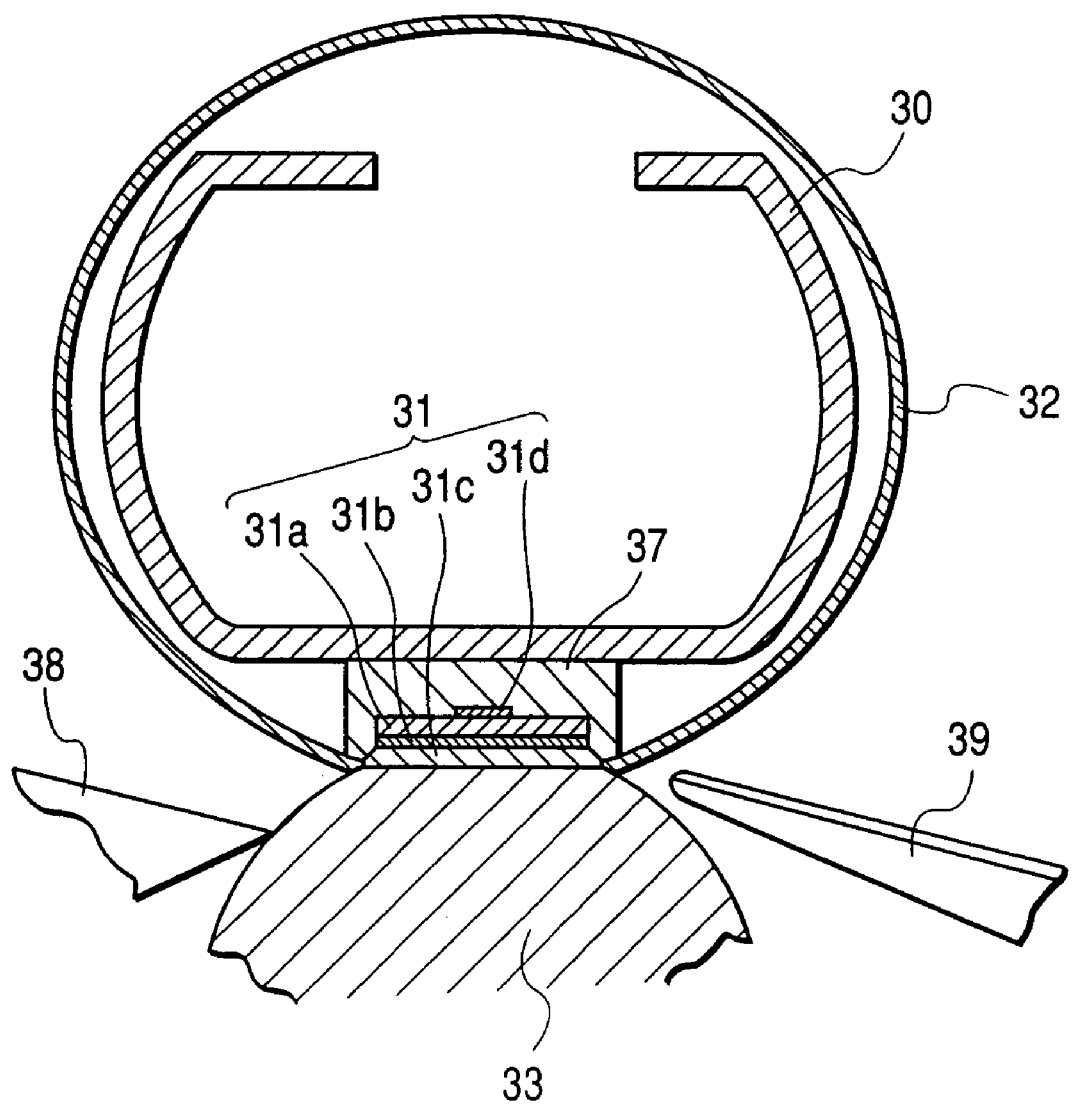
FIG. 6 is a magnified cross-sectional view showing a film state in a non-drive state of a fixing apparatus employed in Examples of the present invention.

The apparatus shown in FIG. 1 employed a heat fixing apparatus of heat roller type without an oil coating mechanism, as shown in FIGS. 5 and 6. Both an upper roller and lower roller had a surface layer of fluorinated resin. The rollers had a diameter of 60 mm. At the fixing operation, there were employed a fixing temperature of 160° C. and a nip width of 7 mm. The transfer residual toner recovered by cleaning from the photosensitive drum 1 was transported by a reuse mechanism to the developing apparatus and was used again.

<Evaluation>

Under the aforementioned conditions in an environment of normal temperature and normal humidity (25° C., 60% RH) or high temperature and high humidity (30° C., 80% RH), a printout test was conducted with a printout speed of 8 sheets (A4 size)/minute, utilizing two-component developers prepared from the toners of Examples 1, 5, 9, 13, 17 and 21 and two component developers prepared from the toners of Comparative Examples 1 to 6 with respectively replenishments, in a single-color intermittent mode (in which the developing device is made to pause for 10 seconds after every printout and the deterioration of toner is accelerated by a preliminary operation at redstart), and obtained printout images were evaluated on following items. Results of evaluation are summarized in table 2.

[Evaluation of Printout Image]

1. Image Density

Printouts of a predetermined number were made on ordinary copying plain paper (75 g/m$_2$), and an evaluation was made on a level of image density maintained at the end of printing, with respect to that in an initial image. An image density was measured by Macbeth reflective densitometer (manufacture by Macbeth Inc.), and an evaluation was made by a relative density to a printout image in a white portion corresponding to an original density of 0.00.

E: Excellent (end image density 1.40 or higher)

A: Good (end image density equal to or higher than 1.35 but less than 1.40)

B: Fair (end image density equal to or higher than 1.00 but less than 1.35)

C: Poor (end image density less than 1.00).

2. Image Fog

Printouts of a predetermined number were made on ordinary copying plain paper (75 g/m$_2$), and an evaluation was made by a solid white image at the end of printing. More specifically, the evaluation was made in the following manner. With a reflective densitometer (Reflectometer Odel TC-6DS, manufactured by Tokyo Denshoku Co., Ltd.), a worst reflective density Ds of a white portion after printing and an average reflective density Dr of the paper before printing were measured, and a fog amount defined by (Ds−Dr) was evaluated by following criteria:

E: Excellent (fog amount equal to or higher than 0% but less than 1.5%)

A: Good (fog amount equal to or higher than 1.5% but less than 3.0%)

B: Practically acceptable (fog amount equal to or higher than 3.0% but less than 5.0%)

C: Practically unacceptable (fog amount equal to or higher than 5.0%).

3. Transfer Property

Printouts of a predetermined number were made on ordinary copying plain paper (75 g/m$_2$), and an image void amount was visually observed and evaluated according to following criteria:

E: Excellent (scarce)

A: Good (slight)

B: Practically acceptable

C: Practically unacceptable.

Also in Examples 25 to 30 and Comparative Examples 7 to 12, scars on the photosensitive drum and the intermediate transfer member, generation of sticking of residual toner, and influence on the printout image (matching with the image forming apparatus) after 5,000 image outputs were visually evaluated. In the systems utilizing the two-component developers of Examples 25 to 30, the scars on the photosensitive drum and on the intermediate, transfer member and the sticking of residual toner could not be observed at all, and the matching with the image forming apparatus was very satisfactory. On the other hand, in the systems utilizing the two-component developers of Comparative Examples 7 to 12, sticking of the toner on the photosensitive drum was observed in all the cases. Also in the systems utilizing the two-component developers of Comparative Examples 7 to 12, the matching with the image forming apparatus was unsatisfactory such as a toner sticking and surfacial scars confirmed on the intermediate transfer member, and an image defect of longitudinal streaks formed on the image.

TABLE 2

| Example | 2-component developer | normal temp. normal himidity | | | high temp. high humidity | | |
|---|---|---|---|---|---|---|---|
| | | image density | image fog | transfer property | image density | image fog | transfer property |
| 1 | blue 1 | E | E | E | E | E | E |
| 5 | yellow 1 | E | E | E | E | E | E |
| 9 | black 1 | E | E | E | E | E | E |
| 13 | red 1 | E | E | E | E | E | E |
| 17 | black 6 | E | E | E | E | E | E |
| 21 | black 11 | E | E | E | E | E | E |
| Comp. Ex. 7 | blue 5 | C | C | C | C | C | C |
| 8 | yellow 5 | C | C | C | C | C | C |
| 9 | black 5 | B | B | C | B | C | C |
| 10 | red 5 | B | B | C | B | C | C |

TABLE 2-continued

|         |            | normal temp. normal humidity | | | high temp. high humidity | | |
| --- | --- | --- | --- | --- | --- | --- | --- |
| Example | 2-component developer | image density | image fog | transfer property | image density | image fog | transfer property |
| 11 | black 10 | B | B | C | C | C | C |
| 12 | black 15 | B | B | C | B | C | C |

Examples 31 to 33 and Comparative Examples 13 to 15

Figure 3:
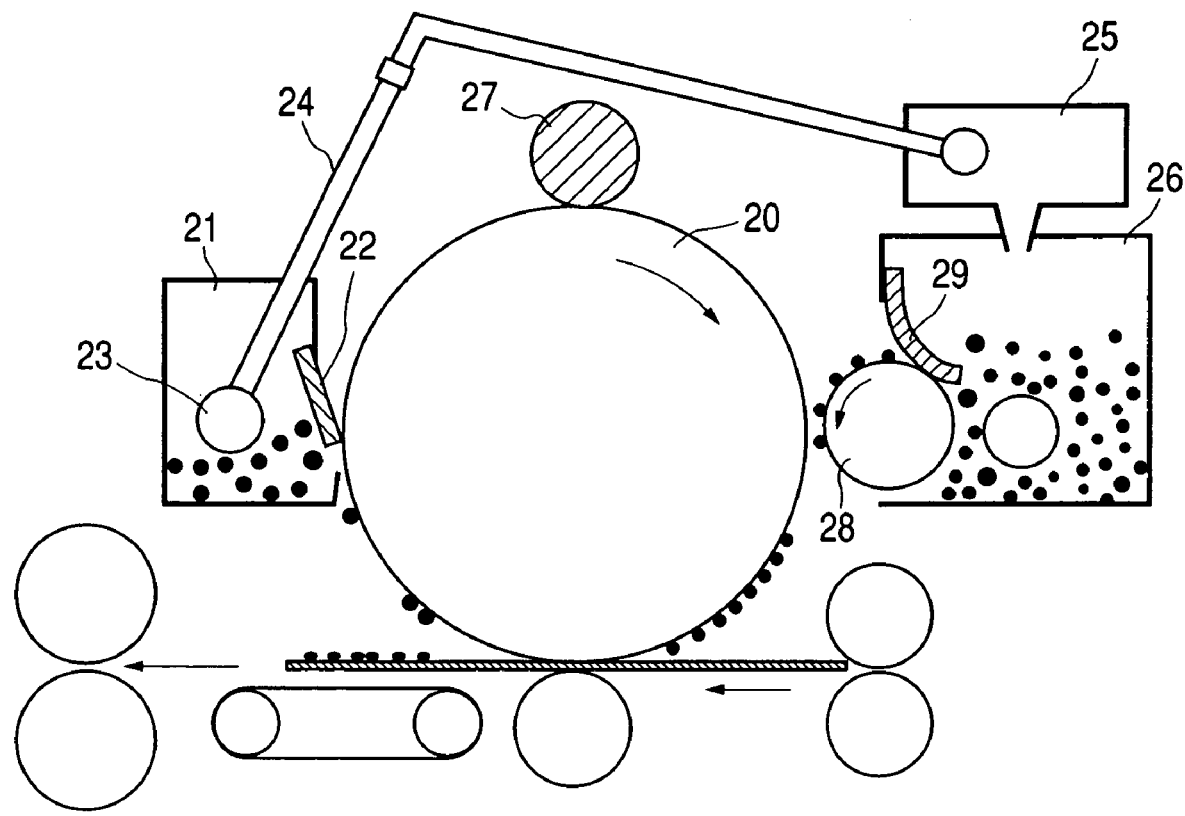
FIG. 3 is a schematic view of an image forming apparatus having a toner reuse mechanism employed in Examples 31 to 34 and Comparative Examples 13 to 15.

In an image forming method of Examples 31 to 33 and Comparative Examples 13 to 15, there were employed, as developers, the toners prepared in Examples 1, 5 and 9 and Comparative Examples 1 to 3. Also as image forming means, there was employed an image forming apparatus modified by mounting a reuse mechanism on a commercially available laser beam printer LBP-EX (manufactured by Canon Inc.) as shown in FIG. 3. The image forming apparatus shown in FIG. 3 is provided with a system, in which an untransferred toner, remaining on a photosensitive drum 20 after a transfer operation, is scraped off by an elastic blade 22 of a cleaner 21 maintained in contact with the photosensitive drum 20, then conveyed by a cleaner roller into the interior of the cleaner 21, and is returned to a developing device 26 through a cleaner reuse 23, a supply pipe 24 provided with a conveying screw and a hopper 25, whereby the recovered toner is used again.

In the image forming apparatus shown in FIG. 3, a primary charging roller 27 charges a surface of the photosensitive drum 20. The primary charging roller 27 was constituted of a rubber roller (diameter: 12 mm, contact pressure: 50 gf/cm) covered with nylon resin in which conductive carbon was dispersed, and an electrostatic latent image of a dark potential VD=−700 V and a light potential VL=−200 V was formed on an electrostatic latent image bearing member (photosensitive drum 20) by a laser exposure (600 dpi, not shown). As a toner carrying member, there was employed a developing sleeve 28 surfacially coated with a resin in which carbon black was dispersed and having a surface roughness Ra of 1.1.

Figure 4:
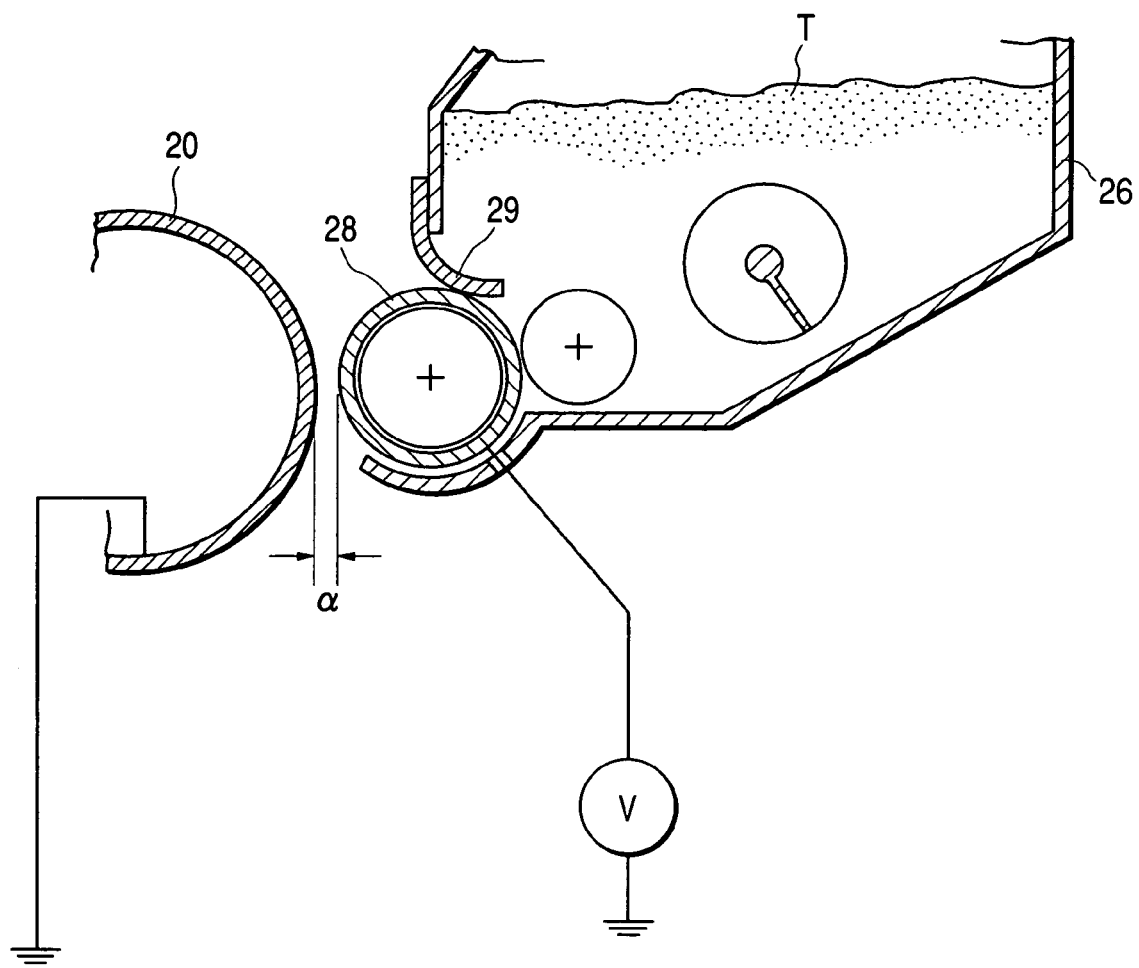
FIG. 4 is a partial cross-sectional view of a developing apparatus for a one-component developer employed in Examples 31 to 34 and Comparative Examples 13 to 15.

FIG. 4 is a partial magnified cross-sectional view of a developing apparatus for a one-component developer employed in Examples 31 to 33 and Comparative Examples 13 to 15. For developing the electrostatic latent image, a speed of the developing sleeve 28 was set at 1.1 times of a moving speed of the opposed surface of the photosensitive drum 20, and a gap α (S–D) between the photosensitive drum 20 and the developing sleeve 28 was set as 270 μm. Also an urethane rubber blade 29 was contacted as a member for regulating the toner layer thickness. Also a heat fixing apparatus for fixing a toner image was set at a temperature of 160° C. As a fixing apparatus, there was employed one shown in FIGS. 5 and 6. In FIG. 6, numeral 32 is in tension free.

Printouts were made to 30,000 prints in an environment of normal temperature and normal humidity (25° C., 60% RH), with a printout speed of 8 sheets (A4 size)/minute in a continuous mode (mode without a pause in the operation of the developing device thereby accelerating the consumption of toner) with successive toner replenishment, and an image density was measured on the obtained printout image and a durability thereof was evaluated according to following criteria. Also a 10,000th image was observed and an image fog was evaluated according to following criteria. Also after the durability test, states of the apparatuses constituting the image forming apparatus were observed, and a matching of each apparatus and each of the aforementioned toners was evaluated. These results are summarized in table 3.

[Change in Image Density in Durability Test]

Printouts of a predetermined number were made on ordinary copying plain paper (75 g/m$_2$), and an evaluation was made on a level of image density maintained at the end of printing, with respect to that in an initial image. An image density was measured by Macbeth reflective densitometer (manufacture by Macbeth Inc.), and an evaluation was made by a relative density to a printout image in a white portion corresponding to an original density of 0.00.

E: Excellent (end image density 1.40 or higher)

A: Good (end image density equal to or higher than 1.35 but less than 1.40)

B: Fair (end image density equal to or higher than 1.00 but less than 1.35)

C: Poor (end image density less than 1.00).

[Image Fog]

Printouts of a predetermined number were made on ordinary copying plain paper (75 g/m$_2$), and an evaluation was made by a solid white image at the end of printing. More specifically, the evaluation was made in the following manner. With a reflective densitometer (Reflectometer Odel TC-6DS, manufactured by Tokyo Denshoku Co., Ltd.), a worst reflective density Ds of a white portion after printing and an average reflective density Dr of the paper before printing were measured, and a fog amount defined by (Ds−Dr) was evaluated by following criteria:

E: Excellent (fog amount equal to or higher than 0% but less than 1.5%)

A: Good (fog amount equal to or higher than 1.5% but less than 3.0%)

B: Practically acceptable (fog amount equal to or higher than 3.0% but less than 5.0%)

C: Practically unacceptable (fog amount equal to or higher than 5.0%).

[Evaluation of Matching with Image Forming Apparatus]

1. Matching with Developing Sleeve

After the printout test, a state of sticking of the residual toner on the developing sleeve and an influence on the printout image were visually evaluated.

E: Excellent (not present)

A: Good (scarcely present)

B: Practically acceptable (sticking is present but little influence on image)

C: Practically unacceptable (frequent sticking resulting in an unevenness in image).

2. Matching with Photosensitive Drum

States of scratch generation on the photosensitive drum and sticking of the residual toner on the developing sleeve, and an influence on the printout image were visually evaluated.

E: Excellent (not generated)

A: Good (slight scratches but no influence on image)

B: Practically acceptable (sticking and scratches present but little influence on image)

C: Practically unacceptable (frequent sticking resulting in image defect in longitudinal streaks).

3. Matching with Fixing Apparatus

Surface state of the fixing film was observed, and durability thereof was evaluated by comprehensively averaging the surface state and sticking of the residual toner.

(1) Surface State

State of scratches and scraping on the surface of the fixing film after the printout test were visually observed and evaluated.

E: Excellent (not present)
A: Good (scarce)
B: Practically acceptable
C: Practically unacceptable.

(2) Sticking State of Residual Toner Sticking state of residual toner on the surface of the fixing film after the printout test was visually observed and evaluated.

E: Excellent (not present)
A: Good (scarce)
B: Practically acceptable
C: Practically unacceptable.

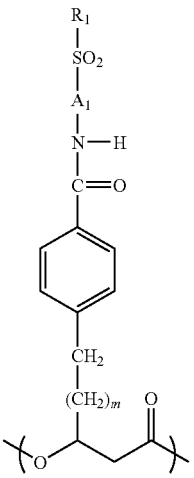

(1)

TABLE 3

|  |  | Evaluation of printout image | | | | | Matching evaluation | | | |
| --- | --- | --- | --- | --- | --- | --- | --- | --- | --- | --- |
|  |  | density change in | | | | image |  | photo- | fixing apparatus | |
| Example | Toner | durability test | | | | fog | dev. sleeve | sens. drum | surface state | toner sticking |
|  |  | start | 1000 | 10000 | 30000 | 10000 |  |  |  |  |
| 31 | blue 1 | E | E | E | E | E | E | E | E | E |
| 32 | yellow 1 | E | E | E | E | E | E | E | E | E |
| 33 | black 1 | E | E | E | E | E | E | E | E | E |
| comp. ex. 13 | blue 5 | B | C | C | C | C | C | C | C | C |
| 14 | yellow 5 | B | C | C | C | C | C | C | C | C |
| 15 | black 5 | A | B | C | C | C | C | C | C | C |

Example 34

A printout test was conducted in the same manner as in Example 31, except that the toner reuse mechanism was detached from the image forming apparatus shown in FIG. 3 and that the printout speed was changed to 16 sheets (A4 size)/minute, employing a continuous mode (mode without a pause in the operation of the developing device thereby accelerating the consumption of toner) and employing the blue toner (1) of Example 1 with successive replenishment. The obtained printout images and the matching with the employed image forming apparatus were evaluated on items same as those in Examples 31 to 33 and Comparative Examples 13 to 15. As a result, satisfactory results were obtained in all the items.

The invention claimed is:

1. Polyhydroxyalkanoate comprising at least one unit represented by a chemical formula (1) in a molecule:

wherein $R_1$ represents OH, a halogen atom, ONa, OK or $OR_{1a}$; $A_1$ and $R_{1a}$ each represents a substituted or unsubstituted aliphatic hydrocarbon structure, a substituted or unsubstituted aromatic cyclic structure or a substituted or unsubstituted heterocyclic structure; m represents an integer selected from a range of 0 to 7; and $R_1$, $A_1$, $R_{1a}$ and m have the aforementioned meanings independently for each unit when plural units are present.

2. Polyhydroxyalkanoate according to claim 1, wherein $R_{1a}$ represents a normal or branched alkyl group with 1 to 8 carbon atoms, or a substituted or unsubstituted phenyl group.

3. Polyhydroxyalkanoate according to claim 1, wherein $A_1$ represents a substituted or unsubstituted aliphatic hydrocarbon structure, which is a normal or branched alkylene group with 1 to 8 carbon atoms, which is unsubstituted or substituted with 1 to 16 $SO_2R_{3a}$ ($R_{3a}$ representing OH, a halogen atom, ONa, OK or $OR_{3b}$ ($R_{3b}$ representing a normal or branched alkyl group with 1 to 8 carbon atoms or a substituted or unsubstituted phenyl group); and $R_{3a}$ has the aforementioned meaning independently for each unit when plural unites are present); and $R_{1a}$ represents a normal or branched alkyl group with 1 to 8 carbon atoms or a substituted or unsubstituted phenyl group when plural units are present.

4. Polyhydroxyalkanoate according to claim 1, wherein the substituent $-A_1SO_2R_1$ is represented by the following chemical formula (4'):

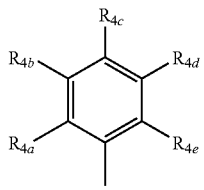

wherein at least one of $R_{4a}$, $R_{4b}$, $R_{4c}$, $R_{4d}$ and $R_{4e}$ represents $SO_2R_{4f}$ (in which $R_4f$ is OH, a halogen atom, ONa, OK or $OR_{4h}$; and $R_{4h}$ represents a normal or branched alkylene group with 1 to 8 carbon atoms or a substituted or unsubstituted phenyl group and each of the others represent H, a halogen atom, an alkyl group with 1 to 20 carbon atoms, an alkoxy group with 1 to 20 carbon atoms, OH, $NH_2$, $NO_2$, $COOR_{4g}$ ($R_{4g}$ representing H, Na or K), an acetamide group, OPh, NHPh, $CF_3$, $C_2F_5$ or $C_3F_7$; and $R_{4a}$, $R_{4b}$, $R_{4c}$, $R_{4d}$, $R_{4e}$, $R_{4f}$, $R_{4g}$ and $R_{4h}$ have the aforementioned meanings independently for each unit when plural units are present.

5. Polyhydroxyalkanoate according to claim 1, wherein the substituent $-A_1SO_2R_1$ represents a substituent represented by the following chemical formula (5a') or (5b'):

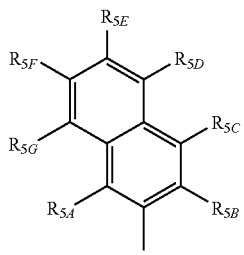

wherein at least one of $R_{5A}$, $R_{5B}$, $R_{5C}$, $R_{5D}$, $R_{5E}$, $R_{5F}$ and $R_{5G}$ represents $SO_2R_{5O}$ (in which $R_{5O}$ is OH, a halogen atom, ONa, OK or $OR_{5s}$; and $R_{5s}$ represents a normal or branched alkyl group with 1 to 8 carbon atoms or a substituted or unsubstituted phenyl group) and each of the others represents H, a halogen atom, an alkyl group with 1 to 20 carbon atoms, an alkoxy group with 1 to 20 carbon atoms, OH, $NH_2$, $NO_2$, $COOR_{5P}$ ($R_{5P}$ representing H, Na or K), an acetamide group, OPh, NHPh, $CF_3$, $C_2F_5$ or $C_3F_7$; and $R_{5A}$, $R_{5B}$, $R_{5C}$, $R_{5D}$, $R_{5E}$, $R_{5F}$, $R_{5G}$, $R_{5O}$, $R_{5P}$ and $R_{5s}$ have the aforementioned meanings independently for each unit when plural units are present;

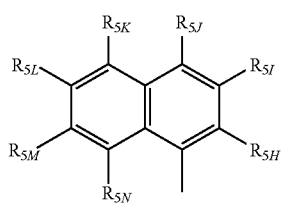

wherein at least one of $R_{5H}$, $R_{5I}$, $R_{5J}$, $R_{5K}$, $R_{5L}$, $R_{5M}$ and $R_{5N}$ represents $SO_2R_{5Q}$ (in which $R_{5Q}$ is OH, a halogen atom, ONa, OK or $OR_{5t}$; and $R_{5t}$ represents a normal or branched alkyl group with 1 to 8 carbon atoms or a substituted or unsubstituted phenyl group), and each of the others represents a hydrogen atom, a halogen atom, an alkyl group with 1 to 20 carbon atoms, an alkoxy group with 1 to 20 carbon atoms, OH, $NH_2$, $NO_2$, $COOR_{5R}$ ($R_{5R}$ representing H, Na or K), an acetamide group, OPh, NHPh, $CF_3$, $C_2F_5$ or $C_3F_7$; m represents an integer selected from a range of 0 to 7; and $R_{5H}$, $R_{5I}$, $R_{5J}$, $R_{5K}$, $R_{5L}$, $R_{5M}$, $R_{5N}$, $R_{5Q}$, $R_{5R}$, $R_{5t}$ and m have the aforementioned meanings independently for each unit when plural units are present.

6. Polyhydroxyalkanoate according to claim 3, wherein the substituent $-A_1SO_2R_1$ is represented by the following chemical formula (6'):

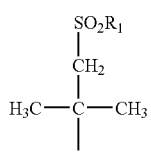

wherein $R_1$ is OH, a halogen atom, ONa, OK or $OR_{6b}$ (in which $R_{6b}$ represents a normal or branched alkyl group with 1 to 8 carbon atoms or a substituted or unsubstituted phenyl group); and $R_{6b}$ has the aforementioned meaning independently for each unit when plural units are present.

7. Polyhydroxyalkanoate according to claim 1, wherein $A_1$ is p-phenylene:

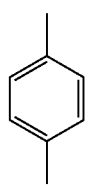

and $R_{1a}$ is a normal or branched alkyl group with 1 to 8 carbon atoms or a substituted or unsubstituted phenyl group.

8. Polyhydroxyalkanoate according to claim 1, wherein $A_1$ is o-phenylene:

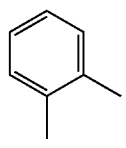

and $R_{1a}$ is a normal or branched alkyl group with 1 to 8 carbon atoms or a substituted or unsubstituted phenyl group.

9. Polyhydroxyalkanoate according to claim 1, wherein a substituent $-A_1SO_2R_1$ is a group represented by a chemical formula (9'):

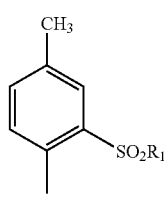

wherein $R_{1a}$ is a normal or branched alkyl group with 1 to 8 carbon atoms or a substituted or unsubstituted phenyl group.

10. Polyhydroxyalkanoate according to claim 1, wherein a substituent $-A_1SO_2R_1$ is a group represented by a chemical formula (10'):

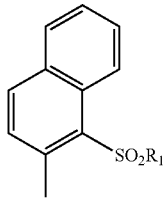
(10')

wherein $R_{1a}$ is a normal or branched alkyl group with 1 to 8 carbon atoms or a substituted or unsubstituted phenyl group.

11. Polyhydroxyalkanoate according to claim 1, wherein a substituent $-A_1SO_2R_1$ is a group represented by a chemical formula (52'):

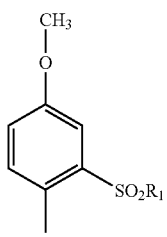
(52')

wherein $R_{1a}$ is a normal or branched alkyl group with 1 to 8 carbon atoms or a substituted or unsubstituted phenyl group.

12. Polyhydroxyalkanoate according to claim 1, wherein $A_1$ is 1,8-naphthylene:

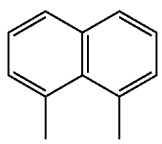

and $R_{1a}$ is a normal or branched alkyl group with 1 to 8 carbon atoms or a substituted or unsubstituted phenyl group.

13. Polyhydroxyalkanoate according to claim 1, further comprising, in addition to a unit represented by the chemical formula (1), at least one of a 3-hydroxy-w-substituted alkanoic acid unit represented by a chemical formula (11):

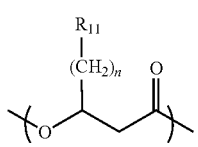
(11)

wherein n is an integer selected from a range of 1 to 8; $R_{11}$ represents a residue including a cyclic structure of either a phenyl structure or a thienyl structure; and, when plural units are present, n and $R_{11}$ have the aforementioned meaning independently for each unit; and a 3-hydroxy-ω-cyclohexyl alkanoic acid unit represented by a chemical formula (12):

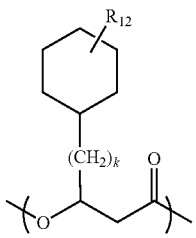
(12)

wherein $R_{12}$ represents H, CN, NO2, a halogen atom, $CH_3$, $C_2H_5$, $C_3H_7$, $CF_3$, $C_2F_5$, or $C_3F_7$; and k represents an integer selected from a range of 0 to 8; and $R_{12}$ and k have the aforementioned meaning independently for each unit when plural units are present.

14. Polyhydroxyalkanoate according to claim 13, wherein $R_{11}$ represents any one of chemical formulas (13), (14), (15), (16), (17), (18), (19), (20), (21), (22) and (23), which unit has the aforementioned meaning independently for each unit and, when plural units are present:

(13)

wherein $R_{13}$ represents H, a halogen atom, CN, $NO_2$, $CH_3$, $C_2H_5$, $C_3H_7$, $CH=CH_2$, $COOR_{13a}$ ($R_{13a}$ representing H, Na or K), $CF_3$, $C_2F_5$ or $C_3F_7$, which unit has the aforementioned meaning independently for each unit when plural units are present:

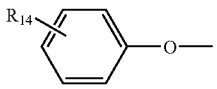
(14)

wherein $R_{14}$ represents H, a halogen atom, CN, $NO_2$, $CH_3$, $C_2H_5$, $C_3H_7$, $SCH_3$, $CF_3$, $C_2F_5$ or $C_3F_7$, which has the aforementioned meaning independently for each unit when plural units are present:

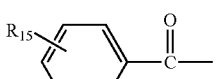
(15)

wherein $R_{15}$ represents H, a halogen atom, CN, $NO_2$, $CH_3$, $C_2H_5$, $C_3H_7$, $CF_3$, $C_2F_5$ or $C_3F_7$, which has the aforementioned meaning independently for each unit when plural units are present:

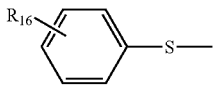
(16)

wherein $R_{16}$ represents H, a halogen atom, CN, $NO_2$, $COOR_{16a}$, $SO_2R_{16b}$ ($R_{16a}$ representing H, Na, K, $CH_3$ or $C_2H_5$, and $R_{16b}$ representing OH, ONa, OK, a halogen atom, $OCH_3$, or $OC_2H_5$), $CH_3$, $C_2H_5$, $C_3H_7$, $(CH_3)_2CH$ or $(CH_3)_3C$, which has the aforementioned meaning independently for each unit when plural units are present:

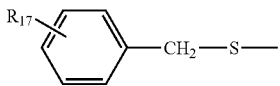
(17)

wherein $R_{17}$ represents H, a halogen atom, CN, $NO_2$, $COOR_{17a}$, $SO_2R_{17b}$ ($R_{17a}$ representing H, Na, K, $CH_3$ or $C_2H_5$, and $R_{17b}$ representing OH, ONa, OK, a halogen atom, $OCH_3$, or $OC_2H_5$), $CH_3$, $C_2H_5$, $C_3H_7$, $(CH_3)_2CH$ or $(CH_3)_3C$, which has the aforementioned meaning independently for each unit when plural units are present:

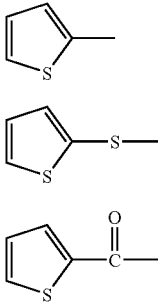
(18)

(19)

(20)

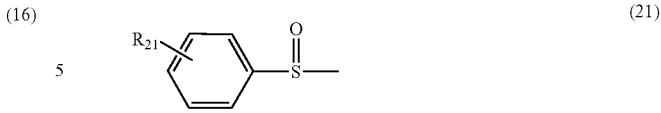
(21)

wherein $R_{21}$ represents H, a halogen atom, CN, $NO_2$, $COOR_{21a}$, $SO_2R_{21b}$ ($R_{21a}$ representing H, Na, K, $CH_3$ or $C_2H_5$, and $R_{21b}$ representing OH, ONa, OK, a halogen atom, $OCH_3$, or $OC_2H_5$), $CH_3$, $C_2H_5$, $C_3H_7$, $(CH_3)_2CH$ or $(CH_3)_3C$, which has the aforementioned meaning independently for each unit when plural units are present:

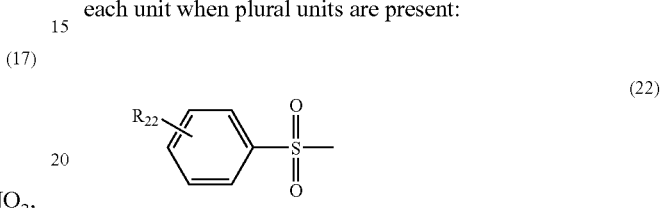
(22)

wherein $R_{22}$ represents H, a halogen atom, CN, $NO_2$, $COOR_{22a}$, $SO_2R_{22b}$ ($R_{22a}$ representing H, Na, K, $CH_3$ or $C_2H_5$, and $R_{22b}$ representing OH, ONa, OK, a halogen atom, $OCH_3$, or $OC_2H_5$), $CH_3$, $C_2H_5$, $C_3H_7$, $(CH_3)_2CH$ or $(CH_3)_3C$, which has the aforementioned meaning independently for each unit when plural units are present:

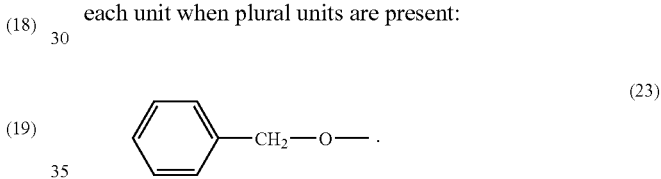
(23)

15. Polyhydroxyalkanoate according to claim 1, wherein a number-average molecular weight is within a range from 1,000 to 1,000,000.

* * * * *